(12) United States Patent
Ishiguro et al.

(10) Patent No.: US 9,310,642 B2
(45) Date of Patent: Apr. 12, 2016

(54) LIQUID CRYSTAL DISPLAY

(71) Applicant: FUJIFILM Corporation, Tokyo (JP)

(72) Inventors: Makoto Ishiguro, Kanagawa (JP);
Yasuyuki Sasada, Kanagawa (JP);
Kazuya Hisanaga, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/558,044

(22) Filed: Dec. 2, 2014

(65) Prior Publication Data

US 2015/0131038 A1    May 14, 2015

Related U.S. Application Data

(63) Continuation of application No. PCT/JP2013/062057, filed on Apr. 24, 2013.

(30) Foreign Application Priority Data

Jun. 11, 2012   (JP) .................................. 2012-132379
Nov. 14, 2012   (JP) .................................. 2012-250721
Mar. 15, 2013   (JP) .................................. 2013-054198

(51) Int. Cl.
*G02F 1/1335* (2006.01)
*G02F 1/1333* (2006.01)
(Continued)

(52) U.S. Cl.
CPC .... *G02F 1/133528* (2013.01); *G02F 1/134363* (2013.01); *G02B 5/3033* (2013.01); *G02F 2001/133531* (2013.01)

(58) Field of Classification Search
CPC ............... G02F 1/133528; G02F 1/134363; G02F 2001/133531; G02B 5/3033

USPC ................................................... 349/96, 158
See application file for complete search history.

(56) References Cited

U.S. PATENT DOCUMENTS

2003/0137732 A1* 7/2003 Sugino .................... B29C 55/04
                                                              359/487.01
2010/0182689 A1* 7/2010 Nakanishi .......... C08G 18/0823
                                                              359/485.01

FOREIGN PATENT DOCUMENTS

JP    2002-006133 A    1/2002
JP    2002-221715 A    8/2002
(Continued)

OTHER PUBLICATIONS

International Search Report issued in PCT/JP2013/062057 on May 28, 2013.
(Continued)

*Primary Examiner* — Nathanael R Briggs
(74) *Attorney, Agent, or Firm* — Jean C. Edwards, Esq.; Edwards Neils PLLC

(57) ABSTRACT

A liquid crystal display includes a liquid crystal cell having a liquid crystal layer provided between two glass substrates having a thickness of 0.5 mm or less, polarization plates provided on both surfaces of the liquid crystal cell in which absorption axes of the polarization plates provided on both surfaces of the liquid crystal cell are disposed to be orthogonal with each other, and a back light provided on a rear side of the liquid crystal cell, and a difference (D−H) between a contractive force D in an absorption axis direction of the front side polarization plate, and a contractive force H in a transmission axis direction of the rear side polarization plate is 365×10 N/m or less.

12 Claims, 2 Drawing Sheets

(51) Int. Cl.
*G02F 1/1343* (2006.01)
*G02B 5/30* (2006.01)

(56) References Cited

FOREIGN PATENT DOCUMENTS

| JP | 2003-084136 A | 3/2003 |
|---|---|---|
| JP | 2003-279748 A | 10/2003 |
| JP | 2007-047776 A | 2/2007 |
| JP | 2010-032718 A | 2/2010 |
| JP | 2011-248363 A | 12/2011 |

OTHER PUBLICATIONS

Written Opinion issued in PCT/JP2013/062057 on May 28, 2013.
International Preliminary Examination Report issued in PCT/JP2013/062057 on Oct. 6, 2014.

* cited by examiner

LIQUID CRYSTAL DISPLAY

CROSS-REFERENCE TO RELATED APPLICATIONS

This application is a Continuation of PCT International Application No. PCT/JP2013/062057 filed on Apr. 24, 2013, which was published under PCT Article 21(2) in Japanese, which claims priority under 35 U.S.C §119(a) to Japanese Patent Application No. 2012-132379 filed on Jun. 11, 2012, Japanese Patent Application No. 2012-250721 filed on Nov. 14, 2012 and Japanese Patent Application No. 2013-054198 filed on Mar. 15, 2013. The above applications are hereby expressly incorporated by reference, in their entirety, into the present application.

BACKGROUND OF THE INVENTION

1. Field of the Invention

The present invention relates to a liquid crystal display. In more detail, the present invention relates to a liquid crystal display capable of solving a problem of light leakage occurring after the storage in a high-humidity environment which is an emerging problem in a liquid crystal display for which a thin glass substrate having a thickness of 0.5 mm or less is used.

2. Description of the Related Art

A liquid crystal display is a space-saving image display with small power consumption, and its application is widening every year. In the past, liquid crystal displays had a serious defect of a large viewing angle dependency of a displayed image, but a wide viewing angle liquid crystal mode such as a VA mode or an IPS mode has been put into practical use, and accordingly, the demand of the liquid crystal displays is rapidly expanding even in a market requiring a high-quality image such as a television.

In a basic configuration of the liquid crystal display, polarization plates are provided on both sides of a liquid crystal cell. The polarization plate passes only light on a plane of polarization in a certain direction, and the performance of the polarization plate is a key determinant of the performance of the liquid crystal display. The VA mode or the IPS mode is used in a normally black (black is displayed when the voltage between electrodes in the liquid crystal cell is zero) state, and, at this time, the light absorption axes of the polarization plates on both sides of the liquid crystal cell are disposed so as to be orthogonal to each other. Out of non-polarized light emitted from a light source, only polarized light in a certain direction passes through the polarization plate on the light source side, maintains the polarization state when passing through the liquid crystal cell, and is absorbed by the polarization plate on a viewing side having the light absorption axis disposed orthogonal to the polarization plate on the light source side. Then, black displaying can be realized.

The polarization plate in a liquid crystal display has a configuration in which, generally, transparent protective films are attached to the front and back sides of a polarizer made of a polyvinyl alcohol film or the like in which iodine or a dye is adsorbed and oriented. As the polarization plate protective film, a cellulose acylate-based polarization plate protective film represented by cellulose acetate has been widely used since the cellulose acylate-based polarization plate protective film has high transparency and is capable of easily ensuring adhesiveness to polyvinyl alcohol which is used for the polarizer.

Meanwhile, in recent years, an acryl resin has been more frequently used as the polarization plate protective film. This is because the attachment technique has improved, and it has become possible to ensure adhesiveness to a polyvinyl alcohol.

In recent years, as the application of the liquid crystal display has been expanding, there has been a demand for a larger size and a higher-quality texture in the liquid crystal display. To reduce the weight of the enlarged liquid crystal display, the thicknesses of a variety of members have been decreased, and particularly, the thickness of a glass substrate has been decreased from the thickness of the related art of 0.7 mm to 0.5 mm. In addition, recently, studies are underway regarding a 0.3 mm-thick glass substrate. Furthermore, there is a portion corresponding to the frame, which is called a bezel, in the peripheral portion of a screen, and the width of the bezel is becoming narrower to produce a higher-quality texture.

In JP2002-6133A and JP2003-84136A, studies are made regarding uneven colors or fading occurring when a polarization plate is placed in a high-temperature environment, and it is disclosed that uneven colors can be improved by decreasing the contractive force in a polarizer configuring a polarization plate. However, in these documents, there is a proposal for improving the uneven colors in a polarization plate placed for a short period of time in a high-temperature environment, but no attention is paid to a problem of the occurrence of unevenness (light leakage at four corners of a panel: hereinafter, also referred to as "warp") based on the warpage of the panel caused when a liquid crystal display in which a liquid crystal cell having a glass thickness of 0.5 mm or less is used has been placed in a high-temperature environment for a long period of time.

SUMMARY OF THE INVENTION

An object of the present invention is to provide a liquid crystal display capable of solving a problem of unevenness based on the warpage of a panel caused when the liquid crystal display is turned on after being stored in a high-humidity environment, which is an emerging problem in a large-size (for example, 32 inches or greater) liquid crystal display in which the thickness of a glass substrate configuring a liquid crystal cell is 0.5 mm or less.

A panel in a liquid crystal display includes a liquid crystal cell and two polarization plates provided on both surfaces of the liquid crystal cell. When the liquid crystal display is placed in a high-humidity environment (for example, 48 hours at a 60° C. relative humidity of 90%, and 72 hours at a 50° C. relative humidity of 80%), both polarization plates on the front and rear sides absorb water, and swell. Afterwards, when the liquid crystal display is removed from the high-humidity environment, the polarization plates that have absorbed water and swollen are dried, and contract. In this case, the polarization plate on the rear side is placed in an environment of higher airtightness than the polarization plate on the front side. Therefore, while the polarization plate on the front side is dried faster, and thus a greater contractive force is generated, the polarization plate on the rear side is dried slower, and thus a smaller contractive force is generated. The present inventors found that the difference between the contractive force in the polarization plate on the front side and the contractive force in the polarization plate on the rear side causes the warpage of the panel, and consequently, four corners of the panel come into contact with the bezel, thereby causing warp (light leakage at the four corners of the panel).

Therefore, the present inventors intensively studied regarding the suppression of the occurrence of the warp by decreasing the difference between the contractive force in the polarization plate on the front side and the contractive force in the polarization plate on the rear side. As a result, the present inventors paid attention to the fact that, when a liquid crystal display that has been placed in a high-humidity environment is dried, the humidity dimensional change of the polarization plate on the front side is greater than the humidity dimensional change of the polarization plate on the rear side which is slowly dried, and the present inventors found that, when the difference between the contractive force generated by a great specific humidity dimensional change of the polarization plate on the front side and the contractive force generated by a small specific humidity dimensional change of the polarization plate on the rear side is regulated within a predetermined range, it is possible to suppress the warpage of the panel and suppress the occurrence of the warp.

The present invention has been made on the basis of the above-described finding.

That is, the object is achieved by the present invention having the following configuration.

<1> A liquid crystal display including a liquid crystal cell having a liquid crystal layer provided between two glass substrates having a thickness of 0.5 mm or less, polarization plates provided on both surfaces of the liquid crystal cell, and a back light provided on a rear side (non-viewing side) of the liquid crystal cell, in which absorption axes of the polarization plates provided on both surfaces of the liquid crystal cell are disposed to be orthogonal with each other, and in which a difference (D−H) between a contractive force D in an absorption axis direction of the front side polarization plate provided on a front side (viewing side) of the liquid crystal cell, which is computed by multiplying a humidity dimensional change ratio of the following [a], an elastic modulus after the following condition (B), and a thickness of the front side polarization plate, and a contractive force H in a transmission axis direction of the rear side polarization plate provided on a rear side of the liquid crystal cell, which is computed by multiplying a humidity dimensional change ratio of the following [b], the elastic modulus after the following condition (B), and a thickness of the front side polarization plate, is 365×10 N/m or less,

[a] the humidity dimensional change ratio expressed by a value obtained by subtracting a dimensional value of the front side polarization plate in the absorption axis direction after the following condition (C) from a dimensional value of the front side polarization plate in the absorption axis direction after the following condition (A),

[b] the humidity dimensional change ratio expressed by a value obtained by subtracting a dimensional value of the rear side polarization plate in the transmission axis direction after the following condition (B) from a dimensional value of the rear side polarization plate in the transmission axis direction after the following condition (A), (A) the liquid crystal display is left to stand for 48 hours in an environment of a 60° C. relative humidity of 90%, and then is left to stand for 48 hours in an environment of a 25° C. relative humidity of 80%, (B) the liquid crystal display is left to stand for 48 hours in an environment of a 60° C. relative humidity of 90%, and then is left to stand for 48 hours in an environment of a 25° C. relative humidity of 60%, and (C) the liquid crystal display is left to stand for 48 hours in an environment of a 60° C. relative humidity of 90%, and then is left to stand for 48 hours in an environment of a 25° C. relative humidity of 10%.

<2> The liquid crystal display according to <1>, in which the difference (D−H) between the contractive force D in the absorption axis direction of the front side polarization plate and the contractive force H in the transmission axis direction of the rear side polarization plate is 330×10 N/m or less.

<3> The liquid crystal display according to <1> or <2>, in which the thickness of the front side polarization plate is 130 µm or less.

<4> The liquid crystal display according to any one of <1> to <3>, in which the thickness of the rear side polarization plate is 1.1 times or more the thickness of the front side polarization plate.

<5> The liquid crystal display according to any one of <1> to <4>, in which a thickness of a protective film used for the front side polarization plate is thinner than the thickness of a protective film used for the rear side polarization plate.

<6> The liquid crystal display according to <5>, in which a thicknesses of both protective films used for the front side polarization plate and the rear side polarization plate are 50 µm or less.

<7> The liquid crystal display according to any one of <1> to <6>, in which a thickness of a polarizer used for the front side polarization plate is thinner than a thickness of a polarizer used for the rear side polarization plate.

<8> The liquid crystal display according to <7>, in which the thicknesses of both polarizers used for the front side polarization plate and the rear side polarization plate are 30 µm or less.

<9> The liquid crystal display according to any one of <5> to <8>, in which the protective films used for the polarization plates are cellulose acylate films, cycloolefin-based resin films, or (meth)acryl-based resin films.

<10> The liquid crystal display according to any one of <1> to <9>, in which the polarization plates are laminated through the liquid crystal cell and an adhesive.

<11> The liquid crystal display according to any one of <1> to <10>, in which the liquid crystal cell has an IPS mode.

It is possible to provide a liquid crystal display capable of solving a problem of unevenness (light leakage at four corners of a panel) based on the warpage of a panel caused when the liquid crystal display is turned on after being stored in a high-humidity environment, which is an emerging problem in a large-size liquid crystal display in which the thickness of a glass substrate configuring a liquid crystal cell is 0.5 mm or less. Therefore, it is possible to provide a liquid crystal display that can be used across the globe.

DESCRIPTION OF THE PREFERRED EMBODIMENTS

Figure 1:
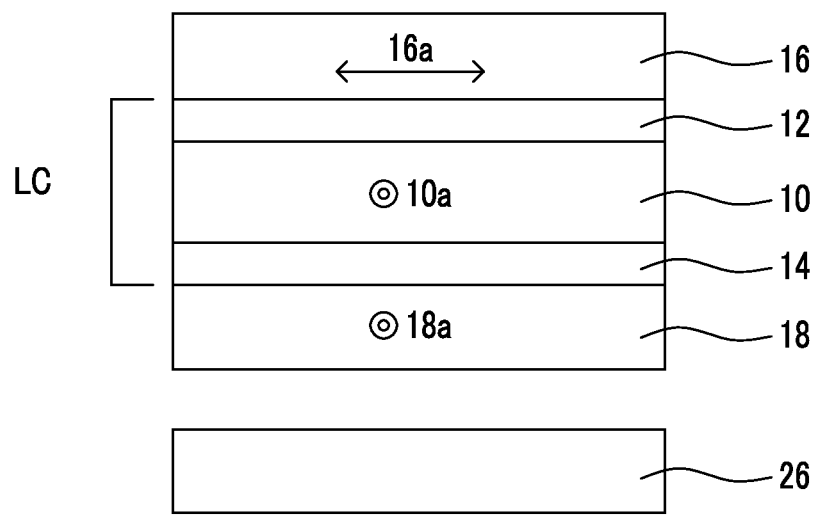
FIG. 1 is a schematic cross-sectional view of an embodiment of an IPS or FFS-type liquid crystal display.

In the present specification, a numeric value range expressed using "to" indicates a range including the numeric values before and after the "to" as the lower limit value and the upper limit value. In addition, in the present specification, the expression "(meth)acrylate" indicates "at least any one of acrylate and methacrylate". This shall apply to "(meth)acryl resin", "(meth)acrylic acid", "(meth)acryloyl", and the like.

Unless particularly otherwise described, the "polarization plate" in the description of the present embodiment includes both a long polarization plate and a polarization plate cut into a small size so as to be embodied in a display apparatus. Meanwhile, the "cutting" mentioned herein includes "punching" and "cutting-out".

The "slow axis" refers to a direction in which the refractive index becomes the maximum, and furthermore, the wavelength for measuring the refractive index is a value in the visible light range ($\lambda$=550 nm) unless particularly otherwise described.

In addition, in the present specification, numeric values, numeric value ranges, and qualitative expressions (for example, expressions of "equivalent", "equal", and the like) describing the optical characteristics of individual members such as an optical film and a liquid crystal layer will be interpreted to indicate numeric values, numeric value ranges, and properties including a generally acceptable error regarding the liquid crystal display or members used for the liquid crystal display.

Furthermore, in the present specification, in a case in which the disposition between individual axes and directions or the angular degrees of crossing angles are described using "parallel", "orthogonal", "0°", "90°" and the like without specifying ranges, the expressions means "substantially parallel", "substantially orthogonal", "substantially 0°", and "substantially 90°", and do not need to be strictly interpreted. Slight deviation is allowed as long as individual objects are achieved. For example, "being parallel" or "0°" means that the crossing angle is substantially 0°, that is, in a range of −10° to 10°, preferably in a range of −5° to 5°, and more preferably in a range of −3° to 3°. "Being orthogonal" or "90°" means that the crossing angle is substantially 90°, that is, in a range of 80° to 100°, preferably in a range of 85° to 95°, and more preferably in a range of 87° to 93°.

In addition, in the present specification, the thickness of a glass substrate used for a liquid crystal cell is not strictly mentioned, and includes errors in a range of −10% to +10%.

[Liquid Crystal Display of the Present Invention]

A liquid crystal display of the present invention is a liquid crystal display including a liquid crystal cell having a liquid crystal layer provided between two glass substrates having a thickness of 0.5 mm or less, polarization plates provided on both surfaces of the liquid crystal cell, and a back light provided on a rear side of the liquid crystal cell, in which absorption axes of the polarization plates provided on both surfaces of the liquid crystal cell are disposed to be orthogonal with each other, and in which a difference (D−H) between a contractive force D in an absorption axis direction of the front side polarization plate provided on a front side of the liquid crystal cell, which is computed by multiplying a humidity dimensional change ratio of the following [a], an elastic modulus after the following condition (B), and a thickness of the front side polarization plate, and a contractive force H in a transmission axis direction of the rear side polarization plate provided on a rear side of the liquid crystal cell, which is computed by multiplying a humidity dimensional change ratio of the following [b], the elastic modulus after the following condition (B), and a thickness of the rear side polarization plate, is 365×10 N/m or less.

[a] the humidity dimensional change ratio expressed by a value obtained by subtracting a dimensional value of the front side polarization plate in the absorption axis direction after the following condition (C) from a dimensional value of the front side polarization plate in the absorption axis direction after the following condition (A)

[b] the humidity dimensional change ratio expressed by a value obtained by subtracting a dimensional value of the rear side polarization plate in the transmission axis direction after the following condition (B) from a dimensional value of the rear side polarization plate in the transmission axis direction after the following condition (A)

(A) the liquid crystal display is left to stand for 48 hours in an environment of a 60° C. relative humidity of 90%, and then is left to stand for 48 hours in an environment of a 25° C. relative humidity of 80%

(B) the liquid crystal display is left to stand for 48 hours in an environment of a 60° C. relative humidity of 90%, and then is left to stand for 48 hours in an environment of a 25° C. relative humidity of 60%

(C) the liquid crystal display is left to stand for 48 hours in an environment of a 60° C. relative humidity of 90%, and then is left to stand for 48 hours in an environment of a 25° C. relative humidity of 10%

The longitudinal direction of the liquid crystal display or a panel therein may correspond to the absorption axis direction of the front side polarization plate and the transmission axis direction of the rear side polarization plate.

When the difference (D−H) between the contractive force D in the absorption axis direction of the front side polarization plate and the contractive force H in the transmission axis direction of the rear side polarization plate is 365×10 N/m or less, it is possible to suppress the longitudinal warpage of the panel, and suppress the occurrence of warp.

The difference (D−H) between the contractive force D and the contractive force H is preferably 330×10 N/m or less, and more preferably 300×10 N/m or less from the viewpoint of further suppressing the lengthwise warpage of the panel and further suppressing the occurrence of warp.

The lower limit of the difference (D−H) between the contractive force D and the contractive force H is not particularly limited, but is preferably 0 N/m or more from the viewpoint of suppressing the reverse warpage of the panel in the longitudinal direction.

Here, the contractive force D in the absorption axis direction of the front side polarization plate is computed by multiplying the humidity dimensional change ratio of the above-described [a], the elastic modulus after the following condition (B), and the thickness of the front side polarization plate.

In addition, the contractive force H in the transmission axis direction of the rear side polarization plate is computed by multiplying the humidity dimensional change ratio of the above-described [b], the elastic modulus after the following condition (B), and a thickness of the rear side polarization plate.

The reason why the humidity dimensional change ratio of the front side polarization plate and the humidity dimensional change ratio of the rear side polarization plate are measured under different measurement conditions of the above-described [a] and [b] is that, when the liquid crystal display is dried after being left to stand in a high-humidity environment, for example, being left to stand in an environment of a 60° C. relative humidity of 90%, for 48 hours, the rear side polarization plate is placed in an environment of higher airtightness than the front side polarization plate, and the front side polarization plate is dried faster, and thus the degree of humidity decrease is great, but the rear side polarization plate is dried slower, and the degree of humidity decrease is small.

Regarding the elastic modulus (GPa) of each polarization plate in the present invention, a specimen having a measurement-direction length of 200 mm and a width of 10 mm is prepared, the specimen is left to stand in an environment of a 60° C. relative humidity of 90% for 48 hours, and then is left to stand in an environment of a 25° C. relative humidity of 60% for 48 hours, a STROGRAPH V10-C manufactured by Toyo Seiki Seisaku-sho, Ltd. is installed so that the longitudinal chuck interval reaches 10 cm, a load is applied so that the chuck interval widens at a stretching rate of 10 mm/minute, and the force at that time can be measured. The elastic modulus can be computed from the thickness of the polarization plate measured in advance using a micrometer, the force, and the degree of the polarization plate stretched.

The humidity dimensional change ratio [%] of the respective polarization plates in the present invention can be measured in the following manner in the case of the front side polarization plate.

A specimen having a length of 12 cm (measurement direction) and a width of 3 cm is prepared, pin holes are opened at an interval of 10 cm in the specimen in an environment of a 25° C. relative humidity of 60%, the specimen is left to stand in an environment of a 60° C. relative humidity of 90% for 48 hours, subsequently, is left to stand in an environment of a 25° C. relative humidity of 80% for 48 hours, and then the interval between the pin holes is measured using a pin gauge (the measured value is indicated as LA1). Similarly, the specimen is left to stand in an environment of a 60° C. relative humidity of 90% for 48 hours, subsequently, is left to stand in an environment of a 25° C. relative humidity of 10% for 48 hours, and then the interval between the pin holes is measured using a pin gauge (the measured value is indicated as LC0). The humidity dimensional change ratio is computed from the following equation using the measured values.

Humidity dimensional change ratio[%]={($LA1$[cm]−$LC0$[cm])/10[cm]}×100

The contractive force (N/m) can be computed from the humidity dimensional change ratio (%) computed from the above-described equation and the elastic modulus (GPa) according to the following equation.

Contractive force(N/m)=elastic modulus(GPa)×|humidity dimensional change ratio(%)|×thickness (μm)×10

Similarly, in the case of the rear side polarization plate, the humidity dimensional change ratio can be measured in the following manner.

A specimen having a length of 12 cm (measurement direction) and a width of 3 cm is prepared, pin holes are opened at an interval of 10 cm in the specimen in an environment of a 25° C. relative humidity of 60%, the specimen is left to stand in an environment of a 60° C. relative humidity of 90% for 48 hours, subsequently, is left to stand in an environment of a 25° C. relative humidity of 80% for 48 hours, and then the interval between the pin holes is measured using a pin gauge (the measured value is indicated as LA1). Similarly, the specimen is left to stand in an environment of a 60° C. relative humidity of 90% for 48 hours, subsequently, is left to stand in an environment of a 25° C. relative humidity of 60% for 48 hours, and then the interval between the pin holes is measured using a pin gauge (the measured value is indicated as LB0). The humidity dimensional change ratio is computed from the following equation using the measured values.

Humidity dimensional change ratio[%]={($LA1$[cm]−$LB0$[cm])/10[cm]}×100

The contractive force (N/m) can be computed from the humidity dimensional change ratio (%) computed from the above-described equation and the elastic modulus (GPa) according to the above-described equation.

Properties relating to the dimensional change in response to a high-humidity treatment include not only the humidity dimensional change ratio after the high-humidity treatment but also the thermal expansion coefficient, the heat and humidity dimensional change ratio (the dimensional change ratio before and after the polarization plate is held in a high-humidity environment), and the like. However, as a result of studies, the present inventors found that the dominant contributor to the warpage of the panel in response to a high-temperature and high-humidity environment is the humidity dimensional change after the high-temperature treatment among the above-described factors. This is assumed to be because an adhesive laminating the polarization plate and the liquid crystal cell easily creeps in a high humidity, but does not easily creep at near room temperature. That is, it is assumed that, while the majority of the contractive force generated due to the dimensional change of the polarization plate during the high-humidity treatment is lost without being transferred to the liquid crystal cell through the creep of the adhesive, the contractive force derived from the humidity dimensional change ratio, which indicate a change in dimensions over time after the polarization plate is removed from the high-humidity environment, is easily transferred to the liquid crystal cell, and is thus likely to affect the warpage of the panel.

[Polarization Plate]

The polarization plate in the present invention includes the polarizer and polarization plate protective films laminated on both surfaces of the polarizer. The polarization plate in the present invention is also preferably configured by further attaching a protective film to one surface of the polarization plate and a separate film to the opposite surface.

The protective film and the separate film are used to protect the polarization plate when the polarization plate is shipped, or a product is inspected. In this case, the protective film is attached to protect the surface of the polarization plate, and is used on the surface opposite to the surface at which the polarization plate is attached to a liquid crystal plate. In addition, the separation film is used to cover an adhesive layer that is attached to the liquid crystal plate, and is used on the surface at which the polarization plate is attached to the liquid crystal plate.

(Humidity Dimensional Change Ratio (%) of Polarization Plate)

From the viewpoint of controlling the contractive force in the polarization plate to a preferable value and suppressing the warpage of the panel, the humidity dimensional change ratio of the [a] in the absorption axis direction (MD direction) of the front side polarization plate is preferably in a range of 0.20% to 0.70%, and more preferably in a range of 0.40% to 0.65%.

From the same viewpoint, the humidity dimensional change ratio of the [b] in the transmission axis direction (TD direction) of the rear side polarization plate is preferably in a range of 0.10% to 0.50%, and more preferably in a range of 0.20% to 0.40%.

(Thickness of Polarization Plate)

From the viewpoint of controlling the contractive force in the polarization plate to a preferable value, the thickness of the polarization plate is preferably 170 μm or less, more preferably 160 μm or less, and still more preferably 150 μm or less. The lower limit is not particularly limited, but is preferably 10 μm or more.

From the viewpoint of controlling the contractive force in the polarization plate to a preferable value and suppressing the warpage of the panel, the thickness of the front side polarization plate is particularly preferably 130 μm or less.

From the viewpoint of controlling the contractive force in the polarization plate to a preferable value and suppressing the warpage of the panel, the thickness of the rear side polarization plate is preferably 1.1 times or more the thickness of the front side polarization plate.

(Elastic Modulus (GPa) of Polarization Plate)

From the viewpoint of controlling the contractive force in the polarization plate to a preferable value and suppressing the warpage of the panel, the elastic modulus of the front side polarization plate in the absorption axis direction is preferably 10 GPa or less, more preferably 9 GPa or less, and still more preferably 8 GPa or less. The lower limit is not particularly limited, but is preferably 2 GPa or more.

From the same viewpoint, the elastic modulus of the rear side polarization plate in the transmission axis direction is preferably 6 GPa or less, more preferably 5 GPa or less, and still more preferably 4 GPa or less. The lower limit is not particularly limited, but is preferably 1 GPa or more.

(Shape and Configuration)

The shape of the polarization plate in the present invention may be a shape of a film piece cut into a size that can be embedded in the liquid crystal display or a shape of a roll of a long film piece produced through continuous production (for example, a shape of a film piece having a roll length of 2500 m or more or 3900 m or more). To make the polarization plate available for a large-screen liquid crystal display, the width of the polarization plate is preferably set to 1470 mm or more.

[Polarizer]

The polarizer used in the polarization plate in the present invention preferably includes a polyvinyl alcohol-based resin and a dichroism pigment.

(1-1) Polyvinyl Alcohol-Based Resin (Hereinafter, Also Referred to as "PVA-Based Resin")

The PVA-based resin is preferably a polymer material obtained by saponifying polyvinyl acetate, and may contain a component capable of copolymerizing with vinyl acetate such as unsaturated carboxylic acid, unsaturated sulfonic acid, an olefin, or a vinyl ether. In addition, a denatured PVA-based resin containing an acetoacetyl group, a sulfonic acid group, a carboxyl group, an oxyalkylene group, or the like can also be used.

Additionally, in the polarizer in the present invention, a polyvinyl alcohol-based resin film (PVA film) having a 1,2-glycol bonding amount of 1.5 mol % or less described in JP3021494B, a PVA film containing 500 or less particles of an optical foreign substance having a size of 5 µm or greater per 100 square centimeters described in JP2001-316492A, a PVA film having a hydrothermal cut-through temperature spot of 1.5° C. or lower in the TD direction of the film described in JP2002-030163A, and furthermore, a PVA film produced from a solution containing 1 mass % to 100 mass % of a polyvalent (trivalent to hexavalent) alcohol such as glycerine or a solution containing 15 mass % or more of a plasticizer described in JP1994-289225A (JP-H06-289225) can be preferably used.

Among the above-described materials, the polyvinyl alcohol-based resin used for the polarizer in the present invention is preferably saponified polyvinyl acetate from the viewpoint of producing costs. The degree of saponification of the polyvinyl acetate is not particularly limited, but is preferably, for example, 90% or more, more preferably 95% or more, and particularly preferably 99% or more.

The weight-average molecular weight of the polyvinyl alcohol-based resin used for the polarizer in the present invention is not particularly limited, but is preferably in a range of 100000 to 300000, more preferably in a range of 140000 to 260000, and particularly preferably in a range of 150000 to 200000.

(1-2) Dichroism Pigment

The polarizer in the present invention preferably includes a dichroism pigment. In the present specification, the dichroism pigment refers to a pigment having an absorbance which varies depending on the polarization direction, and examples thereof include an iodine ion, a diazo-based pigment, a quinone-based pigment, a well-known dichroism pigment, and the like. As the dichroism pigment, a high-order iodine ion such as $I_3^-$ or $I_5^-$ or a dichroism pigment can be preferably used.

In the present invention, the high-order iodine ion is particularly preferably used. The high-order iodine ion can be generated in a state in which the PVA is immersed in a liquid obtained by dissolving iodine in a potassium iodide aqueous solution and/or a boric acid aqueous solution, and the iodine is adsorbed to and oriented in the PVA as described in "The Application of the Polarization Plate", Nagata Ryo, CMC Publishing Co., Ltd. and Industrial Materials, Vol. 28, Issue 7, pp. 39 to 45.

(1-3) Film Thickness of Polarizer

In the present invention, the contractive force in the polarization plate can be maintained at a predetermined value by setting the film thickness of the polarizer to a predetermined value. From the above-described viewpoint, the film thickness of the polarizer in the present invention is preferably 30 µm or less, more preferably in a range of 1.5 to 20 µm, still more preferably in a range of 3 µm to 16 µm, and most preferably in a range of 4 µm to 10 µm.

The thicknesses of the polarizers used for the front side and rear side polarization plates are all preferably 30 µm or less.

When the film thickness of the polarizer is thicker than 30 µm, the contractive force in the polarization plate tends to increase, which may cause warp, light leakage and the like. In addition, an excessively thin film thickness of the polarizer also may cause light leakage and the like.

In addition, from the viewpoint of suppressing the contractive force in, particularly, the front side polarization plate, and reducing the difference (D−H) of the contractive force, the thickness of the polarizer used for the front side polarization plate is preferably thinner than the thickness of the polarizer used for the rear side polarization plate.

[Method for Producing Polarizer]

The method for producing the polarizer in the present invention, which includes the polyvinyl alcohol and iodine in the method for producing the polarizer in the present invention, is not particularly limited. For example, it is preferable to make the PVA into a film and then introduce iodine, thereby configuring the polarizer. A PVA film can be manufactured with reference to the method described in 0213 to 0237 in JP2007-86748A, the specification of JP3342516B, JP1997-328593A (JP-H09-328593A), JP2001-302817A, JP2002-144401A, and the like.

Among the above-described methods, the method for producing the polarizer in the present invention preferably includes a step of forming a film using a polyvinyl alcohol-based resin solution (hereinafter, also referred to as "PVA solution") including a polyvinyl alcohol-based resin, a step of stretching the polyvinyl alcohol-based resin film, and a step of dyeing the stretched polyvinyl alcohol-based resin film using the dichroism pigment.

Specifically, in the method for producing the polarizer, it is particularly preferable to carry out a PVA solution-preparation step, a flow casting step, a swelling step, a dyeing step, a film-hardening step, a stretching step, and a drying step in the described order. In addition, an online surface state inspection step may be provided in the middle of or after the above-described steps.

(Preparation of PVA Solution)

In the PVA solution preparation step, it is preferable to add a PVA-based resin to water under stirring, and prepare a raw liquid including the PVA-based resin dissolved in water or an organic solvent. The concentration of the PVA-based resin in the raw liquid is preferably in a range of 5 mass % to 20 mass %. In addition, a PVA-based resin wet cake having a water content ratio of approximately 40% may be temporarily prepared by dehydrating an obtained slurry. Furthermore, in a case in which an additive is added afterwards, a method in which the PVA-based resin wet cake is put into a dissolution bath, a plasticizer and water are added, and the components are stirred while water vapor is blown away from the bath bottom is preferred. The inside resin temperature is preferably heated to a temperature in a range of 50° C. to 150° C., and the inside of the system may be pressurized.

(Flow Casting)

As the flow casting step, a method in which a film is formed through the flow casting of the raw liquid (PVA solution) prepared above is generally and preferably used. There is no particular limitation regarding the method for flow casting, but it is preferable to supply the heated raw liquid to a twin screw extruder, and flow-cast the raw liquid on a supporter from discharging means (preferably a die, and more preferably a T-shaped slit die) using a gear pump, thereby forming a film. There is no particular limitation regarding the temperature of the resin solution discharged from the die.

The supporter is preferably a casting drum, and there is no particular limitation regarding the diameter, width, rotation speed, and surface temperature of the drum. The diameter (R1) of the casting drum is preferably in a range of 2000 mm to 5000 mm, more preferably in a range of 2500 mm to 4500 mm, and particularly preferably in a range of 3000 mm to 3500 mm.

The width of the casting drum is preferably in a range of 2 m to 6 m, more preferably in a range of 3 m to 5 m, and particularly preferably in a range of 4 m to 5 m.

The rotation speed of the casting drum is preferably in a range of 2 m/minute to 20 m/minute, more preferably in a range of 4 m/minute to 12 m/minute, and particularly preferably in a range of 5 m/minute to 10 m/minute.

The casting drum surface temperature of the casting drum is preferably in a range of 40° C. to 140° C., more preferably in a range of 60° C. to 120° C., and particularly preferably in a range of 80° C. to 100° C.

The resin temperature at the T-shaped slit die exit is preferably in a range of 40° C. to 140° C., more preferably in a range of 60° C. to 120° C., and particularly preferably in a range of 80° C. to 100° C.

After that, the back surface and front surface of the obtained roll are preferably dried by being alternately passed through a drying roll. There is no particular limitation regarding the diameter, width, rotation speed, and surface temperature of the drying roll. The diameter (R2) of the drying roll is preferably in a range of 200 mm to 450 mm, more preferably in a range of 250 mm to 400 mm, and particularly preferably in a range of 300 mm to 350 mm.

There is no particular limitation as well regarding the length of the obtained film, and it is possible to produce a long film having a length of 2000 m or longer, and preferably 4000 m or longer. The width of the film is also not particularly limited, and is preferably in a range of 2 m to 6 m, and more preferably in a range of 3 m to 5 m.

(Swelling)

The swelling step is preferably carried out using only water, but it is also possible to manage the degree of swelling of a PVA film by swelling the PVA film using a boric acid aqueous solution to stabilize the optical performance and avoid the generation of wrinkles in the PVA film in a manufacturing line as described in JP1998-153709A (JP-H10-153709A).

The temperature and time during the swelling step can be arbitrarily determined, but are preferably in a range of 10° C. to 60° C. and a range of 5 seconds to 2000 seconds respectively.

The film may be slightly stretched during the swelling step, and, for example, is preferably stretched 1.05 times to 1.5 times, and more preferably stretched approximately 1.3 times.

(Dyeing)

For the dyeing step, it is possible to use the method described in JP2002-86554A. As the dyeing method, not only immersion but also arbitrary means such as the application or spraying of iodine or a dye solution can be used. In addition, a method in which the film is dyed while stirring the concentration of iodine, the dyeing bath temperature, the stretching ratio in the bath, and the solution in the bath may be used as described in JP2002-290025A.

In a case in which a high-order iodine ion is used as the dichroism pigment, to obtain a high-contrast polarization plate, a liquid obtained by dissolving iodine in a potassium iodide aqueous solution is preferably used in the dyeing step. In this case, as the mass ratio between iodine and potassium iodide in the iodine-potassium iodide aqueous solution, the mass ratio described in JP2007-086748A can be adopted.

In addition, a boron-based compound such as boric acid or borax may be added to a dyeing solution as described in JP3145747B.

(Film Hardening)

In the film-hardening step, it is preferable to soak a crosslinking agent by immersing the PVA film in a crosslinking agent solution or applying the solution. In addition, it is also possible to carry out the film-hardening step several times as described in JP1999-52130A (JP-H11-52130A).

The crosslinking agent described in the specification of US RE232897E can be used as the crosslinking agent, and as described in JP3357109B, it is also possible to use a polyvalent aldehyde as the crosslinking agent to improve dimensional stability, but boric acid is most preferably used. In a case in which boric acid is used as the crosslinking agent used in the film-hardening step, a metal ion may be added to the boric acid-potassium iodide aqueous solution. The metal ion is preferably zinc chloride, and as described in JP2000-35512A, it is also possible to use halogenated zinc such as zinc iodide or a zinc salt such as zinc sulfate or zinc acetate instead of zinc chloride.

In addition, the film may be hardened by producing a boric acid-potassium iodide aqueous solution to which zinc chloride has been added, and immersing the PVA film in the solution, and the method described in JP2007-086748A can be used.

In the present invention, as means for maintaining the contractive force in the polarization plate at the above-described predetermined value, it is possible to appropriately adjust the film hardening conditions (the adjustment of the film hardening time and the like) of the polarizer.

(Stretching)

In the stretching step, the vertical uniaxial stretching method as described in the specification of U.S. Pat. No. 2,454,515A or the tenter method as described in JP2002-86554A can be preferably used. The stretching ratio is preferably in a range of two to twelve times, and more preferably in a range of three times to ten times. In addition, it is also possible to preferably set the relationship between the stretching ratio, the original fabric thickness, and the polarizer thickness to satisfy (the polarizer film thickness/the original fabric film thickness after the attachment of the protective film)×(the total stretching ratio)>0.17 which is described in JP2002-040256A or to set the relationship between the width of the polarizer when removed from the final bath and the polarizer width when the protective film is attached to satisfy 0.80≤(the polarizer width when the protective film is attached/the width of the polarizer when removed from the final bath)≤0.95 which is described in JP2002-040247A.

In the present invention, as means for maintaining the contractive force in the polarization plate at the above-described predetermined value, it is possible to appropriately adjust the stretching ratio.

(Drying)

In the drying step, the well-known method of JP2002-86554A can be used, the temperature range is preferably in a range of 30° C. to 100° C., and the drying time is preferably in a range of 30 seconds to 60 minutes. In addition, it is also possible to preferably carry out a thermal treatment so that the underwater discoloration temperature is set to 50° C. or higher as described in JP3148513B or to preferably carry out edging in an atmosphere in which the temperature and the humidity are managed as described in JP1995-325215A (JP-H07-325215) or JP1995-325218A (JP-H07-325218A).

(Coating-Type Polarizer)

The polarizer having a thin film thickness can be formed using a producing method in which the application method described in JP4691205B or JP4751481B is used.

It is preferable to manufacture a polarizer having a thickness in a range of 1.5 μm to 20 μm using the above-described steps.

The film thickness can be controlled using a well-known method, and, for example, the film thickness can be controlled by setting the die slit width or the stretching conditions in the flow casting step to appropriate values.

Hereinafter, two polarization plate protective films that can be used for the polarization plate in the present invention will be described in detail.

<Polarization Plate Protective Film>

Hereinafter, the preferable characteristics of a film base material resin, additives, and the polarization plate protective film used for the polarization plate protective film will be described.

(2-1) Film Base Material Resin

Next, the film base material resin used for the polarization plate protective film will be described.

A well-known resin can be used as the film base material resin used for the polarization plate protective film, and there is no particular limitation within the purpose of the present invention. Examples of the film base material resin include cellulose acylate, acryl resins, and cycloolefin-based resins. Among them, (meth)acryl resins or cellulose acylate resins are preferred. That is, the polarization plate protective film preferably includes a (meth)acryl resin or cellulose acylate.

[(Meth)Acryl-Based Resin Film]

A (meth)acryl-based resin film includes a (meth)acryl-based resin. The (meth)acryl-based resin film can be obtained by, for example, molding a molding material containing a resin component which contains the (meth)acryl-based resin as a main component through extrusion molding.

The glass transition temperature (Tg) of the (meth)acryl-based resin is preferably 115° C. or higher, more preferably 120° C. or higher, still more preferably 125° C. or higher, and particularly preferably 130° C. or higher. When the (meth)acryl-based resin film includes the (meth)acryl-based resin having a glass transition temperature (Tg) of 115° C. or higher as a main component, the durability can become excellent. The upper limit value of Tg of the (meth)acryl-based resin is not particularly limited, but is preferably 170° C. or lower from the viewpoint of moldabilty and the like.

As the (meth)acryl-based resin, an arbitrary appropriate (meth)acryl-based resin can be employed. Examples thereof include poly(meth)acrylic acid esters such as polymethylmethacrylate, methyl methacrylate-(meth)acrylic acid copolymers, methyl methacrylate-(meth)acrylic acid ester copolymers, methyl methacrylate-acrylic acid ester-(meth)acrylic acid copolymers, methyl(meth)acrylate-styrene copolymers (MS resins and the like), and polymers having an alicyclic hydrocarbon group (for example, methyl methacrylate-cyclohexyl methacrylate copolymers, methyl methacrylate-norbornene(meth)acrylate copolymers, and the like). The (meth)acryl-based resin is preferably polyalkyl(meth)acrylate C1-6 alkyl such as polymethyl methyl(meth)acrylate, and is more preferably a methylmethacrylic acid-based resin containing methyl methacrylate as a main component (50 mass % to 100 mass %, and preferably 70 mass % to 100 mass %).

Specific examples of the (meth)acryl-based resin include ACRYPET VH, ACRYPET VRL20A manufactured by Mitsubishi Rayon Co., Ltd., and (meth)acryl-based resins having a high Tg which is obtained from an intermolecular crosslinking or intermolecular cyclization reaction.

In the invention, the (meth)acryl-based resin is preferably a (meth)acryl-based resin having a glutaric anhydride structure, a (meth)acryl-based resin having a lactone ring structure, or a (meth)acryl-based resin having a glutalimide structure since these resins have high thermal resistance, high transparency, and high mechanical strength.

Examples of the (meth)acryl-based resin having a glutaric anhydride structure include the (meth)acryl-based resins having a glutaric anhydride structure described in JP2006-283013A, JP2006-335902A, JP2006-274118A, and the like.

Examples of the (meth)acryl-based resin having a lactone ring structure include the (meth)acryl-based resin having a lactone ring structure described in JP2000-230016A, JP2001-151814A, JP2002-120326A, JP2002-254544A, JP2005-146084A, and the like.

Examples of the (meth)acryl-based resin having a glutalimide structure include the (meth)acryl-based resin having a glutalimide structure described in JP2006-309033A, JP2006-317560A, JP2006-328329A, JP2006-328334A, JP2006-337491A, JP2006-337492A, JP2006-337493A, JP2006-337569A, JP2007-009182A, and the like.

The content of the (meth)acryl-based resin in the (meth)acryl-based resin film is preferably in a range of 50 mass % to 100 mass %, more preferably in a range of 50 mass % to 99 mass %, still more preferably in a range of 60 mass % to 98 mass %, and particularly preferably in a range of 70 mass % to 97 mass %. In a case in which the content of the (meth)acryl-based resin in the (meth)acryl-based resin film is less than 50 mass %, there is a concern that the original properties of the (meth)acryl-based resin such as high thermal resistance and high transparency may not be sufficiently reflected.

The content of the (meth)acryl-based resin in the molding material used to mold the (meth)acryl-based resin film is preferably in a range of 50 mass % to 100 mass %, more preferably in a range of 50 mass % to 99 mass %, still more preferably in a range of 60 mass % to 98 mass %, and particularly preferably in a range of 70 mass % to 97 mass %. In a case in which the content of the (meth)acryl-based resin in the molding material used to mold the (meth)acryl-based resin film is less than 50 mass %, there is a concern that the original properties of the (meth)acryl-based resin such as high thermal resistance and high transparency may not be sufficiently reflected.

The (meth)acryl-based resin film may include other thermoplastic resins in addition to the (meth)acryl-based resin, and examples of the other thermoplastic resins include olefin-based polymers such as polyethylene, polypropylene, ethylene-propylene copolymers, and poly(4-methyl-1-pentene); halogenated vinyl-based polymers such as vinyl chloride, vinylidene chloride, and chlorinated vinyl resins; acryl-based polymers such as methyl polymethacrylate, styrene-based polymers such as polystyrene, styrene-methyl methacrylate copolymers, styrene-acrylonitrile copolymers, and acrylonitrile-butadiene-styrene block copolymers; polyesters such as polyethylene terephthalate, polybutylene terephthalate, polyethylene naphthalate; polyamides such as nylon 6, nylon 66, and nylon 610; polyacetal; polycarbonate; polyphenylene oxide; polyphenylene sulfide; polyether ether ketone; polysulfone; polyether sulfone; polyoxybenzylene; polyamide imide; rubber polymers such as ABS resins or acrylonitrile-styrene-acrylate (ASA) resins including polybutadiene-based rubber or acryl-based rubber; and the like.

The content of other thermoplastic resins in the (meth)acryl-based resin film is preferably in a range of 0 mass % to 50 mass %, more preferably in a range of 0 mass % to 40 mass %, still more preferably in a range of 0 mass % to 30 mass %, and particularly preferably in a range of 0 mass % to 20 mass %.

The (meth)acryl-based resin film may also include additives. Examples of the additives include an antioxidant such as a hindered phenol-based antioxidant, a phosphorus-based antioxidant, or a sulfur-based antioxidant; a stabilizer such as a light-resistant stabilizer, a weather-resistant stabilizer, or a thermal resistant stabilizer; a reinforcing material such as a glass fiber or a carbon fiber; an ultraviolet absorber such as phenyl salicylate, (2,2'-hydroxy-5-methylphenyl)benzotriazole, or 2-hydroxybenzophenone; a near-infrared absorber; a flame retardant such as tris(dibromopropyl)phosphate, triallyl phosphate, or antimony oxide; an antistatic agent such as an anionic surfactant, a cationic surfactant, or a nonionic surfactant; a colorant such as an inorganic pigment, an organic pigment, or a dye; an organic filler or an inorganic filler; a resin reformer; an organic filler or an inorganic filler; a plasticizer; a lubricant; an antistatic agent; a flame retardant; a phase difference-reducing agent; and the like.

The content of the additives in the (meth)acryl-based resin film is preferably in a range of 0 mass % to 5 mass %, more preferably in a range of 0 mass % to 2 mass %, and still more preferably in a range of 0 mass % to 0.5 mass %.

There is no particular limitation regarding the method for producing the (meth)acryl-based resin film, and, for example, it is possible to sufficiently mix the (meth)acryl-based resin and other polymers, additives, or the like using an arbitrary appropriate mixing method so as to produce a thermoplastic resin composition in advance, and then mold the composition into a film. Alternately, it is also possible to produce separate solutions of the (meth)acryl-based resin and other polymers, additives, or the like, mix the solutions so as to produce a homogeneous mixed solution, and then mold the solution into a film.

To manufacture the thermoplastic resin composition, the above-described film raw material is pre-blended using an arbitrary appropriate mixer, for example, an omni mixer, and then the obtained mixture is extruded and kneaded. In this case, there is no particular limitation regarding the mixer used for the extrusion and kneading, and, for example, an arbitrary approximate mixer such as an extruder including a single screw extruder or a twin screw extruder, or a pressurization kneader can be used.

Examples of the method for molding the film include arbitrary appropriate molding methods such as a solution casting method (hereinafter, also referred to as "a solution flow casting method" or "a solvent casting method"), a melt extrusion method, a calendaring method, and a compression molding method. Among the above-described film-molding methods, the solution casting method (the solution flow casting method) and the melt extrusion method are preferred.

Examples of a solvent used in the solution casting method (solution flow casting method) include aromatic hydrocarbons such as benzene, toluene, and xylene; aliphatic hydrocarbons such as cyclohexane and decalin; esters such as ethyl acetate and butyl acetate; ketones such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethyl formamide; dimethyl sulfoxide; and the like. These solvents may be singly used, or two or more solvents may be jointly used.

Examples of an apparatus for carrying out the solution casting method (solution flow casting method) include a drum-type casting machine, a band-type casting machine, a spin coater, and the like.

Examples of the melt extrusion method include a T die method, an inflation method, and the like. The molding temperature is preferably in a range of 150° C. to 350° C., and more preferably in a range of 200° C. to 300° C.

In a case in which the film is molded using the T die method, it is possible to obtain a roll-shaped film by attaching a T die to the front end portion of a well-known uniaxial or twin screw extruder, and winding a film extruded into a film shape. At this time, it is also possible to uniaxially draw the film by appropriately adjusting the temperature of a winding roll, and stretching the film in the extrusion direction. In addition, it is also possible to simultaneously or sequentially draw the film biaxially by stretching the film in the extrusion direction and the perpendicular direction to the extrusion direction.

The (meth)acryl-based resin film may be any of an unstretched film or a drawn film. In a case in which the (meth)acryl-based resin film is a drawn film, the (meth)acryl-based resin film may be any of a uniaxially drawn film or a biaxially drawn film. In a case in which the (meth)acryl-based resin film is a biaxially stretched film, the (meth)acryl-based resin film may be any of a film that has been biaxially stretched at the same time or a film that has been biaxially stretched sequentially. In a case in which the film is biaxially stretched, the mechanical strength improves, and the film performance improves. When the (meth)acryl-based resin film is mixed with another thermoplastic resin, it is possible to suppress an increase in the phase difference even after stretching, and hold optical isotropy.

The stretching temperature is preferably near the glass transition temperature of the thermoplastic resin composition which is a raw material of the film, and specifically, is preferably in a range of (glass transition temperature−30° C.) to (glass transition temperature+100° C.), and more preferably in a range of (glass transition temperature−20° C.) to (glass transition temperature+80° C.). When the stretching temperature is lower than (glass transition temperature−30° C.), there is a concern that a sufficient stretching ratio may not be obtained. On the contrary, when the stretching temperature exceeds (glass transition temperature+100° C.), there is a concern that the flow of the resin composition may be caused, and it may be impossible to carry out stable stretching.

The stretching ratio that is defined as an area ratio is preferably in a range of 1.1 times to 25 times, and more preferably in a range of 1.3 times to 10 times. When the stretching ratio is less than 1.1 times, there is a concern that stretching may not improve toughness. When the stretching ratio exceeds 25 times, there is a concern that the effect of an increase in the stretching ratio may not be observed.

The stretching rate is, in one direction, preferably in a range of 10%/min to 20,000%/min, and more preferably in a range of 100%/min to 10,000%/min. When the stretching rate is less than 10%/min, there is a concern that it may take a long time to obtain a sufficient stretching ratio, and the producing cost may increase. When the stretching rate exceeds 20,000%/min, there is a concern that the stretched film may break.

To stabilize the optical isotropy or the mechanical characteristics, it is possible to subject the (meth)acryl-based resin film to a thermal treatment (annealing) or the like after the stretching treatment. As the conditions of the thermal treatment, arbitrary appropriate conditions can be employed.

The thickness of the (meth)acryl-based resin film is preferably in a range of 5 μm to 200 μm, and more preferably in a range of 10 μm to 100 μm. When the thickness is less than 5 μm, not only does the strength decrease, but there is a concern that, when a durability test of the polarization plate is carried out, the polarization plate may significantly crimp. When the thickness exceeds 200 μm, not only the transparence degrade, but there is a concern that the water vapor transmission rate may decrease, and, in a case in which an aqueous adhesive is used, the drying rate of water, which is a solvent thereof, may become slow.

The wetting tension on the surface of the (meth)acryl-based resin film is preferably 40 mN/m or more, more preferably 50 mN/m or more, and still more preferably 55 mN/m or more. When the wetting tension on the surface is at least 40 mN/m or more, the adhesive strength between the (meth)acryl-based resin film and the polarizer further improves. To adjust the wetting tension on the surface, it is possible to carry out an arbitrary appropriate surface treatment. Examples of the surface treatment include a corona discharge treatment, a plasma treatment, ozone blowing, ultraviolet radiation, a flame treatment, and a chemical agent treatment. Among the above-described treatments, the corona discharge treatment and the plasma treatment are preferred.

(Cellulose Acylate)

Hereinafter, cellulose acylate which can be used for the present invention will be described in detail.

The degree of substitution of cellulose acylate refers to the ratio of acylated hydroxyl groups to three hydroxyl groups present in the structural unit ((β-)1,4-glycoside-bonded glucose) of cellulose. The degree of substitution (degree of acylation) can be computed by measuring the amount of bonded fatty acid per structural unit mass of cellulose. In the present invention, the degree of substitution of a cellulose body can be computed from the peak intensity ratio of carbonyl carbon in an acyl group by dissolving the cellulose body in a solvent such as deuterium-substituted dimethyl sulfoxide, and measuring a $^{13}$C-NMR spectrum. The degree of substitution can be obtained by substituting the residual hydroxyl group of cellulose acylate by another acyl group that is different from the acyl group originally included in cellulose acylate, and measuring a $^{13}$C-NMR. The detail of the measurement method is described in Tezuka et al. (Carbohydrate. Res., 273 (1995) 83 to 91).

The total degree of acyl substitution of the cellulose acylate which can be used for the present invention is preferably in a range of 2.0 to 2.97, more preferably in a range of 2.2 to 2.95, and particularly preferably in a range of 2.3 to 2.95.

The acyl group in the cellulose acylate which can be used for the present invention is particularly preferably an acetyl group, a propionyl group, or a butyryl group, and is more particularly preferably an acetyl group.

A mixed fatty acid ester made of two or more kinds of acyl groups can also be preferably used as the cellulose acylate in the invention. In this case as well, the acyl group is preferably an acetyl group and an acyl group having 3 to 4 carbon atoms. In a case in which the mixed fatty acid ester is used, the degree of substitution of the acetyl group is preferably less than 2.5, and more preferably less than 1.9. Meanwhile, the degree of substitution of the acyl group having 3 to 4 carbon atoms is preferably in a range of 0.1 to 1.5, more preferably in a range of 0.2 to 1.2, and particularly preferably in a range of 0.5 to 1.1.

The polarization plate protective film in the present invention may be formed by jointly using or mixing two kinds of cellulose acylates having different substituents and/or degrees of substitution, and may be a film having multiple layers made of different cellulose acylates produced using a co-flow casting method described below.

Furthermore, a mixed acid ester having the fatty acid acyl group described in 0023 to 0038 of JP2008-20896A and a substituted or unsubstituted aromatic acyl group can also be preferably used in the present invention.

The cellulose acylate used for the present invention preferably has a mass-average polymerization degree in a range of 250 to 800, and more preferably has a mass-average polymerization degree in a range of 300 to 600. In addition, the cellulose acylate used for the present invention preferably has a number-average molecular weight in a range of 70000 to 230000, more preferably has a number-average molecular weight in a range of 75000 to 230000, and most preferably has a number-average molecular weight in a range of 78000 to 120000.

The cellulose acylate used for the present invention can be synthesized using an acid anhydride or an acid chloride as an acylation agent. In a case in which the acylation agent is an acid anhydride, an organic acid (for example, acetic acid) or methylene chloride is used as a reaction solvent. In addition, a protonic catalyst such as sulfuric acid can be used as a catalyst. In a case in which the acylation agent is an acid chloride, a basic compound can be used as the catalyst. In a synthesis method that is most ordinary in an industrial sense, the cellulose ester is synthesized by esterification of cellulose using a mixed organic acid component containing an organic acid (acetic acid, propionic acid, or butyric acid) or an acid anhydride thereof (acetic acid anhydride, propionic acid anhydride, or butyric anhydride) corresponding to the acetyl group and the other acyl group.

In the above-described method, cellulose such as a cotton linter or wood pulp is, in many cases, activated using an organic acid such as acetic acid, and then is esterified in the presence of a sulfuric acid catalyst using a liquid mixture of the above-described organic acid component. It is common to use an excessive amount of the organic acid anhydride component compared with the amount of a hydroxyl group present in cellulose. In the esterification treatment, a hydrolysis reaction (depolymerization reaction) of a cellulose main chain (β-)1,4-glycoside-bond) as well as the esterification reaction occurs. As the hydrolysis reaction of the main chain proceeds, the polymerization degree of the cellulose ester decreases, and the properties of a cellulose ester film being produced degrade. Therefore, the reaction conditions such as a reaction temperature are preferably determined in consideration of the polymerization degree or molecular weight of a cellulose ester being obtained.

(2-2) Additives

The polarization plate protective film may include an organic acid or other well-known additives used for the polarization plate protective film within the scope of the purpose of the present invention.

When the organic acid used in the present invention is jointly used with cellulose acylate having a total degree of acyl substitution in the above-described preferable range, a strong effect that improves the durability of the polarization plate can be obtained.

(2-3) Characteristics of Polarization Plate Protective Film

The polarization plate protective film preferably satisfies the following characteristics.

Here, the two polarization plate protective films used for the polarization plate in the present invention may be the same polarization plate protective film or different polarization plate protective films.

As the polarization plate protective film, a commercially available cellulose triacetate film (FUJITAC TD60, manufactured by Fujifilm Corporation), the alicyclic structure-containing polymer resin film described in JP2006-58322A, the acryl-based resin described in JP2009-122644A, and the like can be preferably used.

(Thickness of Polarization Plate Protective Film)

The thickness of the polarization plate protective film is preferably in a range of 5 to 80 µm, more preferably in a range of 10 µm to 70 µm, and still more preferably in a range of 15 µm to 60 µm.

From the viewpoint of controlling the contractive force in the polarization plate to a preferable value, the thicknesses of the protective films used for the front side and rear side polarization plates are all preferably 50 µm or less.

From the viewpoint of controlling the contractive force in the polarization plate to a preferable value and suppressing the warpage of the panel, the thickness of the protective film used for the front side polarization plate is preferably thinner than the thickness of the protective film used for the rear side polarization plate.

(Humidity Dimensional Change Ratio (%) of Polarization Plate Protective Film)

From the viewpoint of adjusting the contractive force in the polarization plate to a preferable value, it is possible to appropriately adjust the humidity dimensional change ratio of the front side polarization plate in the absorption axis direction of the polarization plate protective film and the humidity dimensional change ratio of the rear side polarization plate in the transmission axis direction of the protective film.

The humidity dimensional change ratio of the front side polarization plate in the absorption axis direction of the polarization plate protective film and the humidity dimensional change ratio of the rear side polarization plate in the transmission axis direction of the protective film can be respectively measured using the same method as the above-described method for measuring the humidity dimensional change ratio in the absorption axis direction of the front side polarization plate and the humidity dimensional change ratio in the transmission axis direction of the rear side polarization plate.

In addition, the elastic moduli (GPa) in the absorption axis (MD) direction and transmission axis (TD) direction of the respective polarization plate protective films can also be measured using the same method for measuring the elastic moduli in the absorption axis (MD) direction and transmission axis (TD) direction of the respective polarization plates.

(Water Vapor Transmission Rate of Polarization Plate Protective Film)

When the polarization plate protective film having a low water vapor transmission rate is used, it is possible to decrease the dehydration rate of the polarization plate, and decrease the apparent contractive force in the polarization plate. Warp caused over time when the liquid crystal display that has been placed in a high-humidity environment is left to stand at room temperature is caused by the difference in the dehydration rate between the front side polarization plate and the rear side polarization plate being left to stand at room temperature. To improve the warp, it is preferable to decrease the water vapor transmission rate of the polarization plate protective film on a surface of the front side polarization plate that is not attached to the liquid crystal cell. It is more preferable to decrease the water vapor transmission rate of the polarization plate protective films on surfaces of the front side polarization plate and the rear side polarization plate that are not attached to the liquid crystal cell. The water vapor transmission rate of the polarization plate protective film is preferably 100 g/m$^2$·day or less, more preferably 65 g/m$^2$·day or less, still more preferably 25 g/m$^2$·day or less, and particularly preferably 10 g/m$^2$·day or less.

In the present specification, the value of the water vapor transmission rate is a value obtained by measuring the weight (g) of water vapor passing through a specimen having an area of one square meter for 24 hours in an atmosphere having a temperature of 40° C. and a relative humidity of 92% according to the water vapor transmission test (cup method) of JIS Z0208.

On the other hand, from the viewpoint of the drying rate during the producing of the polarization plate, the water vapor transmission rate of either or both polarization plate protective films is preferably 10 g/m$^2$·day or more. The water vapor transmission rate of the polarization plate protective film is more preferably in a range of 10 g/m$^2$·day to 2000 g/m$^2$·day, still more preferably in a range of 50 g/m$^2$·day to 1500 g/m$^2$·day, and particularly preferably in a range of 100 g/m$^2$·day to 1000 g/m$^2$·day.

[Method for Producing Polarization Plate]

The method for producing the polarization plate in the present invention is not particularly limited, and it is possible to employ other well-known steps.

Hereinafter, the method for producing the polarization plate in the present invention will be described in the order of the method for producing the polarization plate protective film, the method for laminating the polarization plate protective film and the polarizer, and the functionalization of the polarization plate.

<Method for Producing Polarization Plate Protective Film>

The polarization plate protective film can be manufactured using the solvent casting method. Hereinafter, regarding the method for producing the polarization plate protective film, an aspect in which the cellulose acylate is used as the film base material resin will be described as an example, but the polarization plate protective film can be similarly manufactured using other resins. In the solvent casting method, the film is manufactured using a solution (hereinafter, also referred to as "cellulose acylate solution" or "dope") obtained by dissolving the cellulose acylate in the organic solvent.

The organic solvent preferably includes a solvent selected from ethers having 3 to 12 carbon atoms, ketones having 3 to 12 carbon atoms, esters having 3 to 12 carbon atoms, and halogenated hydrocarbons having 1 to 6 carbon atoms.

The ethers, the ketones, and the esters may have a cyclic structure. In addition, a compound having two or more functional groups (any of the functional groups of ethers, ketones, and esters, that is, —O—, —CO—, and —COO—) can be used as the organic solvent. The organic solvent may have other functional groups such as an alcoholic hydroxyl group. In the case of an organic solvent having two or more kinds of functional groups, the number of carbon atoms is preferably within the above-described preferable range of carbon atoms in the solvent having any of the above-described functional groups.

Examples of the ethers having 3 to 12 carbon atoms include diisopropyl ether, dimethoxy methane, dimethoxy ethane, 1,4-dioxane, 1,3-dioxolane, tetrahydrofuran, anisole, and phenetole.

Examples of the ketones having 3 to 12 carbon atoms include acetone, methyl ethyl ketone, diethyl ketone, diisobutyl ketone, cyclohexanone, and methyl cyclohexanone.

Examples of the esters having 3 to 12 carbon atoms include ethyl formate, propyl formate, bentyl formate, methyl acetate, ethyl acetate, and pentyl acetate.

In addition, examples of the organic solvent having two or more kinds of functional groups include 2-ethoxy ethyl acetate, 2-methoxy ethanol, and 2-buthoxy ethanol.

The number of carbon atoms in the halogenated hydrocarbon having 1 to 6 carbon atoms is preferably one or two, and most preferably one. The halogen in the halogenated hydrocarbon is preferably chlorine. The ratio of hydrogen atoms in the halogenated hydrocarbon substituted by the halogen is preferably in a range of 25 mol % to 75 mol %, more preferably in a range of 30 mol % to 70 mol %, still more preferably in a range of 35 mol % to 65 mol %, and most preferably in a range of 40 mol % to 60 mol %. Methylene chloride is a typical halogenated hydrocarbon.

In addition, two or more kinds of organic solvents may be used in a mixture form.

The cellulose acylate solution (dope) can be prepared using an ordinary method including a treatment at a temperature of 0° C. or higher (room temperature or a high temperature). The cellulose acylate solution can be prepared using a method and an apparatus for preparing the dope in an ordinary solvent casting method. Meanwhile, in the case of an ordinary method, the halogenated hydrocarbon (particularly, methylene chloride) is preferably used as the organic solvent.

The amount of the cellulose acylate in the cellulose acylate solution is adjusted so that the cellulose acylate is included in the solution being obtained in a range of 10 mass % to 40 mass %. The amount of the cellulose acylate is more preferably in a range of 10 mass % to 30 mass %, and arbitrary additives described below may be added to the organic solvent (main solvent).

The cellulose acylate solution can be prepared by stirring the cellulose acylate and the organic solvent at room temperature (0° C. to 40° C.). A high-concentration solution may be prepared through stirring under pressurization and heating conditions. Specifically, the cellulose acylate and the organic solvent are put into a pressurization container, are sealed, and are stirred under heating to a temperature that is the boiling point or higher of the solvent at room temperature under pressurization and is in a range in which the solvent is not boiled. The heating temperature is generally 40° C. or higher, preferably in a range of 60° C. to 200° C., and more preferably in a range of 80° C. to 110° C.

The respective components may be coarsely mixed in advance, and then be put into the container. In addition, the components may be sequentially injected into the container. The container needs to be configured so that the components can be stirred. It is possible to infuse an inert gas such as nitrogen gas and pressurize the container. In addition, an increase in the water vapor of the solvent through heating may be used. Alternately, after the container is sealed, the respective components may be added under pressure.

In a case in which the container is heated, it is preferable to heat the container from the outside. For example, a jacket-type heating apparatus can be used. In addition, it is also possible to heat the entire container by providing a plate heater at the outside of the container, and circulating a liquid through a pipe.

The components are preferably stirred using stirring blades that are provided inside the container. The stirring blades preferably have an enough length so as to reach the vicinity of the container wall. A scraping blade is preferably provided at the end of the stirring blade to renew a liquid film on the container wall.

Gauges such as a pressure meter and a thermometer may be installed in the container. The respective components are dissolved in the solvent in the container. The prepared dope is cooled and removed from the container, or is removed and then cooled using a heat exchanger or the like.

It is also possible to prepare the cellulose acylate solution using a cooling and dissolving method. Regarding the detail of the cooling and dissolving method, the technique described in 0115 to 0122 of JP2007-86748A can be used.

The cellulose acylate film is manufactured from the prepared cellulose acylate solution (dope) using the solvent casting method. A retardation developer (hereinafter, also referred to as "Re developer") is preferably added to the dope. The dope is flow-cast on a drum or a band, and a film is formed by evaporating the solvent. The concentration of the dope before the flow casting is preferably adjusted so that the amount of the solid content is in a range of 18% to 35%. The surface of the drum or the band is preferably prepared in a mirror-like state. The dope is preferably flow-cast on the drum or the band having a surface temperature of 10° C. or lower.

Regarding the drying method in the solvent casting method, there are descriptions in individual specifications of U.S. Pat. No. 2,336,310A, U.S. Pat. No. 2,367,603A, U.S. Pat. No. 2,492,078A, U.S. Pat. No. 2,492,977A, U.S. Pat. No. 2,492,978A, U.S. Pat. No. 2,607,704A, U.S. Pat. No. 2,739,069A, and U.S. Pat. No. 2,739,070A, individual specifications of UK640731A and UK736892A, JP1970-4554B (JP-S45-4554B), JP1974-5614B (JP-S49-5614B), JP1985-176834A (JP-S60-176834A), JP1985-203430A (JP-S60-203430A), and JP1987-115035A (JP-S62-115035A). The solution can be dried on the band or the drum by blowing an inert gas such as air or nitrogen.

In addition, it is also possible to evaporate the residual solvent by stripping the obtained film from the drum or the band, and drying the film using high-temperature wind having a temperature that has been sequentially changed in a range of 100° C. to 160° C. The above-described method is described in JP1993-17844B (JP-H05-17844B). According to this method, it is possible to shorten the time from the flow casting to the stripping. To carry out the invention, the gelation of the dope at the surface temperature of the drum or the band during the flow casting is required.

It is also possible to flow-cast the prepared cellulose acylate solution (dope) in two or more layers, thereby producing films. In this case, the cellulose acylate film is preferably produced using the solvent casting method. The film is formed by flow-casting the dope on the drum or the band, and evaporating the solvent. The concentration of the dope before the flow casting is preferably adjusted so that the amount of the solid content is in a range of 10 mass % to 40 mass %. The surface of the drum or the band is preferably in a mirror-like state at the end.

In a case in which multiple cellulose acylate solutions are flow-cast in two or more layers, multiple cellulose acylate solutions can be flow-cast, and it is also possible to produce a film while a solution including the cellulose acylate is flow-cast from multiple flow casting openings provided at intervals in a support body-advancing direction, and is laminated. In this case, the methods described in, for example, JP1986-158414A (JP-S61-158414A), JP1989-122419A (JP-H01-122419A), and JP1999-198285A (JP-H11-198285A) can be used. In addition, it is also possible to produce a film by flow-casting the cellulose acylate solution from two flow casting openings. In this case, the methods described in, for example, JP1985-27562B (JP-S60-27562B), JP1986-94724A (JP-S61-94724A), JP1986-947245A (JP-S61-947245A), JP1986-104813A (JP-S61-104813A), JP1986-158413A (JP-S61-158413A) and JP1994-134933A (JP-H06-134933A) can be used. Furthermore, it is also possible to use a flow casting method of a cellulose acylate film in which the flow of a high-viscosity cellulose acylate solution described in JP1981-162617A (JP-S56-162617A) is encapsulated using a low-viscosity cellulose acylate solution, and the high and low-viscosity cellulose acylate solutions are extracted at the same time.

In addition, it is also possible to produce a film by using two flow casting openings, stripping a film formed on a support from a first flow casting opening, and carrying out second flow casting on a side that is in contact with the support surface. Examples of this method include the method described in JP1969-20235B (JP-S44-20235B).

As the cellulose acylate solutions to be flow-cast, the same solution may be used, or two or more different cellulose solutions may be used. To provide multiple functions to multiple cellulose acylate layers, it is necessary to extrude cellulose acylate solutions having corresponding functions from individual flow casting openings. Furthermore, it is also possible to flow-cast the cellulose acylate solution in the present invention together with cellulose acylate solutions for other functional layers (for example, an adhesive layer, a dyeing layer, an antistatic layer, an anti-halation layer, an ultraviolet-absorbing layer, a polarization layer, and the like) at the same time.

Deterioration inhibitors (for example, an antioxidant, a peroxide decomposer, a radical inhibitor, a metal deactivator, an acid-trapping agent, an amine, and the like) may be added to the polarization plate protective film. The deterioration inhibitors are described in JP1991-199201A (JP-H03-199201A), JP1993-1907073A (JP-H05-1907073A), JP1993-194789A (JP-H05-194789A), JP1993-271471A (JP-H05-271471A), and JP1994-107854A (JP-H06-107854A). In addition, the amount of the deterioration inhibitors added is preferably in a range of 0.01 mass % to 1 mass %, and more preferably in a range of 0.01 mass % to 0.2 mass % of the solution being prepared (dope). When the amount of the deterioration inhibitor added is 0.01 mass % or more, the effect of the deterioration inhibitors is sufficiently exhibited, which is preferable. When the amount of the deterioration inhibitor added is 1 mass % or less, the deterioration inhibitors do not easily bleed out on the film surface, which is preferable. Particularly preferable deterioration inhibitors include butylated hydroxytoluene (BHT), tribenzylamine (TBA), and the like.

In addition, it is preferable to add fine particles to the polarization plate protective film as a matting agent. Examples of the fine particles used in the present invention include silicon dioxide, titanium dioxide, aluminum oxide, zirconium oxide, calcium carbonate, talc, clay, fired kaolin, fired calcium silicate, hydrated calcium silicate, aluminum silicate, magnesium silicate, and calcium phosphate. Fine particles containing silicon are preferred since the turbidity decreases, and silicon dioxide is particularly preferred. Silicon dioxide fine particles preferably have an average primary particle diameter of 20 nm or less, and have an apparent specific gravity of 70 g/liter or more. The apparent specific gravity is preferably in a range of 90 g/liter to 200 g/liter, and more preferably in a range of 100 g/liter to 200 g/liter. The apparent specific gravity is preferably higher since it becomes possible to produce a higher-concentration dispersion fluid, and the haze and an aggregate becomes more favorable.

Generally, these fine particles form secondary particles having an average particle diameter in a range of 0.1 µm to 3.0 µm, are present in the film in a form of an aggregate of the primary particles, and form 0.1 µm to 3.0 µm protrusions and recesses on the film surface. The average secondary particle diameter is preferably in a range of 0.2 µm to 1.5 µm, more preferably in a range of 0.4 µm to 1.2 µm, and most preferably in a range of 0.6 µm to 1.1 µm. The primary particle diameter and the secondary particle diameter were obtained by observing particles in the film using a scanning electron microscope, and measuring the diameters of the circumscribed circles of the particles as the particle diameters. In addition, 200 particles were observed at a different position, and the average value thereof was obtained as the average particle diameter.

As the silicon dioxide fine particles, for example, commercially available products such as AEROSIL R972, R972V, R974, R812, 200, 200V, 300, R202, OX50, TT600 (all manufactured by Nippon Aerosil Co., Ltd.), and the like can be used. Zirconium oxide fine particles have been put into commercial use under the product name of AEROSIL R976 and R811 (all manufactured by Nippon Aerosil Co., Ltd.), and can be used.

Among the above-described fine particles, AEROSIL 200V and AEROSIL R972V are particularly preferred since these fine particles are silicon dioxide fine particles having an average primary particle diameter of 20 nm or less and an apparent specific gravity of 70 g/liter or more, and has a strong effect that reduces the friction coefficient while maintaining the turbidity of an optical film at a low level.

To obtain a polarization plate protective film including particles with a small average secondary particle diameter in the present invention, several methods for preparing a dispersion fluid of the fine particles can be considered. For example, there is a method in which a fine particle dispersion fluid in which a solvent and fine particles have been stirred and mixed together is prepared in advance, the fine particle dispersion fluid is added to a small amount of a separately-prepared cellulose acylate solution, and is dissolved through stirring, and furthermore, the solution is mixed with a main cellulose acylate solution (dope solution). This method is a preferable preparation method since the dispersion property of silicon dioxide fine particles is favorable, and the additional re-aggregation of the silicon dioxide fine particles is not easily allowed. Furthermore, there is another method in which a small amount of the cellulose ester is added to a solvent, is dissolved through stirring, then, fine particles are added to the solution, are dispersed using a disperser so as to produce a fine particle-added solution, and the fine particle-added solution is sufficiently mixed with the dope solution using an inline mixer. The present invention is not limited to this method, and the concentration of the silicon dioxide when the silicon dioxide fine particles are mixed and dispersed in a solvent or the like is preferably in a range of 5 mass % to 30 mass %, more preferably in a range of 10 mass % to 25 mass %, and most preferably in a range of 15 mass % to 20 mass %. The dispersion concentration is preferably higher since the degree of turbidity becomes low in relation to the amount of the fine particles added, and the haze and an aggregate become more favorable. The amount of matting agent fine particles added to the dope solution of the final cellulose acylate is preferably in a range of 0.01 g to 1.0 g, more preferably in a range of 0.03 g to 0.3 g, and most preferably in a range of 0.08 g to 0.16 g per cubic meter.

Preferable examples of lower alcohols as the solvent being used include methyl alcohol, ethyl alcohol, propyl alcohol, isopropyl alcohol, butyl alcohol, and the like. There is no particular limitation regarding solvents other than the lower alcohols, and the solvent used during the formation of the cellulose ester film is preferably used.

The steps from the flow casting to the later drying may be carried out in an air atmosphere or in an atmosphere of an inert gas such as nitrogen gas. An ordinarily-used winder may be used as the winder used to manufacture the polarization plate protective film in the present invention, and the protective film can be wound using a winding method such as a positive tension method, a positive torque method, a taper tension method, or a program tension control method having a constant inner stress.

(Stretching Treatment)

It is also possible to carry out a stretching treatment on the polarization plate protective film. The stretching treatment enables the imparting of a desired retardation to the polarization plate protective film. Any of the width direction and the lengthwise direction is preferred as the stretching direction of the cellulose acylate film.

The method for stretching the polarization plate protective film in the width direction is described in, for example, JP1987-115035A (JP-S62-115035A), JP1992-152125A (JP-H04-152125A), JP1992-284211A (JP-H04-284211A), JP1992-298310A (JP-H04-298310A), JP1999-48271A (JP-H11-48271A), and the like.

The film is stretched under heating conditions. The film can be stretched through a treatment during drying, which is effective particularly in a case in which the solvent remains. In the case of stretching in the lengthwise direction, for example, when the winding rate of the film is set to be faster than the stripping rate of the film by adjusting the speed of the conveyance roller of the film, the film is stretched. In the case of stretching in the width direction, the film can be stretched by conveying the film with the width of the film held using a tenter, and gradually increasing the width of the tenter. It is also possible to stretch the film using a drawer (preferably uniaxial stretching using a long drawer) after the drying of the film.

The polarization plate protective film is preferably stretched, using the glass transition temperature Tg of the polarization plate protective film, at a temperature in a range of (Tg−5° C.) to (Tg+40° C.), more preferably stretched at a temperature in a range of Tg to (Tg+35° C.), and particularly preferably stretched at a temperature in a range of (Tg+10° C.) to (Tg+30° C.). The polarization plate protective film is preferably dried at a temperature in a range of 130° C. to 200° C.

In addition, in a case in which the polarization plate protective film is stretched in a state in which the dope solvent remains after the flow casting, it becomes possible to stretch the polarization plate protective film at a temperature lower than the temperature for drying, and in this case, the temperature is preferably in a range of 100° C. to 170° C.

The stretching ratio (the extension ratio to the unstretched film) of the polarization plate protective film is preferably in a range of 1% to 200%, and more preferably in a range of 5% to 150%. Particularly, the stretching ratio of the polarization plate protective film in the width direction is preferably in a range of 1% to 200%, more preferably in a range of 5% to 150%, and particularly preferably in a range of 30% to 45%.

The stretching rate is preferably in a range of 1%/minute to 300%/minute, more preferably in a range of 10%/minute to 300%/minute, and most preferably in a range of 30%/minute to 300%/minute.

In addition, the polarization plate protective film is preferably manufactured through a step in which the polarization plate protective film is stretched to the maximum stretching ratio, and then is held for a certain period of time at a stretching ratio lower than the maximum stretching ratio (hereinafter, in some cases, referred to as "alleviation step"). The stretching ratio in the alleviation step is preferably in a range of 50% to 99%, more preferably in a range of 70% to 97%, and most preferably in a range of 90% to 95% of the maximum stretching ratio. In addition, the time of the alleviation step is preferably in a range of 1 second to 120 seconds, and more preferably in a range of 5 seconds to 100 seconds.

Furthermore, the polarization plate protective film can be preferably manufactured by including a shrinkage step in which the film is shrunk while being gripped in the width direction.

In a producing method including the stretching step in which the film is stretched in the width direction and the shrinkage step in which the film is shrunk in the conveyance direction (lengthwise direction), the film can be shrunk by holding the film using a pantagraph-type or linear motor-type tenter, and gradually narrowing the intervals between clips in the conveyance direction while stretching the film in the width direction.

In the above-described method, it is possible to carry out at least a part of the stretching step and the shrinkage step at the same time.

Meanwhile, as the stretching apparatus that specifically carries out a step in which the film is stretched in any one of the lengthwise direction and the width direction, simultaneously, is shrunk in the other direction, thereby increasing the film thickness of the film (in other words, a stretching and shrinkage step), a FITZ machine manufactured by Ichikin Co., Ltd. or the like can be desirably used. This machine is described in (JP2001-38802A).

Regarding the stretching ratio in the stretching step and the shrinkage ratio in the shrinkage step, arbitrary appropriate values can be selected from the intended values of the in-plane retardation Re and the thickness wise retardation Rth, and the stretching ratio in the stretching step is preferably 10% or more, and the shrinkage ratio in the shrinkage step is preferably 5% or more.

Particularly, it is preferable to include the stretching step in which the film is stretched in the width direction of the film 10% or more and the shrinkage step in which the film is shrunk in the conveyance direction 5% or more while the film is gripped in the width direction of the film.

Meanwhile, the shrinkage ratio mentioned in the present invention refers to the ratio of the shrunk length of the shrunk film in the shrinkage direction to the length of the non-shrunk film.

The shrinkage ratio is preferably in a range of 5% to 40%, and particularly preferably in a range of 10% to 30%.

(Saponification Treatment)

When an alkali saponification treatment is carried out on the polarization plate protective films, the adhesiveness to the material of the polarizer such as polyvinyl alcohol is supplied, and the film can be used as the polarization plate protective film.

As the saponification method, the method described in 0211 and 0212 of JP2007-86748A can be used.

For example, the alkali saponification treatment on the polarization plate protective films is preferably carried out in a cycle in which the film surface is immersed in an alkali solution, then, is neutralized using an acidic solution, is washed using water, and is dried. Examples of the alkali solution include a potassium hydroxide solution and a sodium hydroxide solution. The concentration of a hydroxylated ion is preferably in a range of 0.1 mol/L to 5.0 mol/L, and more preferably in a range of 0.5 mol/L to 4.0 mol/L. The temperature of the alkali solution is preferably in a range of room temperature to 90° C., and more preferably in a range of 40° C. to 70° C.

Instead of the alkali saponification treatment, an easy adhesion process as described in JP1994-94915A (JP-H06-94915A) and JP1994-118232A (JP-H06-118232A) may be carried out.

<Method for Laminating Polarizer and Polarization Plate Protective Film>

The method for producing the polarization plate in the present invention preferably includes a step in which two polarization plate protective films are laminated on both surfaces of the polarizer obtained above.

An adhesive is used for lamination. Examples of the adhesive include an isocyanate-based adhesive, a polyvinyl alcohol-based adhesive, an epoxy-based adhesive, a gelatin-based adhesive, a vinyl-based latex, a water-based polyester, and the like. Among the above-descried adhesives, the polyvinyl alcohol-based adhesive having excellent transparency, adhesiveness, operability, product qualities, and economic efficiency is preferably used.

It is possible to preferably use a solventless active energy ray-curable composition containing an alicyclic epoxy compound (hereinafter, in some cases, also referred to simply as "epoxy-based adhesive composition") since a drying step of the adhesive after attachment, which will be described below, is not required. The use of the solventless active energy ray-curable composition containing an alicyclic epoxy compound enables to improve the durability of the polarization plate in a strict environment and improve the productivity which results from the unnecessity of the step of drying the adhesive.

Here, the alicyclic epoxy compound refers to a compound directly having an epoxy group in the ring of a saturated cyclic compound and a compound directly having a glycidyl ether group or a glycidyl group in the ring of a saturated cyclic compound. The alicyclic epoxy compound may have other epoxy groups in the structure.

The alicyclic epoxy compound directly having an epoxy group in the ring of a saturated cyclic compound can be procured using, for example, the methods described in 0074 to 0081 of JP2010-091603A.

Specific examples of the alicyclic epoxy compound directly having an epoxy group in the ring of a saturated cyclic compound that can be preferably used in the present invention include 3,4-epoxycyclohexylmethyl 3,4-epoxycychlohexane carboxylate, 1,2-epoxy-4-vinylcyclohexane, 1,2-epoxy-1-methyl-4-(1-methylepoxyethyl)cyclohexane, 3,4-epoxycyclohexylmethyl methacrylate, 4-(1,2-epoxyethyl)-1,2-epoxycylochexane adducts of 2,2-bis(hydroxymethyl)-1-butanol, ethylene bis(3,4-epoxycyclohexane carboxylate), oxydiethylene bis(3,4-epoxycyclohexane carboxylate), 1,4-cyclohexanedimethyl bis(3,4-epoxycyclohexane carboxylate) and 3-(3,4-epoxycyclohexyl methoxycarbonyl)propyl 3,4-epoxycyclohexane carboxylate, and the like.

The alicyclic epoxy compound directly having a glycidyl ether group or a glycidyl group in the ring of a saturated cyclic compound can be procured using, for example, the methods described in 0083 to 0086 of JP2010-091603A.

Among the above-described alicyclic epoxy compounds, 3,4-epoxycyclohexylmethyl 3,4-epoxycychlohexane carboxylate and hydrogenated compounds of a glycidyl ether compound of bisphenol A are preferred, and 3,4-epoxycyclohexylmethyl 3,4-epoxycychlohexane carboxylate is more preferred since these compounds exhibit favorable cured substance characteristics or have appropriate curing properties in improving the durability of the polarization plate, and can be procured at a relatively low cost.

In addition, each of the alicyclic epoxy compounds may be singly used, or two or more alicyclic epoxy compounds may be used in a mixture form.

The alicyclic epoxy compounds can be easily procured from commercially available products, and examples thereof include "CELLOXIDE", "CYCLOMER" (all manufactured by Daicel Corporation), "CYRACURE" (manufactured by The Dow Chemical Company), and the like, all of which are trade names.

In the present invention, it is possible to blend an active energy ray-curable compound other than the alicyclic epoxy compound into the epoxy-based adhesive composition. An epoxy compound other than the alicyclic epoxy compound can be used as the above-described active energy ray-curable compound. The joint use of the epoxy compound other than the above-described alicyclic epoxy compound enables to improve the adhesiveness between the polarizer and the polarization plate protective film.

The epoxy compound other than the above-described alicyclic epoxy compound, oligomers thereof, and the like can be easily procured from commercially available products, and examples thereof include "EPICOAT" (manufactured by Japan Epoxy Resin Co., Ltd.), "EPICLON" (manufactured by DIC Corporation), "EPOTOHTO" (manufactured by Tohto Kasei Co., Ltd.), "ADEKA RESIN" (manufactured by ADEKA Corporation), "DENACOL" (manufactured by Nagase ChemteX Corporation), "DOW EPDXY" (manufactured by The Dow Chemical Company), "TEPIC" (manufactured by Nissan Chemical Industries, Ltd.), and the like, all of which are trade names.

The epoxy equivalent of the alicyclic epoxy compound and the epoxy compound other than the alicyclic epoxy compound that are used in the present invention is generally in a range of 30 g/eq to 2000 g/eq, preferably generally in a range of 50 g/eq to 1500 g/eq, and more preferably in a range of 70 g/eq to 1000 g/eq. The epoxy equivalent is a value measured on the basis of JIS K 7236 (ISO 3001). In addition, when the epoxy compound is a highly pure monomer, the theoretical amount can be computed from the molecular weight of the epoxy compound.

In addition, it is also possible to use an oxetane compound as the active energy ray-curable compound. The joint use of the oxetane compound enables to improve the curing rate of the active energy ray-curable compound. The oxetane compound is not particularly limited as long as the oxetane compound is a compound having an oxetane ring, and can be cured by an active energy ray, and examples thereof include 1,4-bis{[(3-ethyloxetane-3-yl)methoxy]methyl}benzene, 3-ethyl-3-(2-ethylhexyloxymethyl)oxetane, bis(3-ethyl-3-oxetanylmethyl)ether, 3-ethyl-3-(phenoxymethyl)oxetane, 3-ethyl-3-(cyclohexyoxymethyl)oxetane, phenol novolac ocetane, 1,3-bis[(3-ethyloxetane-3-yl)methoxy]benzene, and the like.

The above-described oxetane compound can be easily procured from commercially available products, and examples thereof include "ARON OXETANE" (manufactured by Toagosei Co., Ltd.), "ETERNACOLL" (manufactured by Ube Industries, Ltd.), and the like, all of which are trade names.

The blending ratio of the alicyclic epoxy compound in the active energy ray-curable composition is preferably in a range of 30 parts by mass to 95 parts by mass, more preferably in a range of 50 parts by mass to 90 parts by mass, and still more preferably in a range of 70 parts by mass to 85 parts by mass with respect to a total of 100 parts by mass of the active energy ray-curable compound (the alicyclic epoxy compound, the epoxy compound other than the alicyclic epoxy compound, and the oxetane compound).

The total amount of chlorine contained in the active energy ray-curable composition including the alicyclic epoxy compound that is used in the present invention is preferably in a range of 0.1 ppm to 15000 ppm, more preferably in a range of 0.5 ppm to 2000 ppm, and still more preferably in a range of 1.0 ppm to 1000 ppm. Meanwhile, the total amount of chlorine is a value measured on the basis of JIS K 7243-3 (ISO 21627-3).

Regarding the hue of the active energy ray-curable composition including the alicyclic epoxy compound that is used in the present invention, the Gardner color scale of the active energy ray-curable composition before being cured is preferably 5 or less, more preferably 3 or less, and still more preferably 1 or less.

The active energy ray-curable composition including the alicyclic epoxy compound that is used in the present invention is a curable composition that is solidified (cured) by the irradiation of an active energy ray, and imparts an adhesive force to films that sandwich the cured substance layer.

Examples of the active energy ray being used include an X-ray having a wavelength in a range of 1 pm to 10 nm, an ultraviolet ray having a wavelength in a range of 10 nm to 400 nm, a visible light ray having a wavelength in a range of 400 nm to 800 nm, and the like. Among them, the ultraviolet ray is preferably used in terms of ease of use, ease of adjusting the active energy ray-curable composition, the stability and curing performance thereof There is no particular limitation regarding a light source being used, and examples thereof include a low-pressure mercury lamp, a medium-pressure mercury lamp, a high-pressure mercury lamp, an ultrahigh-pressure mercury lamp, a chemical lamp, a black light lamp, a microwave-excited mercury lamp, a metal halide lamp, and the like, all of which have a light-emitting distribution at a wavelength of 400 nm or less.

The irradiation intensity is determined depending on the active energy ray-curable composition or the irradiation time, and is not particularly limited, and, for example, the irradiation intensity in a wavelength range effective for the activation of an initiator is preferably in a range of 0.1 mW/cm$^2$ to 1000 mW/cm$^2$.

The irradiation time is determined depending on the active energy ray-curable composition or the irradiation intensity, and is not particularly limited, and, for example, the irradiation time is preferably set so that the accumulated amount of light expressed by the product of the irradiation intensity and the irradiation time falls into a range of 10 mJ/cm$^2$ to 5,000 mJ/cm$^2$.

The active energy ray-curable composition including the alicyclic epoxy compound that is used in the present invention is cured by an active energy ray, and thus it is preferable to blend a cationic polymerization initiator into the active energy ray-curable composition.

The cationic polymerization initiator may be singly used, or two or more cationic polymerization initiators may be used in a mixture form. Among them, in particular, an aromatic sulfonium salt is preferably used since the aromatic sulfonium salt has an ultraviolet ray-absorbing characteristic even in a wavelength range of 300 nm or more, and thus has excellent curing properties, and is capable of supplying a cured substance layer having favorable mechanical strength or adhesive strength.

The blending amount of the cationic polymerization initiator is generally in a range of 0.5 parts by mass to 20 parts by mass, and preferably in a range of 1 part by mass to 15 parts by mass with respect to a total of 100 parts by mass of the active energy ray-curable compound.

The cationic polymerization initiator can be easily procured from commercially available products, and examples thereof include "KAYARAD" (manufactured by Nippon Kayaku Co., Ltd.), "CYRACURE" (manufactured by Union Carbide Corporation), a photo-acid-generating agent "CPI" (manufactured by San-Apro Ltd.), a photo-acid-generating agent "TAZ", "BBI", "DTS" (manufactured by Midori Kagaku Co., Ltd.), "ADEKA OPTOMER" (manufactured by ADEKA Corporation), "RHODORSIL" (manufactured by Rhodia Inc.), and the like, all of which are trade names.

The active energy ray-curable composition including the alicyclic epoxy compound that is used in the present invention can be jointly used with a photosensitizer as necessary. The joint use of the photosensitizer enables to improve the reactivity and improve the mechanical strength or adhesive strength of a cured substance layer.

The photosensitizer is not particularly limited, and examples thereof include a carbonyl compound, an organic sulfur compound, a persulfide, a redox-based compound, an azo and diazo compound, a halogen compound, a photo-reducing pigment, and the like.

The photosensitizer may be singly used, and two or more photosensitizers may be used in a mixture form. 100 parts by mass of the active energy ray-curable composition preferably includes the photosensitizer in a range of 0.1 parts by mass to 20 parts by mass.

It is possible to blend a variety of additives into the active energy ray-curable composition used in the present invention as long as the effects of the present invention are not impaired. Examples of a variety of the additives include an ion-trapping agent, an antioxidant, a chain transfer agent, a sensitizer, a tackifer, a thermoplastic resin, a filler, a fluidity adjuster, a plasticizer, a defoamer, and the like.

The polarization plate is manufactured by attaching the polarization plate protective film and the polarizer using the adhesive. The adhesive may be applied to either or both the polarization plate protective film and the polarizer. After the attachment, an adhesive layer made of an applied and dried layer is formed by carrying out a drying step. The polarizer and the polarization plate protective film can be attached to each other using a roll laminator or the like. The thickness of the adhesive layer is not particularly limited, and is generally in a range of approximately 0.1 µm to 5 µm.

<Adhesive Layer>

An adhesive layer may be provided in the above-described polarization plate or an optical member including at least one polarization plate for the attachment with the liquid crystal cell. It is also possible to provide an adhesive layer for the attachment with members other than the liquid crystal cell. An adhesive forming the adhesive layer is not particularly limited, and, for example, it is possible to appropriately select one from acryl-based polymers, silicone-based polymers, polyesters, polyurethanes, polyamides, polyether, and substances containing a fluorine-based or rubber-based polymer as a base polymer. In particular, a substance which has excellent optical transparency, exhibits appropriate adhering characteristics such as wetting properties, agglomerating properties, and adhesiveness, and is excellent in terms of weather resistance, thermal resistance, and the like such as the acryl-based adhesive is preferably used.

In addition to what has been described above, an adhesive layer having low moisture absorptivity and excellent thermal resistance is preferred in terms of the prevention of a foaming phenomenon or a peeling phenomenon caused by the absorption of moisture, the prevention of the degradation of the optical characteristics or the warpage of the liquid crystal cell caused by the difference in thermal expansion, and furthermore, the forming properties of the liquid crystal display having high qualities and excellent durability.

In addition, from the viewpoint of the operability (re-workability) of the securing and attaching of the polarization plate, the adhering force of the adhesive layer is preferably 1 N/25 mm or more, and more preferably 5 N/25 mm or more. Meanwhile, there is no particular limitation regarding the upper limit.

The storage elastic modulus (G') of the adhesive at 23° C. is preferably in a range of 20 [MPa] to 100 [MPa], and more preferably in a range of 30 [MPa] to 70 [MPa] to suppress the resultant expansion and shrinkage of the adhesive following the expansion and shrinkage of the polarization plate or the liquid crystal cell or the propagation of the stress in members sandwiching the adhesive layer.

The adhesive layer may include, for example, resins of a natural substance or a synthetic substance, particularly, an adhesive-imparting resin, a filler or pigment made of a glass fiber, a glass bead, metal powder, other inorganic powder, or the like, additives being added to the adhesive layer such as a colorant and an antioxidant. In addition, the adhesive layer may be an adhesive layer containing fine particles and thus exhibiting light-diffusion properties.

The adhesive layer can also be provided on either or both surfaces of the polarization plate or the optical member in a form of multiple layer having different compositions or types. In a case in which the adhesive layers are provided on both surfaces, it is also possible to provide adhesive layers having different compositions, types, thicknesses, or the like on the front and rear of the polarization plate or the optical member. The thickness of the adhesive layer can be appropriately determined depending on the usage, adhesive force, and the like, and is generally in a range of 1 μm to 500 μm, preferably in a range of 5 μm to 200 μm, and particularly preferably in a range of 10 μm to 100 μm.

The exposed surface of the adhesive layer is covered by temporarily attaching a separator for the purpose of preventing the adhesive layer from being contaminated until the adhesive layer is provided for actual use. Then, it is possible to prevent contaminants from coming into contact with the adhesive layer in a state of being ordinarily handled. As the separator, it is possible to use an appropriate substance in accordance of the conditions of the related art except for the above-described thickness condition such as a substance obtained by coating an appropriate thin body such as a plastic film, a rubber sheet, paper, a fabric, a non-woven fabric, a net, an expanded sheet, a metal foil, or a laminate thereof with an appropriate parting agent such as a silicone-based parting agent, a long chain alkyl-based parting agent, a fluorine-based parting agent, or molybdenum sulfide as necessary.

Meanwhile, in the present invention, the above-described polarization plate or optical members, and the respective layers such as the adhesive layer may be provided with an ultraviolet ray-absorbing performance through a method in which, for example, the polarization plate or optical members, and the respective layers are treated using an ultraviolet absorber such as a salicylate ester-based compound, a benzophenol-based compound, a benzotriazole-based compound, a cyanoacrylate-based compound, or a nickel complex-based compound.

The adhesive layer can be provided on either of both surfaces of the polarization plate or the optical member using an appropriate method. Examples thereof include a method in which approximately 10 mass % to 40 mass % of an adhesive solution is prepared by dissolving or distributing a base polymer or a composition thereof in a solvent made of a single substance or a mixture of an appropriate solvent such as toluene or ethyl acetate, and the adhesive solution is directly provided on the polarization plate or the optical member using an appropriate development method such as a flow casting method or a coating method, a method in which the adhesive layer is formed on the separator according to what has been described above, and the adhesive is moved on the polarization plate or the optical member, and the like.

In the present invention, the polarization plate protective film in the polarization plate is preferably attached to the polarizer so that the transmission axis of the polarizer and the slow axis of the polarization plate protective film become substantially parallel or vertical to each other.

Here, "being substantially parallel" means that the deviation between the direction of the main refractive index nx of the polarization plate protective film and the direction of the transmission axis of the polarization plate is within 5°, and the deviation is preferably within 1°, and more preferably within 0.5°. In addition, "being substantially vertical" means that the deviation between the direction of the main refractive index nx of the polarization plate protective film and the direction of the transmission axis of the polarization plate is within 95°, and the deviation is preferably within 91°, and more preferably within 90.5°. When the deviation between the direction of the main refractive index nx of the polarization plate protective film and the direction of the transmission axis of the polarization plate is within 1°, the polarization performance under the cross Nicol of the polarization plate is not easily degraded, and light leakage does not easily occur, which is preferable.

<Performance of Polarization Plate>
(Cross Transmittance CT)

The cross transmittance CT of the polarization plate in the present invention is preferably CT≤2.0, more preferably CT≤1.3, and most preferably CT≤0.6 (the unit is % in all cases).

(Variation of Cross Transmittance)

In a polarization plate durability test, the variation of the cross transmittance is preferably smaller.

The variation (%) of the cross transmittance at a wavelength of 410 nm when the polarization plate is left to stand at 60° C. and a relative humidity of 95% for 500 hours is preferably 0.40% or less, more preferably 0.30% or less, and particularly preferably 0.25% or less.

Meanwhile, the variation (%) of the cross transmittance at a wavelength of 680 nm when the polarization plate is left to stand at 80° C. in a dry environment for 500 hours is more preferably 0.06% or less.

Here, the variation refers to a value obtained by subtracting the measured value before the test from the measured value after the test.

When the variation of the cross transmittance is within the above-described range, the stability can be ensured while the polarization plate is used or stored in a high-temperature and high-humidity environment and a high-temperature and low-humidity environment for a long period of time, which is preferable.

(Other characteristics)

Other preferable optical characteristics and the like of the polarization plate in the present invention are described in 0238 to 0255 of JP2007-086748A, and these characteristics are preferably satisfied.

<Functionalization of Polarization Plate>

The polarization plate in the present invention is preferably used as a functionalized polarization plate combined with an optical film having functional layers such as an antireflection film for improving the observability of a display, a brightness-improving film, a hard coat layer, a front scattering layer, and an anti-glare (glare-proof) layer. The antireflection film, the brightness-improving film, other functional optical films, the hard coat layer, the front scattering layer, and the anti-glare layer which are used for functionalization are described in 0257 to 0276 of JP2007-86748A, and it is possible to produce a polarization plate functionalized on the basis of the above-described description.

(3-1) Antireflection Film

The polarization plate in the present invention can be used in combination with an antireflection film. As the antireflection film, any of a film having a reflection ratio of approximately 1.5% which is produced by supplying a single layer of a low-refractive index material such as a fluorine-based polymer and a film having a reflection ratio of 1% or less in which the multilayer interference of a thin film is used can be used. In the present invention, a configuration in which a low-refractive index layer and at least one layer (that is, a high-refractive index layer and a middle-refractive index layer) having a higher refractive index than the low-refractive index layer are laminated on a transparent support is preferably used. In addition, it is also possible to use the antireflection film described in Nitto Technical Report, Vol. 38, No. 1, May, 2000, pp. 26 to 28 and JP2002-301783A.

The refractive indexes of the respective layers satisfy the following relationship.

The refractive index of the high-refractive index layer> the refractive index of the middle-refractive index layer> the refractive index of the transparent support> the refractive index of the low-refractive index layer As the transparent support used for the antireflection film, a film base material used for the polarization plate protective film can be preferably used, and is preferably a transparent film base material.

The refractive index of the low-refractive index layer is preferably in a range of 1.20 to 1.55, and more preferably in a range of 1.30 to 1.50. The low-refractive index layer is preferably used as an outermost layer having abrasion resistance and an antifouling property. It is also preferably carried out to impart a sliding property to the surface using a material such as a silicone-containing compound containing a silicone group or a fluorine-containing compound containing fluorine to improve the abrasion resistance.

As the fluorine-containing compound, it is possible to preferably use, for example, the compounds described in 0018 to 0026 of JP1997-222503A (JP-H09-222503A), 0019 to 0030 of JP1999-38202A (JP-H11-38202A), 0027 and 0028 of JP2001-40284A, and JP2000-284102A.

The silicone-containing compound is preferably a compound having a polysiloxane structure, and it is also possible to use reactive silicone (for example, SILAPRENE (manufactured by Chisso Corporation) or polysiloxane containing a silanol group at both ends (JP1999-258403A (JP-H11-258403A) and the like. An organic metal compound such as a silane coupling agent and a specific silane coupling agent containing a fluorine-containing hydrocarbon group may be cured through a condensation reaction in the co-presence of a catalyst (the compounds and the like described in JP1983-142958A (JP-S58-142958A), JP1983-147483A (JP-S58-147483A), JP1983-147484A (JP-S58-147484A), JP1997-157582A (JP-H09-157582A), JP1999-106704A (JP-H11-106704A), JP2000-117902A, and JP2001-48590A, JP2002-53804A).

It is also possible to preferably add a filler (for example, a low-refractive index inorganic compound having an average primary particle diameter in a range of 1 nm to 150 nm such as silicon dioxide (silica) or fluorine-containing particles (magnesium fluoride, potassium fluoride, or barium fluoride), the organic fine particles described in 0020 to 0038 of JP1999-3820A (JP-H11-3820A, or the like), a silane coupling agent, a lubricant, a surfactant, and the like to the low-refractive index layer as additives other than what has been described above.

The low-refractive index layer may be formed using a gas phase method (a vacuum deposition method, a sputtering method, an ion plating method, a plasma CVD method, or the like), but is preferably formed using a coating method since the low-refractive index layer can be manufactured at a low cost. As the coating method, a dip coating method, an air knife coating method, a curtain coating method, a roller coating method, a wire bar coating method, a gravure coating method, or a micro gravure method can be preferably used.

The film thickness of the low-refractive index layer is preferably in a range of 30 nm to 200 nm, more preferably in a range of 50 nm to 150 nm, and most preferably in a range of 60 nm to 120 nm.

The middle-refractive index layer and the high-refractive index layer preferably have a configuration in which the ultrafine particles of a high-refractive index inorganic compound having an average particle size of 100 nm or less are dispersed in a matrix material. As the ultrafine particles of the high-refractive index inorganic compound, it is possible to preferably use an inorganic compound having a refractive index of 1.65 or more, for example, oxides of Ti, Zn, Sb, Sn, Zr, Ce, Ta, La, In, and the like, complex oxides containing the above-described metal atoms, and the like.

The above-described ultrafine particles can be used in an aspect in which the particle surfaces are treated using a surface treatment agent (a silane coupling agent or the like: JP1999-295503A (JP-H11-295503A), JP1999-153703A (JP-H11-153703A), JP2000-9908A, an organic metal coupling agent or anionic compounds: JP2001-310432A, or the like), the ultrafine particles are given a core shell structure in which high-refractive index particles are used as a core (JP2001-166104A), a specific dispersant is jointly used (for example, JP1999-153703A (JP-H11-153703A, the specification of U.S. Pat. No. 6,210,858B1, JP2002-2776069A, and the like)), or the like.

As the matrix material, a well-known thermoplastic resin, curable resin film, or the like of the related art can be used, and it is also possible to use a curable film obtained from the polyfunctional materials described in JP2000-47004A, JP2001-315242A, JP2001-31871A, JP2001-296401A, and the like or the metal alkoxide compositions described in JP2001-293818A and the like.

The refractive index of the high-refractive index layer is preferably in a range of 1.70 to 2.20. The thickness of the high-refractive index layer is preferably in a range of 5 nm to 10 µm, and more preferably in a range of 10 nm to 1 µm.

The refractive index of the middle-refractive index layer is adjusted to be a value between the refractive index of the low-refractive index layer and the refractive index of the high-refractive index layer. The refractive index of the middle-refractive index layer is preferably in a range of 1.50 to 1.70.

The haze of the antireflection film is preferably 5% or less, and more preferably 3% or less. In addition, the strength of the film is preferably H or higher, more preferably 2H or higher, and most preferably 3H or higher in the pencil hardness test according to JIS K5400.

(3-2) Brightness-Improving Film

The polarization plate in the present invention can be used in combination with a brightness-improving film. The brightness-improving film has a circularly-polarized light or linearly-polarized light separation function, is disposed between the polarization plate and a back light, and reflects or scatters one circularly-polarized light or linearly-polarized light backward to the back light side. Since light re-reflected from the back light unit has a partially changed polarized light state, and partially transmits the brightness-improving film and the polarization plate when entering the brightness-improving film and the polarization plate again, the repetition of this process improves the light utilization ratio, and the front surface brightness improves by approximately 1.4 times. An anisotropic reflection-type brightness-improving film and an anisotropic scattering-type brightness-improving film are known as the brightness-improving film, and both brightness-improving films can be combined with the polarization plate in the present invention.

As the anisotropic reflection-type brightness-improving film, a brightness-improving film in which uniaxially-stretched films and unstretched films are laminated multiple times so as to increase the difference in the refractive index in the stretching direction, thereby producing the anisotropy of the reflection ratio and the transmittance is known, and a multilayer film-type brightness-improving film for which the principle of a dielectric mirror is used (the specifications of WO95/17691A, WO95/17692A, and WO95/17699A) or a cholesteric liquid crystal-type brightness-improving film (the specification of EP606940A2B, and JP1996-271731A (JP-H08-271731A)) is known. In the present invention, DBEF-E, DBEF-D, and DBEF-M (all manufactured by 3M Company) are preferably used as the multilayer film-type brightness-improving film for which the principle of a dielectric mirror is used, and NIPOCS (manufactured by Nitto Denko Corporation) is preferably used as the cholesteric liquid crystal-type brightness-improving film. Regarding NIPOCS, Nitto Technical Report, Vol. 38, No. 1, May, 2000, pp. 19 to 21 and the like can be referenced.

In addition, in the present invention, the polarization plate is also preferably used in combination with an anisotropic scattering-type brightness-improving film obtained by blending a positive intrinsic birefringent polymer and a negative intrinsic birefringent polymer and then uniaxially stretching the blended polymers which is described in the specifications of WO97/32223A, WO97/32224A, WO97/32225A, WO97/32226A, JP1997-274108A (JP-H09-274108A), and JP1999-174231A (JP-H11-174231A). As the anisotropic scattering-type brightness-improving film, DRPF-H (manufactured by 3M Company) is preferred.

Furthermore, the polarization plate in the present invention is also preferably used in combination with a functional optical film provided with the hard coat layer, the front scattering layer, the anti-glare (glare-proof) layer, a gas barrier layer, a lubricating layer, an antistatic layer, a basecoat layer or a protective layer, and the like. In addition, these functional layers are also preferably used in a form in which the functional layers are mutually combined with the antireflection layer in the above-described antireflection film, the optical anisotropic layer, or the like in the same layer. These functional layers can be provided on any one surface or both surfaces of the polarizer side surface and the opposite side surface (surface closer to air) to the polarizer.

(3-3) Hard Coat Layer

The polarization plate in the present invention is preferably combined with a functional optical film provided with a hard coat layer on the surface of the transparent support to impart a dynamic strength such as abrasion resistance. In a case in which the hard coat layer is applied to the above-described antireflection film, the hard coat layer is preferably provided particularly between the transparent support and the high-refractive index layer.

The hard coat layer is preferably formed through a crosslinking reaction or polymerization reaction of a curable compound using light and/or heat. The curable functional group is preferably a photopolymerizable functional group, and an organic metal compound containing a hydrolyzable functional group is preferably an organic alkoxy silyl compound. As the specific constituent composition of the hard coat layer, it is possible to preferably use, for example, the compositions described in JP2002-144913A, JP2000-9908A, and WO00/46617A.

The film thickness of the hard coat layer is preferably in a range of 0.2 µm to 100 µm.

The strength of the hard coat layer is preferably H or higher, more preferably 2H or higher, and most preferably 3H or higher in the pencil hardness test according to JIS K5400. In addition, in the taber test according to JIS K5400, the wear amount of a test specimen before and after the test is preferably smaller.

As the material forming the hard coat layer, a compound containing an ethylenic unsaturated group and a compound containing an open-ring polymerizable group can be used, and these compounds can be used singly or in combination. Preferable examples of the compound containing an ethylenic unsaturated group include polyacrylates of a polyol such as ethylene glycol diacrylate, trimethylolpropane triacrylate, ditrimethylolpropane tetraacrylate, pentaerythritol triacrylate, pentaerythritol tetraacrylate, dipentaerythritol pentaacrylate, and dipentaerythritol hexaacrylate; epoxy acrylates such as diacrylates of bisphenol A diglycidyl ether and diacrylates of hexanediol diglycidyl ether; and urethane acrylates obtained through a reaction between polyisocyanate and a hydroxyl group-containing acrylate such as hydroxy ethyl acrylate. In addition, examples of commercially available compounds include EB-600, EB-40, EB-140, EB-1150, EB-1290K, IRR214, EB-2220, TMPTA, TMPTMA (all manufactured by Daicel-UCB Company, Ltd.), UV-6300, UV-1700B (all manufactured by The Nippon Synthetic Chemical Industry Co., Ltd.), and the like.

In addition, preferable examples of the compound containing an open-ring polymerizable group include, as glycidyl ethers, ethylene glycol diglycidyl ether, bisphenol A diglycidyl ether, trimethylol ethane triglycidyl ether, trimethylol propantriglycidyl ether, glycerol triglycidyl ether, triglycidyl trishydroxyethyl isocyanurate, sorbitol tetraglycidyl ether, pentaerythritol tetraglycyl ether, polyglycidyl ethers of a cresol novolac resin, polyglycidyl ether of a phenol novolac resin, and the like; as alicyclic epoxies, CELLOXIDE 2021P, CELLOXIDE 2081, EPOLEAD GT-301, EPOLEAD GT-401, EHPE3150CE (all manufactured by Daicel Corporation), polycyclohexyl epoxy methyl ethers of a phenol novolac resin, and the like; and as oxetanes, OXT-121, OXT-221, OX-SQ, PNOX-1009 (all manufactured by Toagosei Company, Limited), and the like. In addition, it is also possible to use polymers of glycidyl(meth)acrylate and copolymers with a monomer that can be copolymerized with glycidyl(meth)acrylate for the hard coat layer.

It is also preferable to add fine particles of oxides such as silicon, titanium, zirconium, and aluminum; crosslinking particles of polyethylene, polystyrene, poly(meth)acrylic acid esters, polydimethyl siloxane, and the like; crosslinking fine particles such as organic fine particles such as crosslinking rubber fine particles of SBR, NBR, and the like to the hard coat layer to reduce the curing shrinkage of the hard coat layer, improve the adhesiveness with the base material, and reduce the curling of a hard coating-treated product in the present invention. The average particle size of these crosslinking fine particles is preferably in a range of 1 nm to 20000 nm. In addition, as the shape of the crosslinking fine particles, a spherical shape, a rod shape, a needle shape, a plate shape, and the like can be used with no particular limitation. The amount of the fine particles added is preferably 60 vol % or less, and more preferably 40 vol % or less of the cured hard coat layer.

In a case in which the above-described inorganic fine particles are added, generally, the inorganic fine particles have a poor affinity to a binder polymer, and therefore it is also preferable to carry out a surface treatment using a surface treatment agent including metal such as silicon, aluminum, or titanium, and having a functional group such as an alkoxide group, a carboxylic acid group, a sulfonic acid group, or a phosphorous acid group.

The hard coat layer is preferably cured using heat or an active energy ray, and, out of the heat and the active energy ray, the active energy ray such as a radioactive ray, a gamma ray, an alpha ray, an electron ray, or an ultraviolet ray is preferably used, and an electron ray and an ultraviolet ray are particularly preferred in consideration of safety and productivity. In a case in which the hard coat layer is cured using heat, the heating temperature is preferably 140° C. or lower, and more preferably 100° C. or lower in consideration of the thermal resistance of plastic.

(3-4) Front Scattering Layer

The front scattering layer is used to improve the viewing angle characteristics (hue and brightness distribution) in all directions when the polarization plate of the present invention is applied to the liquid crystal display. In the present invention, the front scattering layer preferably has a configuration in which fine particles having different refractive indexes are binder-dispersed, and it is possible to use, for example, the configuration described in JP1999-38208A (JP-H11-38208A) in which the front scattering coefficient is specified, the configuration described in JP2000-199809A in which the relative refractive index between a transparent resin and fine particles is set in a specific range, the configuration described in JP2002-107512A in which the haze value is set to 40% or more, or the like. In addition, to control the viewing angle characteristics of the haze, it is possible to preferably use the polarization plate of the present invention in combination with "LUMISTY" described in pp. 31 to 39 of the technical report "Optical functional film" by Sumitomo Chemical Company, Limited.

(3-5) Anti-Glare Layer

The anti-glare (glare-proof) layer is used to prevent reflected glare by scattering reflected light. An anti-glare function can be obtained by forming protrusions and recesses on the outermost surface (display side) of the liquid crystal display. The haze of an optical film having the anti-glare function is preferably in a range of 3% to 30%, more preferably in a range of 5% to 20%, and most preferably in a range of 7% to 20%.

As the method for forming protrusions and recesses on the film surface, it is possible to preferably use, for example, a method in which protrusions and recesses are formed on the film surface by adding fine particles (for example, JP2000-271878A), a method in which a film with an uneven surface is formed by adding a small amount (0.1 mass % to 50 mass %) of relatively large particles (particle size in a range of 0.05 μm to 2 μm) (for example, JP2000-281410A, JP2000-95893A, JP2001-100004A, JP2001-281407A, and the like), a method in which an uneven shape is physically transferred to the film surface (for example, as an emboss processing method, JP1988-278839A (JP-S63-278839A, JP1999-183710A (JP-H11-183710A, JP2000-275401A)), and the like.

[Liquid Crystal Display]

The liquid crystal display of the present invention includes, for example, the liquid crystal cell including a liquid crystal layer and a liquid crystal cell upper electrode substrate and a liquid crystal cell lower electrode substrate which are disposed above and beneath the liquid crystal layer, and the front side polarization plate (viewing side polarization plate) and the rear side polarization plate (non-viewing side polarization plate) which are disposed on both surfaces of the liquid crystal cell. Color filters may be disposed between the liquid crystal cell and the respective polarization plates. The liquid crystal display is used as a transmission-type liquid crystal display, and includes a backlight, for which a cold cathode, a hot cathode fluorescent tube, a light-emitting diode, a field emission element, or an electroluminescent element is used as a light source, disposed on the rear surface.

The liquid crystal display of the present invention is particularly preferred in a case in which a backlight having a reduced thickness is used to make the liquid crystal display slim, and is capable of reducing warp occurring after the storage of the liquid crystal display in a high-humidity environment.

In the present invention, as the liquid crystal display, an active matrix liquid crystal display in which a three-terminal element such as a TFT element or a two-terminal semiconductor element such as a metal-insulator-metal (MIM) element is used is effective. It is needless to say that a passive matrix liquid crystal display represented by an STN mode called a time-division drive is also effective.

(IPS Mode and FFS Mode)

In the liquid crystal cell in the liquid crystal display of the present invention, warp or the like appears more easily in the horizontal orientation mode than in the vertical orientation mode, and the present invention is preferable to prevent the easier appearance of warp or the like in the horizontal orientation mode, and therefore an in-plane switching (IPS) mode or a fringe field switching (FFS) mode (hereinafter, also referred to as "IPS-type" or "FFS-type") is preferred.

The IPS mode refers to a mode in which liquid crystal molecules are switched so as to be horizontal with respect to the substrate at all times, and a transverse electric field in the horizontal direction with respect to the substrate is used to switch the liquid crystal molecules. The shape of an electrode may also be any of a linear shape, a net shape, a spiral shape, a dot shape, and a zigzag shape. The product $\Delta n \cdot d$ of the thickness d (nm) and refractive index anisotropy $\Delta n$ of the liquid crystal layer is desirably in a range of approximately 280 nm to 340 nm in a transmission mode.

The FFS mode is a mode in which, similar to the IPS mode, liquid crystal molecules are switched so as to be horizontal with respect to the substrate at all times, and a transverse electric field in the horizontal direction with respect to the substrate is used to switch the liquid crystal molecules. Generally, the FFS mode includes a header electrode and a tooth electrode as an interlayer insulating film, and has a feature of the electric field direction that is different from that of the IPS mode. The desired $\Delta n \cdot d$ is in a range of approximately 300 nm to 400 nm.

The above-described modes are described in a variety of documents, and any configuration can be employed in the present invention. The modes can also be obtained in any displays. As the IPS-type liquid crystal display, for example, the liquid crystal displays described in JP2003-15160A, JP2003-75850A, JP2003-295171A, JP2004-12730A, JP2004-1273 IA, JP2005-106967A, JP2005-134914A, JP2005-241923A, JP2005-284304A, JP2006-189758A, JP2006-194918A, JP2006-220680A, JP2007-140353A, JP2007-178904A, JP2007-293290A, JP2007-328350A, JP2008-3251A, JP2008-39806A, JP2008-40291A, JP2008-65196A, JP2008-76849A, JP2008-96815A and the like can be used.

The FFS-type liquid crystal cell includes a counter electrode and a pixel electrode. These electrodes are formed of a transparent substance such as indium tin oxide (ITO), and are formed in a width in which the liquid crystal molecules and the like disposed in the electrode top section are all driven at intervals narrower than the intervals between the upper and lower substrates. In the FFS mode, this configuration enables to obtain an aperture ratio improved more than in the IPS mode, and furthermore, the electrode section is light-transmissible, and therefore the transmittance improved more than in the IPS mode can be obtained. For the FFS-mode liquid crystal cell, it is possible to reference the descriptions of, for example, JP2001-100183A, JP2002-14374A, JP2002-182230A, JP2003-131248A, JP2003-233083A, and the like.

FIG. 1 is a schematic cross-sectional view of an embodiment of an IPS or FFS-type liquid crystal display.

The liquid crystal display illustrated in FIG. 1 includes a pair of a first polarization plate 16 and a second polarization plate 18, and an IPS or FFS-type liquid crystal cell LC, and a backlight 26 is disposed outside the second polarization plate 18.

Each of the first polarization plate 16 and the second polarization plate 18 includes a polarizer and polarization plate protective films (not illustrated) on both surfaces of the polarizer.

In the liquid crystal display of FIG. 1, the liquid crystal cell LC includes a first substrate 12 (hereinafter, also referred to as "substrate 12"), a liquid crystal layer 10 made of a nematic liquid crystal material, and a second substrate 14 (hereinafter, also referred to as "substrate 14"). In the transmission mode, the liquid crystal layer 10 is an IPS or FFS-type liquid crystal cell in which the liquid crystal molecules of the nematic liquid crystal material are oriented parallel to the surfaces of the pair of the substrate 12 and the substrate 14 when black is displayed. The optimal value of the product $\Delta n \cdot d$ of the thickness d (μm) and refractive index anisotropy $\Delta n$ of the liquid crystal layer is in a range of 0.2 μm to 0.4 μm in the IPS type in which there is no twist structure, and is in a range of 0.3 μm to 0.5 μm in the FFS type. In this range, the white-display brightness is high, and the black-display brightness is small, and therefore a bright display having a high contrast can be obtained. Orientation films (not illustrated) are formed on the surfaces of the substrates 12 and 14 that come into contact with the liquid crystal layer 10, whereby the liquid crystal molecules are oriented substantially parallel to the surface of the substrate, and the liquid crystal molecule orientation direction in a no voltage application state or a low voltage application state is controlled using the direction of a rubbing treatment carried out on the orientation film and the like. In addition, an electrode (not illustrated in FIG. 1) capable of applying a voltage to the liquid crystal molecules is formed on the in-plane of the substrate 12 or the substrate 14.

In a no voltage application state, the liquid crystal molecules in the liquid crystal layer 10 are not twisted, and are controlled using, for example, the direction of the rubbing treatment on the orientation film formed on the in-plane of the substrate 12 or the substrate 14, and are oriented in a certain horizontal direction. When a voltage is applied, the liquid crystal molecules are horizontally rotated by a predetermined angle by an electric field formed in an in-plane direction, and are oriented in a predetermined direction. There have been a variety of proposals regarding the shape and disposition of the electrode, and any of them can be used.

In FIG. 1, the absorption axis 16a of the first polarization plate 16 and the absorption axis 18a of the second polarization plate 18 are disposed to be orthogonal to each other. When no voltage is applied, the liquid crystal molecules in the liquid crystal layer 10 are horizontally oriented so that the slow axis 10a of the liquid crystal layer 10 becomes parallel to the absorption axis 18a of the second polarization plate 18. Therefore, light incident from the backlight 26 is blocked by the absorption axis 16a of the first polarization plate 16 by adding the liquid crystal layer 10 while the polarization state is maintained, whereby black is displayed. However, out of the light incident from the backlight 26, light incident from an inclined direction is not orthogonal to the absorption axes 16a and 18a of the polarization plates 16 and 18, and therefore light leakage occurs, that is, the viewing angle contrast is decreased. To reduce the light leakage and improve the viewing angle contrast, an optical compensation film (phase difference film) is preferably disposed between the first or second polarization plate and the liquid crystal cell LC. Alternatively, the polarization plate protective film on the liquid crystal cell LC side of the first polarization plate or the second polarization plate may also be used as the optical compensation film.

There is no particular limitation regarding the configuration of the backlight 26. Any of a light guide plate-type backlight and an immediate below-type backlight may be used. The light guide plate-type backlight unit includes a light source and a light guide plate, and the immediate below-type backlight unit includes a light source and a diffusion plate. There is no particular limitation regarding the light source being used, and any of an electric bulb, a light-emitting diode (LED), an electroluminescence panel (ELP), one or multiple cold-cathode fluorescent lamps (CCFL) and hot cathode fluorescent lamps (HCFL), and the like can be used.

In addition, a member such as a reflection plate or a brightness-improving film can be used as the backlight 26 to increase the usage efficiency of light. Furthermore, when the liquid crystal display is formed, in addition to the above-described members, for example, components such as a diffusion plate, a protective plate, a prism array, a lens array sheet, and a light diffusion plate can be appropriately disposed in one or multiple layers.

(VA Mode)

The liquid crystal cell in the liquid crystal display of the present invention may be a VA mode liquid crystal cell.

In the VA mode, liquid crystals having negative dielectric anisotropy, $\Delta n = 0.0813$, and $\Delta \varepsilon = -4.6$ are produced between the upper and lower substrates so that the director indicating the orientation direction of liquid crystal molecules, that is, the tile angle reaches approximately 89° by rubbing orientation.

Figure 2:
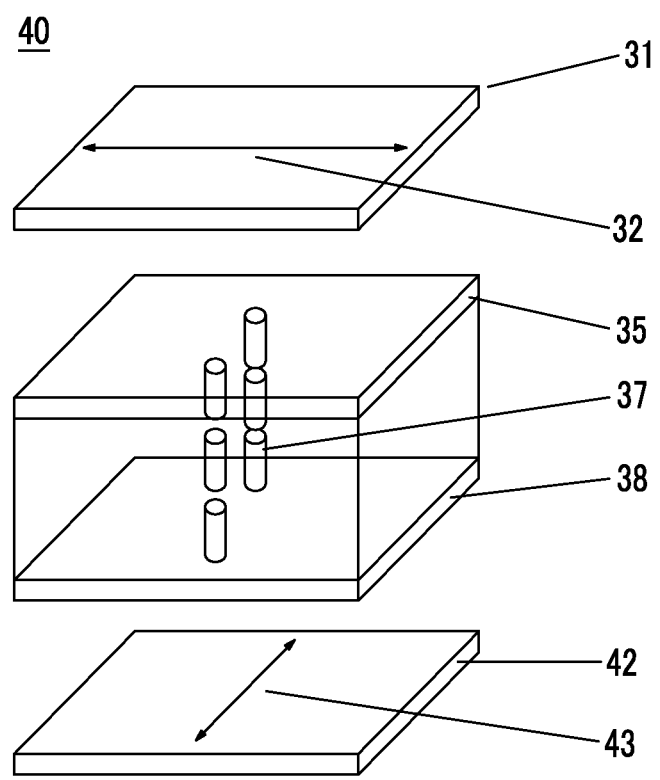
FIG. 2 is a schematic view illustrating an example of a liquid crystal display of the present invention.

FIG. 2 is a schematic view illustrating an example of the liquid crystal display of the present invention. The thickness d of a liquid crystal layer 37 in FIG. 2 is preferably set to approximately 3.5 μm.

The absorption axis 32 of a front side polarization plate 31 and the absorption axis 43 of a rear side polarization plate 42 in the liquid crystal cell are laminated to be substantially orthogonal to each other. Between these polarization plates, polarization plate protective films are formed on both surfaces of a polarizer, and transparent electrodes (not illustrated) are formed on the insides of the respective orientation films of a liquid crystal cell upper electrode substrate 35 and a liquid crystal cell lower electrode substrate 38. In a non-driven state in which a driving voltage is not applied to the electrodes, the liquid crystal molecules in the liquid crystal layer 37 are oriented substantially vertical to the substrate surface, and consequently, the polarization state of light passing through a liquid crystal panel rarely changes. That is, in the liquid crystal display, ideal black displaying is realized in the non-driven state. On the contrary, in a driven state, the liquid crystal molecules are inclined in a direction parallel to the substrate surface, and the polarization state of light passing through the liquid crystal panel is changed by the liquid crystal molecules inclined as described above. In other words, in the liquid crystal display, white displaying is obtained in the driven state.

Here, since an electric field is applied between the upper and lower substrates, it is preferable to use a liquid crystal material having negative dielectric anisotropy so that the liquid crystal molecules response vertically to the electric field direction. In addition, in a case in which the electrode is disposed on a substrate, and the electric field is applied in the transverse direction that is parallel to the substrate surface, the liquid crystal material having positive dielectric anisotropy is used.

In addition, in the VA mode liquid crystal display, a chiral agent that is generally used in a TN mode liquid crystal display is not often added since the chiral agent deteriorates the dynamic response characteristics, but there is a case in which the chiral agent is added to reduce poor orientation.

The features of the VA mode are high-speed response and high contrast. However, the contrast is high on the front surface, but has a problem of being deteriorated in an inclined direction. When black is displayed, the liquid crystal molecules are oriented to be vertical to the substrate surface. When observed from the front surface, there is little birefringence of the liquid crystal molecules, and therefore low transmittance and high contrast can be obtained. However, in a case in which the liquid crystal molecules are observed in an inclined direction, the birefringence of the liquid crystal molecules is caused. Furthermore, the cross angle between the upper and lower polarization plate absorption axes is 90° on the front surface, but becomes greater than 90° in a case in which the liquid crystal molecules are observed in an inclined direction. For the above-described two reasons, light leakage occurs in an inclined direction, and the contrast degrades. In a case in which the polarization plate protective film is a phase difference film, it is possible to dispose the polarization plate protective film as an optical compensation film (phase difference film) to solve the above-described problem. In this case, at least one of the polarization plate protective films on the liquid crystal cell sides of the front side polarization plate 31 and the rear side polarization plate 42 is preferably the optical compensation film.

In addition, the liquid crystal molecules are inclined when white is displayed, but the degrees of the birefringence of the liquid crystal molecules observed in an inclined direction are different in the inclined direction and in a reverse direction thereof, and the brightness or hue becomes different. To solve what has been described above, it is also preferable to provide a structure called a multi-domain in which a pixel in the liquid crystal display is divided into multiple domains.

(Multi-Domain)

For example, in the VA method, the application of an electric field inclines the liquid crystal molecules into different multiple domains in a single pixel, and thus the viewing angle characteristic is averaged. To divide the orientation in a single pixel, the electric field density is biased by providing slits in the electrode, or providing protrusions so as to change the electric field direction. The number of the division is preferably greater to obtain a uniform viewing angle in all directions, and quartering or division into eight or more domains enables to obtain an almost uniform viewing angle in all directions. In particularly, the division into eight domains is preferred since the polarization plate absorption axis can be set to an arbitrary angle.

In addition, in the domain boundary of orientation division, the liquid crystal molecules do not easily response. Therefore, black displaying is maintained when normally black is displayed, and the brightness degradation poses a problem. Therefore, it is possible to decrease the boundary domain by adding the chiral agent to the liquid crystal material.

Examples

Hereinafter, the present invention will be specifically described using examples. Materials, reagents, mass amounts, ratios thereof, operations, and the like described in the following examples can be appropriately changed within the purpose of the present invention. Therefore, the scope of the present invention is not limited to the following specific examples.

[Production of Polarizer A]

200 kg of water at temperature of 18° C. was put into a 500 L tank, 42 kg of a polyvinyl alcohol-based resin having a weight-average molecular weight of 165000 and a saponification degree of 99.8 mol % was added thereto under stirring, and the components were stirred for 15 minutes, thereby obtaining a slurry. The obtained slurry was dehydrated, thereby obtaining a PVA-based resin wet cake having a water content ratio of 40 mass %.

70 kg (resin component: 42 kg) of the obtained PVA-based resin wet cake was put into a dissolving bath, 4.2 kg of glycerin, as a plasticizer, and 10 kg of water were added thereto, and water vapor was blown in from the bath bottom. The components began to be stirred (at a rotation speed: 5 rpm) when the inside resin temperature reached 50° C., the inside of the system was pressurized when the inside resin temperature reached 100° C., and the blowing-in of water vapor was stopped when the inside resin temperature reached 150° C. (the total amount of water vapor blown in was 75 kg). After that, the components were stirred (rotation speed: 20 rpm) for 30 minutes so as to be homogeneously dissolved, and then a polyvinyl alcohol-based resin aqueous solution having a polyvinyl alcohol-based resin concentration of 23 mass % with respect to water was obtained by adjusting the concentration.

Next, the polyvinyl alcohol-based resin aqueous solution (solution temperature: 147° C.) was supplied to a twin screw extruder using a supply gear pump, was defoamed, and then was discharged using a discharge gear pump. The discharged polyvinyl alcohol-based resin aqueous solution was flow-cast on a cast drum using a T-shaped slit die (straight manifold die)

so as to form a film, thereby obtaining a polyvinyl alcohol film. The conditions for forming the film through flow casting are as described below.

Cast drum diameter (R1): 3200 mm,
Cast drum width: 4.3 m
Cast drum rotation speed: 8 in/minute
Cast drum surface temperature: 90° C.
Resin temperature at the outlet of a T-shaped slit die: 95° C.

The front and back surfaces of the obtained polyvinyl alcohol film was dried by alternately passing the film through multiple drying rolls under the following conditions.

Drying roll diameter (R2): 320 mm,
Drying roll width: 4.3 m
Number of drying rolls (n): 10 rolls
Drying roll rotation speed: 8 m/minute
Drying roll surface temperature: 50° C.

The polyvinyl alcohol film (length: 4000 m, width: 4 m, and thickness: 50 μm) produced above was immersed in warm water at temperature of 40° C. for two minutes, was subjected to a swelling treatment, and then was uniaxially stretched 1.30 times in the lengthwise direction. The obtained film was immersed in an aqueous solution including 28.6 g/L of boric acid (manufactured by Societa Chimica Larderello S.p.A), 0.25 g/L of iodine (manufactured by Junsei Chemical Co., Ltd.), and 1.0 g/L of potassium iodide (manufactured by Junsei Chemical Co., Ltd.) at 30° C. for two minutes, thereby carrying out a dyeing treatment using iodine and an iodide. A boric acid treatment was carried out for five minutes in an aqueous solution at temperature of 50° C. containing 30.0 g/L of boric acid while the film obtained through the dyeing treatment was uniaxially stretched 5.0 times in the lengthwise direction. A drying treatment was carried out on the obtained film for nine minutes at 70° C.

As a result, a polarizer A having a film thickness of 23.2 μm was produced.

[Production of Polarizers B to E]

A polarizer B having a thickness (25.5 μm) that is 1.1 times the thickness of the polarizer A, a polarizer C having a thickness (27.9 μm) that is 1.2 times the thickness of the polarizer A, a polarizer D having a thickness (20.9 μm) that is 0.9 times the thickness of the polarizer A, and a polarizer E having a thickness (18.6 μm) that is 0.8 times the thickness of the polarizer A were produced by appropriately changing the thickness and stretching ratio of the polyvinyl alcohol film in the production of the polarizer A.

{Production of Polarization Plate Protective Films 1 to 15}

[Production of Polarization Plate Protective Film 1 (Film 1)]

A pellet of [a mixture of 90 parts by mass of the (meth) acryl-based resin having a lactone ring structure represented by the following formula (1) {the mass ratio of copolymerizable monomers=methyl methacrylate/2-(hydroxymethyl) methyl acrylate=8/2, the lactone ring-forming ratio=approximately 100%, the content ratio of the lactone ring structure=19.4%, the weight-average molecular weight=133000, the melt flow rate=6.5 g/10 minutes (240° C., 10 kgf), Tg 131° C.} and 10 parts by mass of an acrylonitrile-styrene (AS) resin (TOYO AS AS20, manufactured by Toyo Styrene Co., Ltd.); Tg 127° C.] was supplied to a twin screw extruder, was melted at approximately 280° C., and was extruded into a sheet shape, thereby obtaining a 80 μm-thick (meth)acryl-based resin sheet having a lactone ring structure. This unstretched sheet was stretched 1.5 times in the lengthwise direction and 1.8 times in the widthwise direction under a temperature condition of 160° C., thereby obtaining a film 1 (thickness: 40 μm and thickness wise phase difference Rth: 1.5 nm).

[Chem. 1]

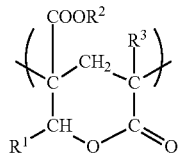

In the above-described (1), $R^1$ represents a hydrogen atom, and $R^2$ and $R^3$ represent a methyl group.

[Production of Film 2]

(1) The Preparation of a Cellulose Acylate Resin Through Synthesis

Cellulose acylate having a degree of acetyl substitution of 2.88 was prepared.

Sulfric acid (7.8 parts by mass with respect to 100 parts by mass of cellulose) was added as a catalyst, acetic acid was added, and an acylation reaction was carried out at 40° C.

After that, the total substitution degree and the 6-position substitution degree were adjusted by adjusting the amount of the sulfuric acid catalyst, the amount of moisture, and the aging time. The degree of acetyl substitution of cellulose acylate was obtained from $^{13}$C-NMR using the method described in Tezuka et al. (Carbohydr. Res., 273 (1995) 83 to 91).

The aging temperature was set to 40° C. Furthermore, the low-molecular weight component of the cellulose acylate was washed using acetone and removed.

(2) The Preparation of a Dope (Preparation of Cellulose Acylate Solution)

The following composition was injected into a mixing tank, was stirred so as to dissolve individual components, furthermore, was heated at 90° C. for approximately 10 minutes, and then the obtained solution was filtered using a paper filter having an average pore diameter of 34 μm and a sintered metal filter having an average pore diameter of 10 μm, thereby preparing a cellulose acylate solution.

| Cellulose acylate solution | |
|---|---|
| Cellulose acylate having a degree of acetyl substitution of 2.88 | Total 100.0 parts by mass |
| The following plasticizer (polycondensation ester of carboxylic acid and diol) | 15 parts by mass |
| Methylene chloride (first solvent) | 451.0 parts by mass |
| Methanol (second solvent) | 39.0 parts by mass |

Plasticizer: adipic acid as a dicarboxylic acid and a polycondensation ester of ethylene glycol and 1,2-propylene glycol as the diol (the adipic acid:ethylene glycol:1,2-propylene glycol=100:70:30 (mass ratio)) (terminal: an acetyl group, hydroxyl value: 112 mgKOH/g, molecular weight: 1000)

(Preparation of Matting Agent Dispersion Liquid)

Next, the following composition including the cellulose acylate solution produced by the above-described method was injected into a disperser, and a matting agent dispersion liquid was prepared.

| Matting agent dispersion liquid | |
|---|---|
| Matting agent (silica particles having an average particle diameter of 16 nm) (AEROSIL R972 manufactured by Nippon Aerosil Co., Ltd.) | 0.2 parts by mass |
| Methylene chloride (first solvent) | 72.4 parts by mass |

-continued

| Matting agent dispersion liquid | |
|---|---|
| Methanol (second solvent) | 10.8 parts by mass |
| Cellulose acylate solution | 10.3 parts by mass |

(Preparation of Dope for Forming Film)

An amount of the matting agent dispersion liquid of each of Examples and Comparative Examples which made the content of inorganic fine particles reach 0.20 parts by mass with respect to the cellulose acylate resin and 100 parts by mass of the above-described cellulose acylate solution were mixed, thereby preparing a dope for forming a film.

(3) Flow Casting

The dope for forming a film was flow-cast using a band flow-casting machine. Meanwhile, a SUS band was used as the band.

(4) Drying

A web (film) obtained through flow casting was peeled off from the band, and was dried at 100° C. for 20 minutes in a tenter which conveyed the web with both ends of the web clipped using clips.

After that, the web was conveyed to a drying zone at a drying temperature of 120° C. to dry.

The drying temperature mentioned herein refers to the film surface temperature of the film.

(5) Coiling

After that, the films were cooled to room temperature, and were coiled, thereby producing 24 rolls having a roll width of 1340 mm and a roll length of 2600 m under the above-described conditions.

A one meter-long sample (width 1280 mm) was cut out at an interval of 100 m from one of the 24 rolls continuously produced, thereby producing a film 2 (film thickness 25 μm).

[Production of Films 3 and 4]

(1) Cellulose Acylate

Cellulose acylate was synthesized using the method described in JP1998-45804A (JP-H10-45804A) and JP1996-231761A (JP-H08-231761A), thereby preparing cellulose acylate having a degree of acetyl substitution of 2.41. Sulfric acid (7.8 parts by mass with respect to 100 parts by mass of cellulose) was added as a catalyst, acetic acid was added, and an acylation reaction was carried out at 40° C. After that, the amount of the sulfuric acid catalyst, the amount of moisture, and the aging time were adjusted, thereby adjusting the total substitution degree and the 6-position substitution degree. The aging temperature was set to 40° C. Furthermore, the low-molecular weight component of the cellulose acylate was washed using acetone and removed.

(2) Preparation of Dope

<1-1> Cellulose Acylate Solution

The following composition was injected into a mixing tank, was stirred so as to dissolve individual components, furthermore, was heated at 90° C. for approximately 10 minutes, and then the obtained solution was filtered using a paper filter having an average pore diameter of 34 μm and a sintered metal filter having an average pore diameter of 10 μm, thereby preparing a cellulose acylate solution.

| Cellulose acylate solution | |
|---|---|
| Cellulose acylate having a degree of acetyl substitution of 2.41 | 100.0 parts by mass |
| Triphenyl phosphate (TPP) | 8.0 parts by mass |
| Biphenyl diphenyl phosphate (BDP) | 4.0 parts by mass |
| Methylene chloride (first solvent) | 403.0 parts by mass |
| Methanol (second solvent) | 60.2 parts by mass |

<1-2> Matting Agent Dispersion Liquid

Next, the following composition including the cellulose acylate solution produced by the above-described method was injected into a disperser, and a matting agent dispersion liquid was prepared.

| Matting agent dispersion liquid | |
|---|---|
| Silica particles having an average particle diameter of 16 nm (AEROSIL R972 manufactured by Nippon Aerosil Co., Ltd.) | 2.0 parts by mass |
| Methylene chloride (first solvent) | 72.4 parts by mass |
| Methanol (second solvent) | 10.8 parts by mass |
| Cellulose acylate solution | 10.3 parts by mass |

<1-3> Polyester Polyol Solution

Next, the following composition including the cellulose acylate solution produced using the above-described method was injected into a mixing tank, and was stirred under heating so as to be dissolved, thereby preparing a polyester polyol solution. Furthermore, 2 parts by mass of a Re developer AA having the following structure was added to the composition of the film 4 as an additive.

| Polyester polyol solution | |
|---|---|
| Polyester polyol described in Table 1 | 18.5 parts by mass |
| Methylene chloride (first solvent) | 58.3 parts by mass |
| Methanol (second solvent) | 8.7 parts by mass |
| Cellulose acylate solution | 12.8 parts by mass |

The composition of the polyester polyol is described in Table 1. In the table, EG indicates ethylene glycol, PG indicates propylene glycol, TPA indicates terephthalic acid, and SA indicates succinic acid, respectively. The polyester polyol is a non-phosphorus-based ester-based compound and a retardation developer. The terminal of the polyester polyol is sealed with an acetyl group.

TABLE 1

| | Ratio of both terminals sealed with hydroxyl group (%) | Glycol unit | | | Dicarboxylic acid unit | | | Molecular weight |
|---|---|---|---|---|---|---|---|---|
| | | EG (mol %) | PG (mol %) | Average number of carbon atoms | TPA (mol %) | SA (mol %) | Average number of carbon atoms | |
| Polyester polyol | 100 | 50 | 50 | 2.5 | 55 | 45 | 6.2 | 730 |

(Average Number of Carbon Atoms in Glycol Unit, Average Number of Carbon Atoms in Dicarboxylic Acid Unit)

The average number of carbon atoms in a glycol unit was computed from the composition ratio (the composition ratio between ethylene glycol and propylene glycol) of a glycol residue contained in the polyester polyol. In addition, the average number of carbon atoms in a dicarboxylic acid unit was computed from the composition ratio of a dicarboxylic acid residue contained in the polyester polyol.

Re DEVELOPER AA

[Chem. 2]

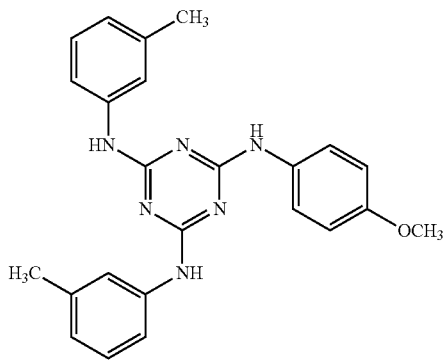

100 parts by mass of the cellulose acylate solution, 1.35 parts by mass of the matting agent dispersion liquid, and an amount of the polyester polyol solution which made the polyester polyol reach 18.5 parts by mass with respect to the cellulose acylate resin were mixed, thereby preparing a dope for forming a film. The unit of the proportion of the polyester polyol or other additives added is 'parts by mass' when the amount of the cellulose acylate reached 100 parts by mass.

(Flow Casting)

The dope for forming a film was flow-cast using a band flow-casting machine. After the dope was dried at an air-supply temperature on the band in a range of 80° C. to 130° C. (the exhaust temperature was in a range of 75° C. to 120° C.), the film peeled off from the band at a residual solvent amount in a range of 25 mass % to 35 mass % was stretched in the width direction at a stretching ratio in a range of 10% to 50% in a tenter zone in which the air-supply temperature was 140° C. (the exhaust temperature was in a range of 90° C. to 125° C.), thereby producing a cellulose acylate film so that the optical characteristic at a wavelength of 550 nm Re (550)/Rth (550) reached 55 nm/118 nm. At this time, the flow-cast film thicknesses were adjusted so that the film thickness of the film 3 after the stretching reached 58 μm, and the film thickness of the film 4 after the stretching reached 38 μm. 24 rolls having a roll width of 1280 mm and a roll length of 2600 m were produced under the above-described conditions. A one meter-long sample (width 1280 mm) was cut out at an interval of 100 m from one of the 24 rolls continuously produced, thereby producing a film 3 and a film 4.

[Production of Film 5]

(Production of Cellulose Acylate Dope)

Individual components described below were injected into a mixing tank, and were stirred so as to be dissolved, thereby preparing a cellulose acylate solution. The concentration of the cellulose acylate was adjusted so as to reach 17 mass %, and a cellulose acylate dope was prepared.

| | |
|---|---|
| Cellulose acylate having a degree of acetyl substitution of 2.88 | 100 parts by mass |
| Plasticizer P-1 | 12 parts by mass |
| Ultraviolet absorbent (UV-1) | 1.8 parts by mass |
| Ultraviolet absorbent (UV-2) | 0.8 parts by mass |

Meanwhile, the composition of a solvent is as described below.

| | |
|---|---|
| Methylene chloride (first solvent) | 92 parts by mass |
| Methanol (second solvent) | 8 parts by mass |

(Ultraviolet absorbent)

[Chem. 3]

UV-1

[Chem. 4]

UV-2

The plasticizer P-1 is a mixture of triphenyl phosphate (TPP)/biphenyl diphenyl phosphate (BDP)=2/1 (mass ratio).

Furthermore, 3.6 parts by mass of the following matting agent dispersion liquid was added to the cellulose acylate dope.

(Matting Agent Dispersion Liquid)

| | |
|---|---|
| Silica particle dispersion liquid (average particle diameter of 16 nm) | 0.7 parts by mass |
| Methylene chloride (first solvent) | 75.5 parts by mass |
| Methanol (second solvent) | 6.5 parts by mass |
| The cellulose acylate dope | 17.3 parts by mass |

(Production of Cellulose Acylate Film)

The cellulose acylate dope was flow-cast on a drum at temperature of 20° C. from a flow-casting opening. A film was peeled off from the drum in a state in which the residual solvent amount was approximately 20 mass %, and was dried with both widthwise ends of the film secured with tenter clips. After that, the film was further dried by being conveyed between rolls in a thermal treatment apparatus, and a film 5 having a film thickness of 25 was produced.

[Production of Film 6]

(Preparation of Cellulose Acylate Solution)

1] Cellulose Acylate

The following cellulose acylate A was used. The cellulose acylate A was heated to 120° C. so as to be dried, the water content ratio was set to 0.5 mass % or less, and then 20 parts by mass of the cellulose acylate A was used.

Cellulose acylate A:

Powder of the cellulose acylate A having a degree of acetyl substitution of 2.86 was used. The viscosity-average polymerization degree of the cellulose acylate A was 300, the 6-position substitution degree of acetyl was 0.89, the acetone extraction was 7 mass %, the ratio of mass-average molecular weight/number-average molecular weight was 2.3, the water content ratio was 0.2 mass %, the viscosity of a 6 mass % dichloromethane solution was 305 mPa·s, the residual acetic acid amount was 0.1 mass % or less, the content of Ca was 65 ppm, the content of Mg was 26 ppm, the content of iron was 0.8 ppm, the content of sulfuric acid ion was 18 ppm, the yellow index was 1.9, and the amount of free acetic acid was 47 ppm. The average particle size of the powder was 1.5 mm, and the standard deviation was 0.5 mm.

2] Solvent

The following solvent A was used. The water content ratio of each solvent was 0.2 mass % or less.

Solvent A: dichloromethane/methanol/butanol=81/18/1 (mass ratio)

3] Additives

A compound A-1 controlling the optical anisotropy and a compound L having the following structure were used as additives. In addition, M2 (silicon dioxide fine particles (particle size: 20 nm, Mohs hardness: approximately 7)) was used as a dope for a support surface and a dope for an air surface. In the following table 2, the unit of the "amount" of each additive is 'parts by mass' when the amount of the cellulose acylate is set to 100 parts by mass.

(Compound Controlling Optical Anisotropy)

A-1: Diacetate body of a condensate of ethanediol/adipic acid (1/1 mol ratio), number-average molecular weight: 1000, hydroxyl value 0 mgKOH/g (Other Additives)

L: COMPOUND HAVING THE FOLLOWING STRUCTURE

[Chem. 5]

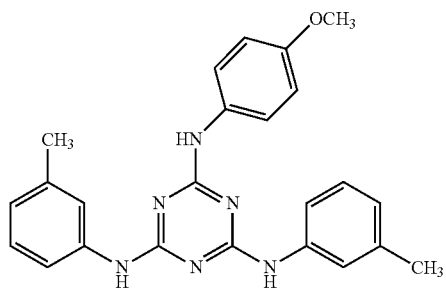

4] Dissolution

The solvent A and the additive (compound L) were injected into a 4000-liter stainless dissolution tank having stirring blades, and the cellulose acylate was gradually added while the solvent A and the additive were stirred and dispersed. After the completion of the injection, the solvent A and the additive were stirred for two hours at room temperature, were swollen for three hours, and then were stirred again, thereby obtaining a cellulose acylate solution.

(Production of Film)

1) Flow Casting Step

Subsequently, the dope in the stock tank was sent. As a flow casting die, an apparatus set to be capable of molding a three-layer-structured film by laminating layers on both surfaces of the main stream by mounting a 2.1 m-wide feed block that had been adjusted for co-flow casting was used. In the following description, a layer formed from the main stream will be called the intermediate layer, the layer on the support surface side will be called a support surface, and the surface on the opposite side will be called the air surface. Meanwhile, three solution-sending flow channels for the dope were used for the intermediate layer, the support surface, and the air surface, and the concentrations of the respective solid contents were appropriately adjusted by adding a solvent so as to decrease the concentration or adding a solution having a high concentration of the solid content so as to increase the concentration.

In addition, the flow-casting width was set to 2000 mm, the flow rate of the dope at a die protrusion opening was adjusted, and flow-casting was carried out. The inlet temperature of a heat-transfer medium being supplied to a jacket was set to 36° C. by providing the jacket in a flow-casting die to adjust the temperature of the dope to 36° C.

The temperatures of the die, the feed block, and the pipe were maintained at 36° C. during the entire operation step.

2) Flow-Casting Die

As the material of the die, dual-phase stainless steel having a mixed composition of an austenite phase and a ferrite phase which had a thermal expansion coefficient of $2\times10^{-6}$ (° $C.^{-1}$) or less and had substantially the same corrosion resistance as SUS316 in a forcible corrosion test in an electrolyte aqueous solution was used.

In addition, a flow-casting die in which WC coating had been formed at a rip front end using a spraying method was used as the flow-casting die. In addition, a mixed solvent (dichloromethane/methanol/butanol (83/15/2 parts by mass)) which was a solvent solubilizing the dope was supplied at 0.5 ml/minute from a single side of the gas-liquid interface between the bead end section and the slit.

3) Metal Support

A mirror surface stainless support which was a drum having a width of 2.1 m and a diameter of 3 m was used as the support. The surface of the support was cast with nickel and was plated with hard chromium. The surface roughness of the drum was polished to 0.01 μm or less, there was no pinhole of 50 μm or more, one or less pin hole in a range of 10 μm to 50 μm per square meter, two or less pinholes of 10 μm or less per square meter. At this time, the temperature of the drum was set to −5° C., and the rotation speed of the drum was set so that the circumferential speed of the drum reached 50 m/minute. Meanwhile, in a case in which the surface of the drum became dirty due to the flow-casting, the surface was appropriately cleaned.

4) Flow-Casting Drying

The dope extracted from the die was flow-cast on the drum disposed in a space that had been set to 15° C., and was cooled so as to turn into a gel. The gel-form dope was peeled off from the drum as a gel-form film (web) when the dope was rotated 320°. At this time, the peeling speed was set to be 106% of the support speed.

5) Tenter Conveyance and Drying Step Conditions

The peeled web was conveyed into a drying zone with the both ends secured with a tenter having pin clips, and was dried using drying air. Therefore, a three-layer-structured film was obtained.

6) Post Drying Step Conditions

The obtained three-layer-structured film was further dried in a roller conveyance zone. The material of the roller was aluminum or carbon steel, and the surface was plated with hard chromium. Regarding the surface shape of the roller, a roller having a flat surface shape and a roller having a surface matted through blasting were used.

7) Post Treatment and Coiling Conditions

The dried three-layer-structured film was cooled to 30° C. or lower, and both lengthwise edges were cut off. The edges were cut off by installing two devices that slit the film edge section at each of both end sections of the film (the number of the slitting devices on each side was two), and slitting the film edge sections of the film. Furthermore, both edges of the film were knurled. The knurls were imparted by carrying out an embossing process from each side. A film having a final product width of 1400 mm was obtained, and was coiled using a coiling device.

The coiling chamber was held at an inside temperature of 25° C. and a humidity of 60%. The diameter of the coil core was set to 169 mm, the tension pattern was set so that the coiling initiation tension was 170 N/string, and the coiling end tension reached 160 N/string, and a film 6 having a film thickness of 50 μm was obtained in a roll form having a total coil length of 2600 m.

A commercially available cellulose acylate film ZRD60 (manufactured by Fujifilm Corporation) was prepared, and was used as a film 9. The film thickness of the film 9 was 60 μm.

A commercially available cellulose acylate film TD60 (manufactured by Fujifilm Corporation) was prepared, and was used as a film 10. The film thickness of the film 10 was 60 μm.

A commercially available cellulose acylate film TD40 (manufactured by Fujifilm Corporation) was prepared, and was used as a film 11. The film thickness of the film 11 was 41 μm.

A commercially available cellulose acylate film TG40 (manufactured by Fujifilm Corporation) was prepared, and was used as a film 12. The film thickness of the film 12 was 41 μm.

TABLE 2

| | Intermediate layer | | | | | | | | |
|---|---|---|---|---|---|---|---|---|---|
| | | Compound controlling optical anisotropy | | | Amount 1 + | Other additives | | Concentration of | Film |
| Film | Type 1 | Amount 1 [mass %] | Type 2 | Amount 2 [mass %] | amount 2 c1 [mass %] | Type | Amount [mass %] | solid content d1 [wt %] | Thickness [μm] |
| Film 6 | A-1 | 55 | — | — | 55 | L | 1.2 | 27.0 | 44 |

| | Support surface | | | | | | | | | |
|---|---|---|---|---|---|---|---|---|---|---|
| | | Compound controlling optical anisotropy | | | Amount 1 − | Other additives | | Concentration of | | Film |
| Film | Type 1 | Amount 1 [mass %] | Type 2 | Amount 2 [mass %] | amount 2 c2(1) [mass %] | Type | Amount [mass %] | solid content d2 (1) [wt %] | Δc [mass %] | Thickness [μm] |
| Film 6 | A-1 | 20 | — | — | 20 | M2 | 0.15 | 20 | 35 | 3 |

| | Air surface | | | | | | | | | |
|---|---|---|---|---|---|---|---|---|---|---|
| | | Compound controlling optical anisotropy | | | Amount 1 − | Other additives | | Concentration of solid content | | Film |
| Film | Type 1 | Amount 1 [mass %] | Type 2 | Amount 2 [mass %] | amount 2 c2(2) [mass %] | Type | Amount [mass %] | d2 (2) [wt %] | Δc [mass %] | thickness [μm] |
| Film 6 | A-1 | 20 | — | — | 20 | M2 | 0.15 | 20 | 35 | 3 |

| | Film total | | |
|---|---|---|---|
| | Compound controlling optical anisotropy | | Other additives |
| Film | Amount 1 [mass %] | Amount 2 [mass %] | Amount [mass %] |
| Film 6 | 95 | — | 1.5 |

[Production of Films 7 to 12]

Additionally, the following films were used as the polarization plate protective film.

A commercially available cellulose acylate film TD80 (manufactured by Fujifilm Corporation) was prepared, and was used as a film 7. The film thickness of the film 7 was 80 μm.

A commercially available cellulose acylate film ZRD40 (manufactured by Fujifilm Corporation) was prepared, and was used as a film 8. The film thickness of the film 8 was 41 μm.

[Production of Film 13]

A norbornene-based optical compensation film that was used in a commercially available liquid crystal television UN46C7000 manufactured by Samsung was peeled off, and was used as a film 13. The film thickness of the film 13 was 52 μm, and the phase difference at a wavelength of 550 nm was Re (550)=55 nm, and Rth (550)=118 nm.

[Production of Film 14]

A cellulose acylate-based optical compensation film that was used in a commercially available liquid crystal television LC-46LX1 manufactured by Sharp Electronic Corporation was peeled off, and was used as a film 14. The film thickness of the film 14 was 50 μm, and the phase difference at a wavelength of 550 nm was Re (550)=55 nm, and Rth (550)=118 nm.

[Measurement of Humidity Dimensional Change Ratio and Elastic Modulus of Polarization Plate Protective Film]

The humidity dimensional change ratio and elastic modulus of the polarization plate protective film were measured using the same method for measuring the humidity dimensional change ratio and elastic modulus of the polarization plate.

[Production of Film 15]

A film 15 was produced using a material and a producing method described below.

(Preparation of Cellulose Acylate Solution)

1] Cellulose Acylate

The cellulose acylate A was used. The cellulose acylate A was heated to 120° C. so as to be dried, and the water content ratio was set to 0.5 mass % or less, and then 20 parts by mass of the cellulose acylate A was used.

2] Solvent 80 parts by mass of the solvent A was used.

3] Additives

A compound A-2 controlling the optical anisotropy and silicon dioxide fine particles M1 were used as additives. In Table 3, the unit of the "amount added" of the compound controlling the optical anisotropy is 'mass %' when the amount of the cellulose acylate is set to 100 mass %. The amount of the additives added to the cellulose acylate solution was adjusted so as to obtain the above-described amount.

(Compound Controlling Optical Anisotropy)

A-2: A condensate of ethanediol/adipic acid (1/1 mol ratio), number-average molecular weight: 1000, hydroxyl value 112 mgKOH/g (Other Additives)

M1: Silicon dioxide fine particles (particle size: 20 nm, Mohs hardness: approximately 7) (0.05 parts by mass)

4] Dissolution

The solvent A and the additive M1 were injected into a 4000-liter stainless dissolution tank including stirring blades, and the cellulose acylate was gradually added while the solvent and the additive were stirred and dispersed. After the completion of the injection, the solvent and the additive were stirred for two hours at room temperature, were swollen for three hours, and then were stirred again, thereby obtaining a cellulose acylate solution.

(Production of Film)

1] Flow Casting Step

Subsequently, the dope in the stock tank was sent. The flow casting die had a width of 2.1 m, and flow-casting was carried out with the flow rate of the dope at the die protrusion opening adjusted by setting the flow-casting width to 2000 mm. The inlet temperature of a heat-transfer medium being supplied to the jacket was set to 36° C. by providing the jacket in the flow-casting die to adjust the temperature of the dope to 36° C.

The temperatures of the die, the feed block, and the pipe were maintained at 36° C. during the entire operation step.

2] Flow-Casting Die

As the material of the die, dual-phase stainless steel having a mixed composition of an austenite phase and a ferrite phase which had a thermal expansion coefficient of $2 \times 10^{-6}$ (° $C.^{-1}$) or less and had substantially the same corrosion resistance as SUS316 in a forcible corrosion test in an electrolyte aqueous solution was used.

In addition, a flow-casting die in which WC coating had been formed at a rip front end using a spraying method was used as the flow-casting die. In addition, a mixed solvent (dichloromethane/methanol/butanol (83/15/2 parts by mass)) which was a solvent solubilizing the dope was supplied at 0.5 ml/minute from a single side of the gas-liquid interface between the bead end section and the slit.

3) Metal Support

A mirror surface stainless support which was a drum having a width of 2.1 m and a diameter of 3 m was used as the support. The surface of the support was cast with nickel and was plated with hard chromium. The surface roughness of the drum was polished to 0.01 μm or less, there was no pinhole of 50 μm or more, one pin hole in a range of 10 μm to 50 μm per square meter, two or less pinholes of 10 μm or less per square meter. At this time, the temperature of the drum was set to −5° C., and the rotation speed of the drum was set so that the circumferential speed of the drum reached 50 m/minute. Meanwhile, in a case in which the surface of the drum became dirty due to the flow-casting, the surface was appropriately cleaned.

4) Flow-Casting Drying

The dope extracted from the die was flow-cast on the drum disposed in a space that had been set to 15° C., and was cooled so as to turn into a gel. The gel-form dope was peeled off from the drum as a gel-form film (web) when the dope was rotated 320°. At this time, the stretching ratio was set to 25% by adjusting the peeling speed with respect to the support speed. The residual solvent amount at the time of initiating stretching was 200 mass %.

Here, the residual solvent amount was computed on the basis of the following equation.

Residual solvent amount(mass %)={(M−N)/N}×100

[In the equation, M indicates the mass of the web (film), and N indicates the mass of the web (film) after being dried at 110° C. for three hours.]

5) Tenter Conveyance and Drying Step Conditions

The peeled web was conveyed into a drying zone with the both ends secured with a tenter having pin clips, and was dried using drying air. Therefore, a cellulose acylate film was obtained.

6) Post Drying Step Conditions

The obtained cellulose acylate film was further dried in a roller conveyance zone. The material of the roller was aluminum or carbon steel, and the surface was plated with hard chromium. Regarding the surface shape of the roller, a roller having a flat surface shape and a roller having a surface matted through blasting were used. A post-heat treatment was carried out on the produced cellulose acylate film at the temperature and the time which are described in Table 3.

7) Post Treatment and Coiling Conditions

The cellulose acylate film after the post-heat treatment was cooled to 30° C. or lower, and both lengthwise edges were cut off. The edges were cut off by installing two devices that slit the film edge section at each of both end sections of the film (the number of the slitting devices on each side was two), and slitting the film edge sections. Furthermore, both edges of the cellulose acylate film were knurled. The knurls were imparted by carrying out an embossing process from each side. A cellulose acylate film having a final product width of 1400 mm was obtained, and was coiled using a coiling device, thereby producing a film 15.

TABLE 3

| Film | Compound controlling optical anisotropy Type | Compound controlling optical anisotropy Addition amount | Other additives | Stretching direction | Residual solvent amount (mass %) | Stretching ratio (%) | Tg (° C.) | Post-heat treatment temperature (° C.) | Post-heat treatment time (hr) | Tension (N) | Film thickness (µm) |
|---|---|---|---|---|---|---|---|---|---|---|---|
| Film 15 | A-2 | 25 | M1 | MD | 200 | 25 | 120 | 130 | 10 | 190 | 41 |

{Saponification Treatment of Polarization Plate Protective Films 2 to 12, 14, and 15}

The polarization plate protective films 2 to 12, 14, and 15 were respectively immersed in an aqueous solution of 2.3 mol/L of sodium hydroxide at 55° C. for three minutes. Next, the films were washed in a water-washing bath at room temperature, and were neutralized at 30° C. using 0.05 mol/L of sulfuric acid. Again, the films were washed in a water-washing bath at room temperature, and furthermore, were dried using hot air at temperature of 100° C. The saponification treatment was carried out on the surface of the polarization plate protective films 2 to 12, 14, and 15 in the above-described manner.

[Production of Polarization Plate Other than Films 1 and 13]

(Production of Front Side Polarization Plate Used in Liquid Crystal Display of Example 1)

The saponification-treated film 10 was attached to a single side of the polarizer A manufactured above using a polyvinyl alcohol adhesive. On the other hand, the saponification-treated film 8 was attached to a surface of the polarizer A on the opposite side to the surface to which the film 10 was attached using the polyvinyl alcohol adhesive.

At this time, the longitudinal direction of the roll of the produced polarizer A and the longitudinal direction of the roll of the film 10 were disposed so as to be parallel to each other. In addition, the longitudinal direction of the roll of the produced polarizer A and the longitudinal direction of the roll of the film 8 were disposed so as to be parallel to each other.

A front side polarization plate used in the liquid crystal display of Example 1 was produced in the above-described manner.

(Production of Front Side Polarization Plate Used in Liquid Crystal Display of Examples 2 to 34 and Comparative Examples 1 to 3)

Regarding the production of front side polarization plates used in the liquid crystal displays of Examples 2 to 34 and Comparative Examples 1 to 3, the front side polarization plates used in the liquid crystal displays of Examples 2 to 34 and Comparative Examples 1 to 3 were produced in the same manner as the production of the front side polarization plate used in the liquid crystal display of Example 1 except for the fact that, in the production of the front side polarization plate used in the liquid crystal display of Example 1, the polarization plate protective films and the polarizer were changed so as to form a configuration of the viewing side protective film, the polarizer, and the cell side protective film as described in the following table. In Examples 27 to 34 and Comparative Example 3, the transmission axis of the polarizer and the slow axis of the polarization plate protective film disposed on the liquid crystal cell side were disposed so as to be parallel to each other, and the transmission axis of the polarizer and the slow axis of the polarization plate protective film disposed on the viewing side were disposed so as to be orthogonal to each other.

A polarization plate including the films 1 and 13 was produced as described below.

(Production of Rear Side Polarization Plate Used in Liquid Crystal Display of Example 1)

The saponification-treated film 8 was attached to a single side of the polarizer A manufactured above using a polyvinyl alcohol adhesive. On the other hand, the saponification-treated film 11 was attached to a surface of the polarizer A on the opposite side to the surface to which the film 8 was attached using the polyvinyl alcohol adhesive.

At this time, the longitudinal direction of the roll of the produced polarizer A and the longitudinal direction of the roll of the film 8 were disposed so as to be parallel to each other. In addition, the longitudinal direction of the roll of the polarizer A and the longitudinal direction of the roll of the film 11 were disposed so as to be parallel to each other.

A rear side polarization plate used in the liquid crystal display of Example 1 was produced in the above-described manner.

(Production of Rear Side Polarization Plate Used in Liquid Crystal Display of Examples 2 to 34 and Comparative Examples 1 to 3)

Regarding the production of rear side polarization plates used in the liquid crystal displays of Examples 2 to 34 and Comparative Examples 1 to 3, the rear side polarization plates used in the liquid crystal displays of Examples 2 to 34 and Comparative Examples 1 to 3 were produced in the same manner as the production of the rear side polarization plate used in the liquid crystal display of Example 1 except for the fact that, in the production of the rear side polarization plate used in the liquid crystal display of Example 1, the polarization plate protective films and the polarizer were changed so as to form a configuration of the cell side protective film, the polarizer, and the light source side protective film as described in the following table. In Examples 27 to 31 and Comparative Example 3, the transmission axis of the polarizer and the slow axis of the polarization plate protective film disposed on the liquid crystal cell side were disposed so as to be parallel to each other, and the transmission axis of the polarizer and the slow axis of the polarization plate protective film disposed on the light source side were disposed so as to be orthogonal to each other.

A polarization plate including the film 1 or 13 was produced as described below.

[Production of Polarization Plate Including Film 1 or 13]

In the production of a polarization plate including the film 1 or 13, instead of attaching the film to a single side of the polarizer using the polyvinyl alcohol adhesive, the film 1 or 13 was attached to the polarizer using the following epoxy-based adhesive composition and an attaching roll, and then the adhesive composition was cured by radiating light using a metal halide lamp so that the accumulated amount of light at a wavelength in a range of 320 nm to 400 nm reached 600 mJ/cm$^2$, thereby attaching the film 1 or 13 to a single side of the polarizer.

The same operation was carried out even in a case in which the film 1 or 13 was attached to both sides of the polarizer.

(Epoxy-Based Adhesive Composition)

| | |
|---|---|
| 3,4-epoxycyclohexylmethyl 3,4-epoxycychlohexane carboxylate | 40 parts by mass |
| Bisphenol A-type epoxy resin | 60 parts by mass |
| Diphenyl [4-(phenylthio)phenyl]sulfonium hexafluoroantimonate (cationic polarization initiator) | 4.0 parts by mass |
| Benzoin methyl ether (photosensitizer) | 1.0 part by mass |

The epoxy equivalent of the 3,4-epoxycyclohexylmethyl 3,4-epoxycychlohexane carboxylate was 126 g/eq, and the epoxy equivalent of the bisphenol A-type epoxy resin was 187 g/eq. In addition, the total chlorine amount of the epoxy-based adhesive composition was 840 ppm, and the viscosity measured at 60 rpm of a B-type viscometer at 25° C. was 3000 mPa·s. The total chlorine amount of the epoxy-based adhesive composition was measured on the basis of JIS K 7243-3 (ISO 21627-3) using a titration method in which a silver nitrate solution was used.

[Measurement of Contractive Force D of Front Side Polarization Plate in Absorption Axis Direction]

The humidity dimensional change ratio [%] of the front side polarization plate in the absorption axis direction was measured in the following manner.

A specimen having a length of 12 cm (measurement direction) and a width of 3 cm was prepared, pin holes were opened at an interval of 10 cm in the specimen in an environment of a 25° C. relative humidity of 60%, the specimen was left to stand in an environment of a 60° C. relative humidity of 90% for 48 hours, subsequently, was left to stand in an environment of a 25° C. relative humidity of 80% for 48 hours, and then the interval between the pin holes was measured using a pin gauge (the measured value was indicated as LA1). Similarly, the specimen was left to stand in an environment of a 60° C. relative humidity of 90% for 48 hours, subsequently, was left to stand in an environment of a 25° C. relative humidity of 10% for 48 hours, and then the interval between the pin holes was measured using a pin gauge (the measured value was indicated as LC0). The humidity dimensional change ratio of the front side polarization plate in the absorption axis direction was computed from the following equation using the measured values.

Humidity dimensional change ratio of the front side polarization plate in the absorption axis direction [%]={(LA1[cm]−LC0[cm])/10[cm]}×100

The contractive force D (N/m) of the front side polarization plate in the absorption axis direction was computed from the humidity dimensional change ratio (%) of the front side polarization plate in the absorption axis direction computed from the above-described equation and the elastic modulus (GPa) of the front side polarization plate in the absorption axis direction according to the following equation.

Contractive force D (N/m) of the front side polarization plate in the absorption axis direction=elastic modulus (GPa) of the front side polarization plate in the absorption axis direction×|humidity dimensional change ratio (%) of the front side polarization plate in the absorption axis direction|×thickness (μm) of the front side polarization plate×10

[Measurement of Contractive Force H of Rear Side Polarization Plate in Transmission Axis Direction]

Similarly, the humidity dimensional change ratio [%] of the rear side polarization plate in the transmission axis direction was measured in the following manner.

A specimen having a length of 12 cm (measurement direction) and a width of 3 cm was prepared, pin holes were opened at an interval of 10 cm in the specimen in an environment of a 25° C. relative humidity of 60%, the specimen was left to stand in an environment of a 60° C. relative humidity of 90% for 48 hours, subsequently, was left to stand in an environment of a 25° C. relative humidity of 80% for 48 hours, and then the interval between the pin holes was measured using a pin gauge (the measured value was indicated as LA1). Similarly, the specimen was left to stand in an environment of a 60° C. relative humidity of 90% for 48 hours, subsequently, was left to stand in an environment of a 25° C. relative humidity of 60% for 48 hours, and then the interval between the pin holes was measured using a pin gauge (the measured value was indicated as LB0). The humidity dimensional change ratio of the rear side polarization plate in the transmission axis direction was computed from the following equation using the measured values.

Humidity dimensional change ratio of the rear side polarization plate in the transmission axis direction [%]={(LA1[cm]−LB0[cm])/10[cm]}×100

The contractive force H (N/m) of the rear side polarization plate in the transmission axis direction can be computed from the humidity dimensional change ratio (%) of the rear side polarization plate in the transmission axis direction computed from the above-described equation and the elastic modulus (GPa) of the rear side polarization plate in the transmission axis direction according to the following equation.

Contractive force H (N/m) of the rear side polarization plate in the transmission axis direction=elastic modulus (GPa) of the rear side polarization plate in the transmission axis direction×|humidity dimensional change ratio (%) of the rear side polarization plate in the transmission axis direction|×thickness (μm) of the rear side polarization plate×10

In addition, regarding the elastic modulus (GPa) of each polarization plate in the absorption axis (MD) direction and the transmission axis (TD) direction, a specimen having a measurement-direction length of 200 mm and a width of 10 mm was prepared, the specimen was left to stand in an environment of a 60° C. relative humidity of 90% for 48 hours, and then was left to stand in an environment of a 25° C. relative humidity of 60% for 48 hours, a STROGRAPH V10-C manufactured by Toyo Seiki Seisaku-sho, Ltd. was installed so that the longitudinal chuck interval reached 10 cm, a load was applied so that the chuck interval widened at a stretching rate of 10 mm/minute, and the force at that time was measured. The elastic modulus was computed from the thickness of the polarization plate measured in advance using a micrometer, the force, and the degree of the polarization plate stretched.

The film thickness of each polarization plate was measured in the following manner.

A 5 cm×5 cm specimen was prepared, was left to stand in an environment of a 60° C. relative humidity of 90% for 48 hours, subsequently, was left to stand in an environment of a 25° C. relative humidity of 60% for 48 hours, and the average value of film thicknesses measured at six points on the in-plane was used as the film thickness of the polarization plate.

Regarding the respective examples, and the respective comparative examples, the humidity dimensional change ratio of the front side polarization plate in the absorption axis direction (in the following table, referred to simply as "MD humidity dimensional change at 10% to 80%"), the humidity dimensional change ratio of the rear side polarization plate in the transmission axis direction (in the following table, referred to simply as "TD humidity dimensional change at 60% to 80%"), the contractive forces D, H, and the difference thereof (D−H) are described in the following table.

[Production of Liquid Crystal Display]

(Production of Liquid Crystal Display of Example 1)

Two polarization plates in a commercially available IPS-type liquid crystal television (42LS5600 manufactured by LG Electronics Incorporated) were peeled off, the front side polarization plate used in the liquid crystal display of Example 1 was attached to the front side and the rear side polarization plate used in the liquid crystal display of Example 1 was attached to the rear side using an adhesive so that the films 8 were placed on the liquid crystal cell side respectively. A cross Nicol disposition was made so that the absorption axis of the front side polarization plate lay in the longitudinal direction (transverse direction) and the transmittance axis of the rear side polarization plate lay in the longitudinal direction (transverse direction). The thickness of the glass used in the liquid crystal cell was 0.5 mm.

The liquid crystal display of Example 1 was obtained in the above-described manner.

(Production of Liquid Crystal Displays of Examples 2 to 26, 32 to 34, Comparative Examples 1 and 2)

In the production of the liquid crystal display of Example 1, liquid crystal displays of Examples 2 to 26, 32 to 34, and Comparative Examples 1 and 2 were manufactured in the same manner as the production of the liquid crystal display of Example 1 except for the fact that the front side polarization plate used in the liquid crystal display of Example 1 was changed to a front side polarization plate built to have a configuration of the viewing side protective film, the polarizer, and the cell side protective film as described in the following table, and the rear side polarization plate used in the liquid crystal display of Example 1 was changed to a rear side polarization plate built to have a configuration of the cell side protective film, the polarizer, and the light source side protective film as described in the following table.

(Production of Liquid Crystal Display of Example 27)

Two polarization plates in a commercially available VA-type liquid crystal television (39E61HR manufactured by Skyworth) were peeled off, the front side polarization plate used in the liquid crystal display of Example 27 was attached to the front side and the rear side polarization plate used in the liquid crystal display of Example 27 was attached to the rear side using an adhesive so that the films 3 were placed on the liquid crystal cell side respectively. A cross Nicol disposition was made so that the absorption axis of the front side polarization plate lay in the longitudinal direction (transverse direction) and the transmittance axis of the rear side polarization plate lay in the longitudinal direction (transverse direction). The thickness of the glass used in the liquid crystal cell was 0.5 mm.

The liquid crystal display of Example 27 was obtained in the above-described manner.

(Production of Liquid Crystal Displays of Examples 28 to 31, and Comparative Example 3)

In the production of the liquid crystal display of Example 27, liquid crystal displays of Examples 28 to 31, and Comparative Example 3 were manufactured in the same manner as the production of the liquid crystal display of Example 27 except for the fact that the front side polarization plate used in the liquid crystal display of Example 27 was changed to a front side polarization plate built to have a configuration of the viewing side protective film, the polarizer, and the cell side protective film as described in the following table, and the rear side polarization plate used in the liquid crystal display of Example 1 was changed to a rear side polarization plate built to have a configuration of the cell side protective film, the polarizer, and the light source side protective film as described in the following table.

[Warp Evaluation]

After the temperature and the humidity were adjusted at a 60° C. relative humidity of 90% for 48 hours, the liquid crystal displays of Examples and Comparative Examples produced as described above were left to stand in an environment of a 25° C. relative humidity of 60% for two hours, and then the backlights in the liquid crystal displays were turned on. Then, warping was evaluated by evaluating light leakage at four corners of the panel after the lapse of 5 hours to 10 hours from the turning-on of the backlights.

Light leakage was evaluated by photographing a black-displaying screen from the front surface of the screen using a brightness measurement camera "ProMetric" (manufactured by Radiant Imaging), and using the average brightness of the entire screen and the brightness difference between positions with great light leakage at four corners.

Light leakage and warping were evaluated in the same manner in a case in which the humidity and the temperature were adjusted at a 50° C. relative humidity of 80% for 72 hours instead of a 60° C. relative humidity of 90% for 48 hours, and the evaluation result of light leakage and warping were the same as the case in which the humidity and the temperature were adjusted at a 60° C. relative humidity of 90% for 48 hours.

~Evaluation Index~

A: No light leakage is observed at four corners of the panel (the same degree of light leakage in the panel as before the temperature and the humidity are adjusted).

B: Out of four corners of the panel, slight light leakage is observed at one or two corners, which is permissible.

C: Out of four corners of the panel, slight light leakage is observed at three or four corners, which is permissible.

D: Light leakage is strong at four corners of the panel, which is not permissible.

TABLE 4

| | Front side polarization plate | | | Rear side polarization plate | | | Front side polarization plate | | | | Rear side polarization plate | | | | | Evaluation of warp variation |
|---|---|---|---|---|---|---|---|---|---|---|---|---|---|---|---|---|
| | Viewing side protective film | Polarizer | Cell side protective film | Liquid cystal cell | Cell side protective film | Polarizer | Light source side protective film | Film thickness (μm) | MD elastic modulus (GPa) | MD humidity dimensional change at 10% to 80% | Contractive force D (×10 N/m) | Film thickness (μm) | TD elastic modulus (GPa) | TD humidity dimensional change at 60% to 80% | Contractive force II (×10 N/m) | D-H | |
| | | | | [IPS panel] | | | | | | | | | | | | | |
| Comparative Example 1 | Film 10 | Polarizer A | Film 9 | 42LS5600 by LG | Film 1 | Polarizer A | Film 10 | 144.0 | 6.6 | 0.56 | 527 | 124.1 | 3.7 | 0.29 | 134 | 393 | D |
| Comparative Example 2 | Film 10 | Polarizer A | Film 9 | 42LS5600 by LG | Film 2 | Polarizer A | Film 5 | 144 | 6.6 | 0.56 | 527 | 73.2 | 4.5 | 0.33 | 111 | 417 | D |
| Example 1 | Film 10 | Polarizer A | Film 8 | 42LS5600 by LG | Film 8 | Polarizer A | Film 11 | 125.5 | 7.0 | 0.56 | 492 | 105.9 | 3.8 | 0.32 | 131 | 361 | C |
| Example 2 | Film 11 | Polarizer A | Film 8 | 42LS5600 by LG | Film 1 | Polarizer A | Film 10 | 105.9 | 7.5 | 0.59 | 468 | 124.1 | 3.7 | 0.29 | 134 | 334 | C |
| Example 3 | Film 10 | Polarizer A | Film 9 | 42LS5600 by LG | Film 9 | Polarizer A | Film 7 | 144.0 | 6.6 | 0.56 | 527 | 163.4 | 3.7 | 0.29 | 178 | 349 | C |
| Example 4 | Film 1 | Polarizer A | Film 1 | 42LS5600 by LG | Film 1 | Polarizer A | Film 1 | 103.7 | 6.9 | 0.60 | 428 | 103.7 | 3.7 | 0.28 | 108 | 320 | B |
| Example 5 | Film 1 | Polarizer A | Film 1 | 42LS5600 by LG | Film 1 | Polarizer A | Film 10 | 103.7 | 6.9 | 0.60 | 428 | 124.1 | 3.7 | 0.29 | 134 | 294 | A |
| Example 6 | Film 10 | Polarizer A | Film 1 | 42LS5600 by LG | Film 1 | Polarizer A | Film 10 | 124.1 | 6.9 | 0.55 | 472 | 124.1 | 3.7 | 0.29 | 134 | 338 | C |
| Example 7 | Film 11 | Polarizer A | Film 1 | 42LS5600 by LG | Film 1 | Polarizer A | Film 10 | 104.5 | 7.4 | 0.58 | 448 | 124.1 | 3.7 | 0.29 | 134 | 314 | B |
| Example 8 | Film 10 | Polarizer A | Film 8 | 42LS5600 by LG | Film 1 | Polarizer A | Film 10 | 125.5 | 7.0 | 0.56 | 492 | 125.5 | 3.7 | 0.32 | 146 | 346 | C |
| Example 9 | Film 11 | Polarizer A | Film 8 | 42LS5600 by LG | Film 1 | Polarizer A | Film 10 | 105.9 | 7.2 | 0.61 | 465 | 124.1 | 3.7 | 0.29 | 134 | 331 | C |
| Example 10 | Film 10 | Polarizer A | Film 9 | 42LS5600 by LG | Film 8 | Polarizer A | Film 10 | 125.5 | 7.0 | 0.56 | 492 | 144.0 | 3.7 | 0.30 | 160 | 332 | C |
| Example 11 | Film 11 | Polarizer A | Film 9 | 42LS5600 by LG | Film 9 | Polarizer A | Film 10 | 105.9 | 7.5 | 0.59 | 468 | 144.0 | 3.7 | 0.30 | 160 | 308 | B |
| Example 12 | Film 12 | Polarizer A | Film 9 | 42LS5600 by LG | Film 9 | Polarizer A | Film 10 | 105.9 | 7.2 | 0.61 | 465 | 144.0 | 3.7 | 0.30 | 160 | 305 | B |
| Example 13 | Film 5 | Polarizer A | Film 2 | 42LS5600 by LG | Film 1 | Polarizer A | Film 10 | 73.2 | 9.0 | 0.66 | 435 | 124.1 | 3.7 | 0.29 | 134 | 301 | B |
| Example 14 | Film 5 | Polarizer A | Film 8 | 42LS5600 by LG | Film 8 | Polarizer A | Film 11 | 89.9 | 7.8 | 0.64 | 447 | 105.9 | 3.8 | 0.32 | 131 | 316 | B |
| Example 15 | Film 11 | Polarizer A | Film 8 | 42LS5600 by LG | Film 8 | Polarizer A | Film 11 | 105.9 | 7.5 | 0.59 | 468 | 105.9 | 3.8 | 0.32 | 131 | 337 | C |
| Example 16 | Film 11 | Polarizer A | Film 8 | 42LS5600 by LG | Film 10 | Polarizer A | Film 10 | 105.9 | 7.5 | 0.59 | 468 | 133.8 | 3.0 | 0.31 | 127 | 341 | C |
| Example 17 | Film 5 | Polarizer A | Film 2 | 42LS5600 by LG | Film 10 | Polarizer A | Film 5 | 73.2 | 9.0 | 0.66 | 435 | 98.2 | 3.0 | 0.35 | 103 | 333 | C |
| Example 18 | Film 5 | Polarizer A | Film 2 | 42LS5600 by LG | Film 2 | Polarizer A | Film 5 | 73.2 | 9.0 | 0.66 | 435 | 73.2 | 4.5 | 0.33 | 111 | 325 | D |

TABLE 4-continued

| | Front side polarization plate | | | Rear side polarization plate | | | Front side polarization plate | | | | | Rear side polarization plate | | | | | |
|---|---|---|---|---|---|---|---|---|---|---|---|---|---|---|---|---|---|
| | Viewing side protective film | Polarizer | Cell side protective film | Liquid cystal cell | Cell side protective film | Polarizer | Light source side protective film | Film thickness (µm) | MD elastic modulus (GPa) | MD humidity dimensional change at 10% to 80% | Contractive force D (×10 N/m) | Film thickness (µm) | TD elastic modulus (GPa) | TD humidity dimensional change at 60% to 80% | Contractive force II (×10 N/m) | D-H | Evaluation of warp variation |
| Example 19 | Film 11 | Polarizer A | Film 8 | 42LS5600 by LG | Film 9 | Polarizer B | Film 10 | 105.9 | 7.5 | 0.59 | 468 | 146.3 | 3.7 | 0.31 | 157 | 301 | B |
| Example 20 | Film 11 | Polarizer A | Film 8 | 42LS5600 by LG | Film 8 | Polarizer B | Film 10 | 105.9 | 7.5 | 0.59 | 468 | 127.8 | 3.7 | 0.32 | 153 | 315 | B |
| Example 21 | Film 11 | Polarizer A | Film 8 | 42LS5600 by LG | Film 9 | Polarizer C | Film 10 | 105.9 | 7.5 | 0.59 | 468 | 148.6 | 3.7 | 0.31 | 175 | 293 | A |
| Example 22 | Film 11 | Polarizer A | Film 8 | 42LS5600 by LG | Film 8 | Polarizer C | Film 10 | 105.9 | 7.5 | 0.59 | 468 | 130.1 | 3.7 | 0.33 | 161 | 307 | B |
| Example 23 | Film 10 | Polarizer D | Film 8 | 42LS5600 by LG | Film 1 | Polarizer A | Film 10 | 123.2 | 6.7 | 0.55 | 460 | 124.1 | 3.7 | 0.29 | 134 | 326 | B |
| Example 24 | Film 11 | Polarizer D | Film 8 | 42LS5600 by LG | Film 1 | Polarizer A | Film 10 | 103.6 | 7.3 | 0.58 | 436 | 124.1 | 3.7 | 0.29 | 134 | 302 | B |
| Example 25 | Film 10 | Polarizer E | Film 8 | 42LS5600 by LG | Film 1 | Polarizer A | Film 10 | 120.9 | 6.5 | 0.54 | 428 | 124.1 | 3.7 | 0.29 | 134 | 294 | A |
| Example 26 | Film 11 | Polarizer E | Film 8 | 42LS5600 by LG | Film 1 | Polarizer A | Film 10 | 101.2 | 7.0 | 0.57 | 404 | 124.1 | 3.7 | 0.29 | 134 | 270 | A |
| Example 32 | Film 11 | Polarizer E | Film 15 | 42LS5600 by LG | Film 15 | Polarizer E | Film 11 | 100.7 | 6.9 | 0.53 | 367 | 100.7 | 3.7 | 0.29 | 110 | 257 | A |
| Example 33 | Film 11 | Polarizer E | Film 15 | 42LS5600 by LG | Film 1 | Polarizer E | Film 1 | 100.7 | 6.9 | 0.53 | 367 | 99.1 | 3.6 | 0.26 | 93 | 274 | A |
| Example 34 | Film 11 | Polarizer E | Film 15 | 42LS5600 by LG | Film 1 | Polarizer E | Film 11 | 100.7 | 6.9 | 0.53 | 367 | 99.8 | 3.8 | 0.27 | 105 | 263 | A |
| | | | | [VA panel] | | | | | | | | | | | | | |
| Comparative Example 3 | Film 10 | Polarizer A | Film 14 | 39E61HR by Skyworth | Film 13 | Polarizer A | Film 10 | 133.8 | 6.5 | 0.61 | 527 | 135.8 | 3.3 | 0.26 | 118 | 409 | D |
| Example 27 | Film 11 | Polarizer A | Film 3 | 39E61HR by Skyworth | Film 3 | Polarizer A | Film 10 | 122.2 | 6.7 | 0.63 | 510 | 141.8 | 4.4 | 0.24 | 147 | 363 | C |
| Example 28 | Film 7 | Polarizer A | Film 13 | 39E61HR by Skyworth | Film 13 | Polarizer A | Film 10 | 155.2 | 6.2 | 0.47 | 446 | 135.8 | 3.3 | 0.26 | 118 | 328 | B |
| Example 29 | Film 11 | Polarizer A | Film 13 | 39E61HR by Skyworth | Film 13 | Polarizer A | Film 10 | 116.2 | 6.6 | 0.52 | 397 | 135.8 | 3.3 | 0.26 | 118 | 279 | A |
| Example 30 | Film 11 | Polarizer A | Film 13 | 39E61HR by Skyworth | Film 3 | Polarizer A | Film 10 | 116.2 | 6.6 | 0.52 | 397 | 141.8 | 4.4 | 0.24 | 147 | 250 | A |
| Example 31 | Film 11 | Polarizer E | Film 4 | 39E61HR by Skyworth | Film 13 | Polarizer A | Film 10 | 97.4 | 7.0 | 0.61 | 416 | 135.8 | 3.3 | 0.26 | 118 | 298 | A |

As is evident from the results described in Table 4, it is found that, in Comparative Examples 1 to 3 in which the difference (D−H) of the contractive force was 365×10 N/m or less, warping occurred at an impermissible level.

Meanwhile, it is found that, in Examples 1 to 34 in which the difference (D−H) of the contractive force was 365×10 N/m or less, warping did not occur, or occurred at a permissible level.

Particularly, it is found that, in Examples 4, 5, 7, 11 to 14, 18 to 26, and 28 to 34 in which the difference (D−H) of the contractive force exceeded 330×10 N/m, warping particularly seldom occurred.

The film thicknesses and performance of the polarization plate protective films in the front side and rear side polarization plates and the polarizers in the liquid crystal displays of the respective examples and comparative examples are described in Table 5.

In Table 5, the humidity dimensional change ratio in the absorption axis direction of the polarization plate protective film and polarizer in the front side polarization plate (in the following table, referred to simply as "MD humidity dimensional change at 10% to 80%"), the humidity dimensional change ratio in the transmission axis direction of the protective film and polarizer in the rear side polarization plate (in the following table, referred to simply as "TD humidity dimensional change at 60% to 80%") were measured according to the above-described method for measuring the humidity dimensional change ratio of the front side polarization plate in the absorption axis direction and the humidity dimensional change ratio of the rear side polarization plate in the transmission axis direction.

In addition, the film thicknesses and elastic moduli (GPa) in the absorption axis (MD) direction and the transmission axis (TD) direction of the respective polarization plate protective films and the polarizers were measured according to the above-described method for measuring the film thicknesses and elastic moduli in the absorption axis (MD) direction and the transmission axis (TD) direction of the respective polarization plates.

TABLE 5

| | Front side polarization plate | | | | | | | | Rear side polarization plate | | | | | | | |
|---|---|---|---|---|---|---|---|---|---|---|---|---|---|---|---|---|
| | Viewing side protective film | | | Polarizer | | | Cell side protective film | | | Cell side protective film | | | Polarizer | | | Light source side protective film | | |
| | Film thickness (μm) | MD elastic modulus (GPa) | MD humidity dimensional change at 10% to 80% | Film thickness (μm) | MD elastic modulus (GPa) | MD humidity dimensional change at 10% to 80% | Film thickness (μm) | MD elastic modulus (GPa) | MD humidity dimensional change at 10% to 80% | Film thickness (μm) | TD elastic modulus (GPa) | TD humidity dimensional change at 60% to 80% | Film thickness (μm) | TD elastic modulus (GPa) | TD humidity dimensional change at 60% to 80% | Film thickness (μm) | TD elastic modulus (GPa) | TD humidity dimensional change at 60% to 80% |
| Comparative Example 1 | 60.6 | 4.5 | 0.36 | 23.2 | 19.2 | 0.72 | 60.2 | 3.8 | 0.48 | 40.3 | 3.3 | 0.13 | 23.2 | 5.1 | 0.62 | 60.6 | 3.4 | 0.21 |
| Comparative Example 2 | 60.6 | 4.5 | 0.36 | 23.2 | 19.2 | 0.72 | 60.2 | 3.8 | 0.48 | 25.0 | 4.7 | 0.15 | 23.2 | 5.1 | 0.62 | 25.0 | 3.8 | 0.20 |
| Example 1 | 60.6 | 4.5 | 0.36 | 23.2 | 19.2 | 0.72 | 41.7 | 3.8 | 0.47 | 41.7 | 3.2 | 0.21 | 23.2 | 5.1 | 0.62 | 41.0 | 3.8 | 0.18 |
| Example 2 | 41.0 | 4.7 | 0.38 | 23.2 | 19.2 | 0.72 | 41.7 | 3.8 | 0.47 | 40.3 | 3.3 | 0.13 | 23.2 | 5.1 | 0.62 | 60.6 | 3.4 | 0.21 |
| Example 3 | 60.6 | 4.5 | 0.36 | 23.2 | 19.2 | 0.72 | 60.2 | 3.8 | 0.48 | 60.2 | 3.4 | 0.21 | 23.2 | 5.1 | 0.62 | 80.0 | 3.6 | 0.21 |
| Example 4 | 60.6 | 4.5 | 0.36 | 23.2 | 19.2 | 0.72 | 40.3 | 3.3 | 0.40 | 40.3 | 3.3 | 0.13 | 23.2 | 5.1 | 0.62 | 40.3 | 3.3 | 0.13 |
| Example 5 | 40.3 | 3.3 | 0.40 | 23.2 | 19.2 | 0.72 | 40.3 | 3.3 | 0.40 | 40.3 | 3.3 | 0.13 | 23.2 | 5.1 | 0.62 | 60.6 | 3.4 | 0.21 |
| Example 6 | 60.6 | 4.5 | 0.36 | 23.2 | 19.2 | 0.72 | 40.3 | 3.3 | 0.40 | 40.3 | 3.3 | 0.13 | 23.2 | 5.1 | 0.62 | 60.6 | 3.4 | 0.21 |
| Example 7 | 41.0 | 4.7 | 0.38 | 23.2 | 19.2 | 0.72 | 41.7 | 3.8 | 0.47 | 41.7 | 3.2 | 0.21 | 23.2 | 5.1 | 0.62 | 60.6 | 3.4 | 0.21 |
| Example 8 | 60.6 | 4.5 | 0.36 | 23.2 | 19.2 | 0.72 | 41.7 | 3.8 | 0.47 | 40.3 | 3.3 | 0.13 | 23.2 | 5.1 | 0.62 | 60.6 | 3.4 | 0.21 |
| Example 9 | 41.0 | 4.0 | 0.43 | 23.2 | 19.2 | 0.72 | 41.7 | 3.8 | 0.47 | 41.7 | 3.3 | 0.21 | 23.2 | 5.1 | 0.62 | 60.6 | 3.4 | 0.21 |
| Example 10 | 60.6 | 4.5 | 0.36 | 23.2 | 19.2 | 0.72 | 41.7 | 3.8 | 0.47 | 60.2 | 3.4 | 0.21 | 23.2 | 5.1 | 0.62 | 60.6 | 3.4 | 0.21 |
| Example 11 | 41.0 | 4.7 | 0.38 | 23.2 | 19.2 | 0.72 | 41.7 | 3.8 | 0.47 | 60.2 | 3.4 | 0.21 | 23.2 | 5.1 | 0.62 | 60.6 | 3.4 | 0.21 |
| Example 12 | 41.0 | 4.0 | 0.43 | 23.2 | 19.2 | 0.72 | 41.7 | 3.8 | 0.47 | 60.2 | 3.4 | 0.21 | 23.2 | 5.1 | 0.62 | 60.6 | 3.4 | 0.21 |
| Example 13 | 25.0 | 3.9 | 0.54 | 23.2 | 19.2 | 0.72 | 25.0 | 4.7 | 0.53 | 40.3 | 3.3 | 0.13 | 23.2 | 5.1 | 0.62 | 60.6 | 3.4 | 0.21 |
| Example 14 | 25.0 | 3.9 | 0.54 | 23.2 | 10.2 | 0.72 | 41.7 | 3.8 | 0.47 | 41.7 | 3.2 | 0.21 | 23.2 | 5.1 | 0.62 | 41.0 | 3.8 | 0.18 |
| Example 15 | 41.0 | 4.7 | 0.38 | 23.2 | 19.2 | 0.72 | 41.7 | 3.8 | 0.47 | 41.7 | 3.2 | 0.21 | 23.2 | 5.1 | 0.62 | 41.0 | 3.8 | 0.18 |
| Example 16 | 41.0 | 4.7 | 0.38 | 23.2 | 19.2 | 0.72 | 41.7 | 3.8 | 0.47 | 50.0 | 1.6 | 0.12 | 23.2 | 5.1 | 0.62 | 60.6 | 3.4 | 0.21 |
| Example 17 | 25.0 | 3.9 | 0.54 | 23.2 | 19.2 | 0.72 | 25.0 | 4.7 | 0.53 | 50.0 | 1.6 | 0.12 | 23.2 | 5.1 | 0.62 | 25.0 | 3.8 | 0.20 |
| Example 18 | 25.0 | 3.9 | 0.54 | 23.2 | 19.2 | 0.72 | 25.0 | 4.7 | 0.53 | 25.0 | 4.7 | 0.15 | 23.2 | 5.1 | 0.62 | 25.0 | 3.8 | 0.20 |
| Example 19 | 41.0 | 4.7 | 0.38 | 23.2 | 19.2 | 0.72 | 41.7 | 3.8 | 0.47 | 60.2 | 3.4 | 0.21 | 23.2 | 5.1 | 0.62 | 60.6 | 3.4 | 0.21 |
| Example 20 | 41.0 | 4.7 | 0.38 | 23.2 | 19.2 | 0.72 | 60.2 | 3.8 | 0.47 | 60.2 | 3.4 | 0.21 | 23.2 | 5.1 | 0.62 | 60.6 | 3.4 | 0.21 |
| Example 21 | 41.0 | 4.7 | 0.38 | 23.2 | 19.2 | 0.72 | 41.7 | 3.8 | 0.47 | 60.2 | 3.4 | 0.21 | 23.2 | 5.1 | 0.62 | 60.6 | 3.4 | 0.21 |
| Example 22 | 41.0 | 4.7 | 0.38 | 20.9 | 19.2 | 0.72 | 41.7 | 3.8 | 0.47 | 41.7 | 3.2 | 0.13 | 23.2 | 5.1 | 0.62 | 60.6 | 3.4 | 0.21 |
| Example 23 | 60.6 | 4.5 | 0.36 | 20.9 | 19.2 | 0.72 | 41.7 | 3.8 | 0.47 | 40.3 | 3.3 | 0.13 | 23.2 | 5.1 | 0.62 | 60.6 | 3.4 | 0.21 |
| Example 24 | 60.6 | 4.5 | 0.38 | 18.6 | 19.2 | 0.72 | 41.7 | 3.8 | 6.47 | 50.0 | 3.3 | 0.13 | 25.5 | 5.1 | 0.62 | 60.6 | 3.4 | 0.21 |
| Example 25 | 60.6 | 4.5 | 0.36 | 18.6 | 19.2 | 0.72 | 41.7 | 3.8 | 0.47 | 40.3 | 3.3 | 0.13 | 25.5 | 5.1 | 0.62 | 60.6 | 3.4 | 0.21 |
| Example 26 | 41.0 | 4.7 | 0.38 | 18.6 | 19.2 | 0.72 | 41.7 | 3.8 | 0.47 | 40.3 | 3.3 | 0.13 | 27.9 | 5.1 | 0.62 | 41.0 | 3.8 | 0.18 |
| Example 32 | 41.0 | 4.7 | 0.38 | 23.2 | 19.2 | 0.72 | 41.1 | 3.6 | 0.25 | 41.1 | 3.0 | 0.18 | 18.6 | 5.1 | 0.62 | 40.3 | 3.3 | 0.13 |
| Example 33 | 41.0 | 4.7 | 0.38 | 23.2 | 19.2 | 0.72 | 41.1 | 3.6 | 0.25 | 40.3 | 3.3 | 0.13 | 18.6 | 5.1 | 0.62 | 41.0 | 3.8 | 0.18 |
| Example 34 | 41.0 | 4.7 | 0.38 | 18.6 | 19.2 | 0.72 | 41.1 | 3.6 | 0.25 | 40.3 | 3.3 | 0.13 | 18.6 | 5.1 | 0.62 | 60.6 | 3.4 | 0.21 |
| Comparative Example 3 | 60.6 | 4.5 | 0.36 | 23.2 | 19.2 | 0.72 | 50.0 | 3.1 | 0.71 | 52.0 | 2.4 | 0.01 | 23.2 | 5.1 | 0.62 | 60.6 | 3.4 | 0.21 |
| Example 27 | 41.0 | 4.8 | 0.32 | 23.2 | 19.2 | 0.72 | 58.0 | 3.1 | 0.65 | 58.0 | 5.1 | 0.10 | 23.2 | 5.1 | 0.62 | 60.6 | 3.4 | 0.21 |
| Example 28 | 80.0 | 4.7 | 0.38 | 23.2 | 19.2 | 0.72 | 52.0 | 2.4 | 0.02 | 52.0 | 2.4 | 0.01 | 23.2 | 5.1 | 0.62 | 60.6 | 3.4 | 0.21 |
| Example 29 | 41.0 | 4.7 | 0.38 | 23.2 | 19.2 | 0.72 | 52.0 | 2.4 | 0.02 | 52.0 | 2.4 | 0.01 | 23.2 | 5.1 | 0.62 | 60.6 | 3.4 | 0.21 |
| Example 30 | 41.0 | 4.7 | 0.38 | 23.2 | 19.2 | 0.72 | 52.0 | 2.4 | 0.02 | 58.0 | 5.1 | 0.10 | 23.2 | 5.1 | 0.62 | 60.6 | 3.4 | 0.21 |
| Example 31 | 41.0 | 4.7 | 0.38 | 18.6 | 19.2 | 0.72 | 37.8 | 3.5 | 0.65 | 52.0 | 2.4 | 0.01 | 23.2 | 5.1 | 0.62 | 60.6 | 3.4 | 0.21 |

What is claimed is:

1. A liquid crystal display including a liquid crystal cell having a liquid crystal layer provided between two glass substrates having a thickness of 0.5 mm or less, polarization plates provided on both surfaces of the liquid crystal cell, and a back light provided on a rear side of the liquid crystal cell, the liquid crystal display comprising:
    absorption axes of the polarization plates provided on both surfaces of the liquid crystal cell are disposed to be orthogonal with each other; and
    a difference (D−H) between
    a contractive force D in an absorption axis direction of the front side polarization plate provided on a front side of the liquid crystal cell, which is computed by multiplying a humidity dimensional change ratio of the following [a], an elastic modulus after the following condition (B), and a thickness of the front side polarization plate, and
    a contractive force H in a transmission axis direction of the rear side polarization plate provided on a rear side of the liquid crystal cell, which is computed by multiplying a humidity dimensional change ratio of the following [b], the elastic modulus after the following condition (B), and a thickness of the rear side polarization plate,
    is 365×10 N/m or less,
    wherein [a] the humidity dimensional change ratio expressed by a value obtained by subtracting a dimensional value of the front side polarization plate in the absorption axis direction after the following condition (C) from a dimensional value of the front side polarization plate in the absorption axis direction after the following condition (A),
    [b] the humidity dimensional change ratio expressed by a value obtained by subtracting a dimensional value of the rear side polarization plate in the transmission axis direction after the following condition (B) from a dimensional value of the rear side polarization plate in the transmission axis direction after the following condition (A),
    (A) the liquid crystal display is left to stand for 48 hours in an environment of a 60° C. relative humidity of 90%, and then is left to stand for 48 hours in an environment of a 25° C. relative humidity of 80%,
    (B) the liquid crystal display is left to stand for 48 hours in an environment of a 60° C. relative humidity of 90%, and then is left to stand for 48 hours in an environment of a 25° C. relative humidity of 60%, and
    (C) the liquid crystal display is left to stand for 48 hours in an environment of a 60° C. relative humidity of 90%, and then is left to stand for 48 hours in an environment of a 25° C. relative humidity of 10%.

2. The liquid crystal display according to claim 1, wherein the difference (D−H) between the contractive force D in the absorption axis direction of the front side polarization plate and the contractive force H in the transmission axis direction of the rear side polarization plate is 330×10 N/m or less.

3. The liquid crystal display according to claim 1, wherein the thickness of the front side polarization plate is 130 μm or less.

4. The liquid crystal display according to claim 1, wherein the thickness of the rear side polarization plate is 1.1 times or more the thickness of the front side polarization plate.

5. The liquid crystal display according to claim 2, wherein the thickness of the rear side polarization plate is 1.1 times or more the thickness of the front side polarization plate.

6. The liquid crystal display according to claim 1, wherein a thickness of a protective film used for the front side polarization plate is thinner than a thickness of a protective film used for the rear side polarization plate.

7. The liquid crystal display according to claim 6, wherein the thicknesses of both protective films used for the front side polarization plate and the rear side polarization plate are 50 μm or less.

8. The liquid crystal display according to claim 1, wherein a thickness of a polarizer used for the front side polarization plate is thinner than a thickness of a polarizer used for the rear side polarization plate.

9. The liquid crystal display according to claim 8, wherein the thicknesses of both polarizers used for the front side polarization plate and the rear side polarization plate are 30 μm or less.

10. The liquid crystal display according to claim 6, wherein the protective films used for the polarization plates are cellulose acylate films, cycloolefin-based resin films, or (meth)acryl-based resin films.

11. The liquid crystal display according to claim 1, wherein the polarization plates are laminated through the liquid crystal cell and an adhesive.

12. The liquid crystal display according to claim 1, wherein the liquid crystal cell has an IPS mode.

* * * * *